United States Patent
Konita

(10) Patent No.: US 9,108,362 B2
(45) Date of Patent: Aug. 18, 2015

(54) WELDING DEVICE AND METHOD FOR WELDING THERMOPLASTIC RESIN ARTICLES, AND PRESSING UNIT FOR THE WELDING DEVICE

(71) Applicant: SEIDENSHA ELECTRONICS CO., LTD., Tokyo (JP)

(72) Inventor: Tadahiro Konita, Tokyo (JP)

(73) Assignee: SEIDENSHA ELECTRONICS CO., LTD., Tokyo (JP)

( * ) Notice: Subject to any disclaimer, the term of this patent is extended or adjusted under 35 U.S.C. 154(b) by 0 days.

(21) Appl. No.: 14/359,814

(22) PCT Filed: Feb. 13, 2013

(86) PCT No.: PCT/JP2013/053349
§ 371 (c)(1),
(2) Date: May 21, 2014

(87) PCT Pub. No.: WO2013/122083
PCT Pub. Date: Aug. 22, 2013

(65) Prior Publication Data
US 2014/0326411 A1    Nov. 6, 2014

(30) Foreign Application Priority Data
Feb. 14, 2012    (JP) .................................. 2012-029409

(51) Int. Cl.
*B32B 37/00* (2006.01)
*B29C 65/02* (2006.01)
(Continued)

(52) U.S. Cl.
CPC ............... *B29C 65/02* (2013.01); *B29C 35/041* (2013.01); *B29C 35/045* (2013.01);
(Continued)

(58) Field of Classification Search
CPC .... B29C 65/14; B29C 65/16; B29C 65/1635; B29C 66/73521; B29C 66/81267; B29C 66/73921

USPC ............ 156/286, 379.6, 499, 580, 581, 583.1
See application file for complete search history.

(56) References Cited

U.S. PATENT DOCUMENTS 3,873,395 A * 3/1975 Ehrlich ......................... 156/382
7,846,813 B2 * 12/2010 Sokolov et al. ............... 438/455
(Continued)

FOREIGN PATENT DOCUMENTS

JP          1-110127          4/1989
JP          3-280968         12/1991
(Continued)

OTHER PUBLICATIONS

Search Report for International Application No. PCT/JP2013/053349 (mailed Mar. 12, 2013).

*Primary Examiner* — James Sells
(74) *Attorney, Agent, or Firm* — Merchant & Gould P.C.

(57) ABSTRACT

A welding device includes a compressor configured to compress a welding part and its adjoining surfaces of thermoplastic resin articles (2a, 2b) in directions perpendicular to the axis of a core (1), and a heater, and is configured such that: the surface of the welding part of the thermoplastic resin articles is compressed with a predetermined pressure by the compressor, the compression of the thermoplastic resin articles is then continued to extend a compressed region along the axis of the core without changing a relative position between the compressor in the compressed region and the surface of the welding part of the thermoplastic resin articles, the welding part of the thermoplastic resin articles is heated and welded by the heater, and after the welding, the pressure applied by the compressor is lowered to stop the compression of the thermoplastic resin articles such that the thermoplastic resin articles fitted on the core can be taken out of the welding device.

16 Claims, 37 Drawing Sheets

(51) Int. Cl.

| | | |
|---|---|---|
| B29C 65/24 | (2006.01) | |
| B29C 65/32 | (2006.01) | |
| B29C 65/00 | (2006.01) | |
| B29C 65/16 | (2006.01) | |
| B29C 65/18 | (2006.01) | |
| B29C 65/78 | (2006.01) | |
| B29C 65/14 | (2006.01) | |
| B29C 35/04 | (2006.01) | |
| B29L 31/00 | (2006.01) | |
| B29C 53/42 | (2006.01) | |
| B29C 53/60 | (2006.01) | |
| B29C 35/08 | (2006.01) | |
| B29K 101/12 | (2006.01) | |
| B29L 23/20 | (2006.01) | |

(52) U.S. Cl.
CPC ............ *B29C 35/0805* (2013.01); *B29C 65/14* (2013.01); *B29C 65/16* (2013.01); *B29C 65/1635* (2013.01); *B29C 65/1654* (2013.01); *B29C 65/18* (2013.01); *B29C 65/245* (2013.01); *B29C 65/32* (2013.01); *B29C 65/7802* (2013.01); *B29C 66/1122* (2013.01); *B29C 66/1142* (2013.01); *B29C 66/4322* (2013.01); *B29C 66/4329* (2013.01); *B29C 66/49* (2013.01); *B29C 66/5221* (2013.01); *B29C 66/612* (2013.01); *B29C 66/63* (2013.01); *B29C 66/634* (2013.01); *B29C 66/73521* (2013.01); *B29C 66/73921* (2013.01); *B29C 66/81267* (2013.01); *B29C 66/81455* (2013.01); *B29C 66/91651* (2013.01); *B29C 66/92445* (2013.01); *B29C 66/92921* (2013.01); *B29C 53/42* (2013.01); *B29C 53/60* (2013.01); *B29C 66/967* (2013.01); *B29C 2035/043* (2013.01); *B29C 2035/0811* (2013.01); *B29C 2035/0838* (2013.01); *B29K 2101/12* (2013.01); *B29L 2023/20* (2013.01); *B29L 2031/7542* (2013.01)

(56) References Cited

U.S. PATENT DOCUMENTS

| | | | |
|---|---|---|---|
| 7,963,311 B2 * | 6/2011 | Perttila et al. | 156/581 |
| 8,474,506 B2 * | 7/2013 | Sokolov et al. | 156/581 |
| 2007/0287264 A1 * | 12/2007 | Rogers | 438/457 |

FOREIGN PATENT DOCUMENTS

| | | |
|---|---|---|
| JP | 8-108477 | 4/1996 |
| JP | 8-238676 | 9/1996 |
| JP | 2003-507139 | 2/2003 |
| JP | 2005-334542 | 12/2005 |
| JP | 2011-512335 | 4/2011 |

* cited by examiner

WELDING DEVICE AND METHOD FOR WELDING THERMOPLASTIC RESIN ARTICLES, AND PRESSING UNIT FOR THE WELDING DEVICE

This application is a National Stage Application under 35 U.S.C. §371 of PCT/JP2013/053349 filed 13 Feb. 2013, which claims the benefit of priority to Japanese Patent Application No. 2012-029409 filed 14 Feb. 2012, the disclosures of all of which are hereby incorporated by reference in their entireties. The International Application was published in Japanese on 22 Aug. 2013 as WO 2013/122083. To the extent appropriate, a claim of priority is made to each of the above applications.

TECHNICAL FIELD

The present invention relates to a welding device and method for welding thermoplastic resin articles such as thermoplastic resin tubes having a diameter as small as about 0.2 to 10 mm, like catheters, or thermoplastic resin tubes having a diameter exceeding 10 mm, and a pressing unit for the welding device. More particularly, the present invention pertains to a welding device and method capable of joining thermoplastic resin articles such that a joint thereof has a smooth surface free of pinholes, and a pressing unit for the welding device.

BACKGROUND ART

Welding devices and methods for welding thin thermoplastic resin tubes such as polyethylene tubes have hitherto been put to practical use. Catheters, in particular, are small in diameter as well as in thickness, and a catheter welding method has been known in which catheters with different diameters are fitted one upon the other and the overlaps of the catheters are covered with a heat-shrinkable tube and welded together by making use of the contractive force of the heat-shrinkable tube (see Patent Document 1, by way of example). However, the method using a heat-shrinkable tube has the following drawbacks: (1) it is difficult to cause the heat-shrinkable tube to shrink uniformly; (2) it is difficult to automate the work of setting the heat-shrinkable tube before welding and the work of removing the heat-shrinkable tube after welding; and (3) the heat-shrinkable tube cannot be reused. There has also been proposed a thermal welding method for joining thermoplastic resin tubes, wherein a pressurizing tube of, for example, silicone rubber is used in place of a heat-shrinkable tube, and thermoplastic resin tubes are thermally welded together with the pressurizing tube stretched in an axial direction thereof such that a welding part to be welded is compressed over its entire circumference (see Patent Document 2, by way of example).

Referring to FIGS. 33A to 33C, the conventional method of welding thermoplastic resin tubes, disclosed in Patent Document 2, will be explained. In this welding method, first, as shown in FIG. 33A, a small-diameter thermoplastic resin tube 52a and then a large-diameter thermoplastic resin tube 52b are fitted on a core (mandrel) 51, which is a supporting rod of metal such as stainless steel, such that distal end portions of the thermoplastic resin tubes are coaxially lapped one over the other, forming overlaps 53. Then, as shown in FIG. 33B, the overlaps 53, which are a welding part to be welded, are inserted into a pressurizing tube 54 held at both ends by left and right chucks 55 and 56 and having good releasability, such as a silicone tube. Subsequently, as shown in FIG. 33C, the right chuck 56 is moved to the right as indicated by arrows in the figure, to stretch the pressurizing tube 54 in an axial direction thereof. When axially stretched, the pressurizing tube 54 narrows in radial directions, that is, in directions perpendicular to the axis of the core 51, and the inner wall of the pressurizing tube 54 compresses the overlaps 53 over their entire circumference. With the overlaps 53 thus compressed, heat is generated by a heat source 57 disposed around the pressurizing tube 54 so that the overlaps 53 may be melted and thermally welded together by external heat. After the thermal welding, the right chuck 56 is moved back to the left as viewed in the figure to restore the original shape of the pressurizing tube 54, and then the thermoplastic resin tubes welded together are taken out.

This conventional method is advantageous in that: (1) the overlaps of the thermoplastic resin tubes can be compressed uniformly; (2) the compressive force of the pressurizing tube can be varied by moving one of the chucks, and the thermoplastic resin tubes can be easily set or removed; and (3) the pressurizing tube can be repeatedly used.

However, the conventional method is still associated with some problems to be solved as the welding method or device for thermoplastic resin tubes, including the disadvantage that the conventional method is dedicated to welding of overlapped thermoplastic resin tubes having different diameters.

Let us suppose the case where, as shown in FIG. 34A, thermoplastic resin tubes 62a and 62b fitted on the core 51 as a supporting member and having the same diameter are subjected to butt welding, by way of example. As shown in FIG. 34B, even if the welding part, that is, the abutting part (abutting faces and their vicinities) of the thermoplastic resin tubes 62a and 62b, is located in the middle of the pressurizing tube 54 (in the figure, the position shifted by L/2 from the left end), the pressurizing tube 54 stretches by ΔL, as shown in FIG. 34C, when the right chuck 56 is moved to the right as indicated by arrows in the figure. Consequently, the midpoint of the pressurizing tube 54 also shifts to the right by ΔL/2. The abutting faces of the thermoplastic resin tubes 62a and 62b tend to remain in the original position because of the force of friction against the core 51, but the inner wall of the pressurizing tube 54 moves in such a direction as to separate the abutting faces from each other. If the abutting faces of the thermoplastic resin tubes 62a and 62b are separated from each other, a space 63 is formed. Such space 63 gives rise to a problem that pinholes are liable to be formed in the welded part.

The above conventional method is also associated with other problems as stated below. It is difficult to compress the outer peripheries of the thermoplastic resin tubes with a desired pressure. Since the pressurizing tube 54 is directly heated by the heat source 57, it is necessary to wait for the temperature of the pressurizing tube 54 to become sufficiently low before the removal or setting of the thermoplastic resin tubes. The conventional method uses external heating and thus is not suited for the connection of tubes of such a combination that the melting point of the outside tube (outer tube) is lower than that of the inner tube (see Patent Document 3, by way of example).

Also, the conventional method is used exclusively for welding and joining thermoplastic resin articles that are already formed into a tube, and does not take into account the case of performing butt welding on a thermoplastic resin sheet wound around the core to obtain a thermoplastic resin tube, the case of performing butt welding on flat thermoplastic resin articles to obtain a flat thermoplastic resin plate, or the case of welding flat thermoplastic resin plates lapped one over the other, for example.

CITATION LIST

Patent Literature

Patent Document 1: Unexamined Japanese Patent Publication No. 3-280968
Patent Document 2: Unexamined Japanese Patent Publication No. 8-108477
Patent Document 3: Unexamined Japanese Patent Publication No. 8-238676

SUMMARY OF INVENTION

Technical Problem

The present invention provides a welding device and method for performing butt welding or lap welding on thermoplastic resin articles, which device and method can achieve the following objects: (a) pinholes can be prevented from being formed in a welded part, thereby obtaining a smooth weld surface; (b) the pressure with which a welding part to be welded is compressed can be set to a desired pressure; and (c) a compressor such as a pressurizing tube can be quickly cooled after welding. The present invention can also attain the object of (d) enabling internal heating which is suited for welding of tubes of such a combination that the outer tube has a lower melting point than the inner tube. Further, the present invention achieves the object of (e) enabling replacement of a pressing unit of the welding device so that thermoplastic resin articles of different sizes or the like can be welded by the single welding device.

Solution to Problem

A welding device of the present invention as recited in claim 1 is used for welding thermoplastic resin articles disposed in close contact with a supporting member, the welding device comprising: a compressor configured to compress a surface of a welding part of the thermoplastic resin articles to be welded, and surfaces of the thermoplastic resin articles adjoining the welding part; and a heater, wherein the welding device is configured such that: the surface of the welding part of the thermoplastic resin articles is compressed with a predetermined pressure by the compressor, compression of the thermoplastic resin articles is then continued to extend a compressed region without changing a relative position between the compressor in the compressed region and the surface of the welding part of the thermoplastic resin articles, the welding part of the thermoplastic resin articles is heated and welded by the heater, and after the welding, the pressure applied by the compressor is lowered to stop the compression of the thermoplastic resin articles such that the welded thermoplastic resin articles can be taken out of the welding device.

With this configuration, the surfaces of the welding part and its vicinities of the thermoplastic resin articles are compressed with the predetermined pressure, and the welding part and its vicinities of the thermoplastic resin articles are welded.

A welding device of the present invention as recited in claim 2 is used for welding thermoplastic resin articles disposed in close contact with a supporting member, the welding device comprising: a compressor configured to compress a surface of a welding part of the thermoplastic resin articles to be welded, and surfaces of the thermoplastic resin articles adjoining the welding part; and a heater, wherein the welding device is configured such that: the surface of the welding part of the thermoplastic resin articles is compressed with a first pressure by the compressor, the surfaces of the thermoplastic resin articles are then compressed with a second pressure higher than the first pressure to extend a compressed region without changing a relative position between the compressor in the compressed region and the surface of the welding part of the thermoplastic resin articles, the welding part of the thermoplastic resin articles is heated and welded by the heater, and after the welding, the pressure applied by the compressor is lowered to stop the compression of the thermoplastic resin articles such that the welded thermoplastic resin articles can be taken out of the welding device.

With this configuration, the surface of the welding part of the thermoplastic resin articles is first compressed with the first pressure to compress the welding part of the thermoplastic resin articles, and then the welding part and its vicinities of the thermoplastic resin articles are compressed with the second pressure higher than the first pressure without changing the relative position between the compressor in the compressed region and the surface of the welding part of the thermoplastic resin articles, to weld the welding part.

In the welding device of the present invention as recited in claim 3, the pressure applied to the surface of the welding part of the thermoplastic resin articles by the compressor is continuously increased from the first pressure to the second pressure higher than the first pressure, to extend the compressed region.

Accordingly, the compressed region is continuously extended, with the result that the welding part and its vicinities of the thermoplastic resin articles are continuously squeezed, whereby air voids including very small ones can be expelled and thus the welded part can be made to have a smooth weld surface free of pinholes, thereby achieving the aforementioned object (a).

A welding device of the present invention as recited in claim 4 is used for welding thermoplastic resin articles disposed in close contact with a core serving as a supporting member, the welding device comprising: a compressor configured to compress a surface of a welding part of the thermoplastic resin articles to be welded, and surfaces of the thermoplastic resin articles adjoining the welding part, in directions perpendicular to an axis of the core; and a heater, wherein the welding device is configured such that: the surface of the welding part of the thermoplastic resin articles is compressed with a predetermined pressure by the compressor, compression of the thermoplastic resin articles is then continued to extend a compressed region along the axis of the core without changing a relative position between the compressor in the compressed region and the surface of the welding part of the thermoplastic resin articles, the welding part of the thermoplastic resin articles is heated and welded by the heater, and after the welding, the pressure applied by the compressor is lowered to stop the compression of the thermoplastic resin articles such that the welded thermoplastic resin articles can be taken out of the welding device.

With this configuration, the surfaces of the welding part and its vicinities of the thermoplastic resin articles are compressed with the predetermined pressure, and the welding part and its vicinities of the thermoplastic resin articles are welded.

A welding device of the present invention as recited in claim 5 is used for welding thermoplastic resin articles disposed in close contact with a core serving as a supporting member, the welding device comprising: a compressor configured to compress a surface of a welding part of the thermoplastic resin articles to be welded, and surfaces of the thermoplastic resin articles adjoining the welding part, in directions perpendicular to an axis of the core; and a heater, wherein the welding device is configured such that: the surface of the welding part of the thermoplastic resin articles is compressed with a first pressure by the compressor, the surfaces of the thermoplastic resin articles are then compressed with a second pressure higher than the first pressure to extend a compressed region along the axis of the core without changing a relative position between the compressor in the compressed region and the surface of the welding part of the thermoplastic resin articles, the welding part of the thermoplastic resin articles is heated and welded by the heater, and after the welding, the pressure applied by the compressor is lowered to stop the compression of the thermoplastic resin articles such that the welded thermoplastic resin articles can be taken out of the welding device.

With this configuration, the surface of the welding part of the thermoplastic resin articles is first compressed with the first pressure to compress the welding part of the thermoplastic resin articles, and then the welding part and its vicinities of the thermoplastic resin articles are compressed with the second pressure higher than the first pressure without changing the relative position between the compressor in the compressed region and the surface of the welding part of the thermoplastic resin articles, to weld the welding part and its vicinities.

Thus, the compressed region is extended without changing the relative position between the compressor in the compressed region and the surface of the welding part of the thermoplastic resin articles, whereby the welding part and its vicinities are squeezed with the abutting faces of the thermoplastic resin articles pressed against each other so as not to separate from each other. Since the welding part and its vicinities of the thermoplastic resin articles are squeezed, air voids including very small ones can be expelled from the gap between the compressor and the thermoplastic resin articles as well as from the gap between the core and the thermoplastic resin articles, whereby the core and the thermoplastic resin articles fitted on the core can be brought into close contact with each other. While the thermoplastic resin articles fitted on the core are kept in close contact with the compressor and the core, the core is heated, so that the welding part can be welded with a smooth weld surface free of pinholes.

In the welding device of the present invention as recited in claim 6, the pressure applied to the surface of the welding part of the thermoplastic resin articles by the compressor is continuously increased from the first pressure to the second pressure higher than the first pressure, to extend the compressed region along the axis of the core.

Accordingly, the compressed region is continuously extended, with the result that the welding part and its vicinities of the thermoplastic resin articles are continuously squeezed, whereby air voids including very small ones can be expelled and thus the welded part can be made to have a smooth weld surface free of pinholes, thereby achieving the aforementioned object (a).

In the welding device of the present invention as recited in claim 7, the compressor includes a pressurizing tube expandable and contractible in directions perpendicular to the axis of the core and a pressurizer configured to apply a fluid pressure to the pressurizing tube in directions perpendicular to the axis of the core, the pressurizer is constituted by a hollow housing having a hollow space to form a cavity between a peripheral surface of the pressurizing tube and the hollow housing, and a fluid feeder configured to supply a fluid to the cavity, part of the hollow housing is disposed in close contact with the pressurizing tube to form the cavity between the peripheral surface of the pressurizing tube and the hollow housing, and the fluid is supplied to the cavity by the fluid feeder to deform the pressurizing tube in directions perpendicular to the axis of the core and compress the surfaces of the thermoplastic resin articles. This configuration makes it possible to weld the welding part with a smooth weld surface free of pinholes, thereby attaining the aforementioned object (a).

In the welding device of the present invention as recited in claim 8, the compressor includes an extendable and contractible pressurizing sheet and a pressurizer configured to apply a fluid pressure to the pressurizing sheet, the pressurizer is constituted by a hollow housing having an open hole to form a cavity between the pressurizing sheet and the hollow housing, and a fluid feeder configured to supply a fluid to the cavity, part of the hollow housing is disposed in close contact with the pressurizing sheet to form the cavity between the pressurizing sheet and the hollow housing, and the fluid pressure is supplied to the cavity by the fluid feeder to deform the pressurizing sheet and compress the surfaces of the thermoplastic resin articles. This configuration makes it possible to weld the welding part with a smooth weld surface free of pinholes, thereby achieving the aforementioned object (a).

In the welding device of the present invention as recited in claim 9, the pressure applied by the compressor is gas pressure. Specifically, the gas pressure is raised by a pump and is set to the first pressure and then to the second pressure by a valve, and after the welding, the heated gas is discharged from the valve and unheated gas is introduced to cool the pressurizing tube. For such gas, air or, if necessary, inert gas such as nitrogen gas may be used. With the above configuration, the pressure with which the welding part is compressed can be variably set as needed, whereby the aforementioned object (b) can be achieved. Also, the compressor such as the pressurizing tube can be quickly cooled, thereby attaining the aforementioned object (c).

In the welding device of the present invention as recited in claim 10, the pressure applied by the compressor is liquid pressure. The liquid to be used may be oil or, where necessary, water. The pressure with which the welding part is compressed can be variably set as needed, thereby achieving the aforementioned object (b). Also, the compressor such as the pressurizing tube can be quickly cooled, whereby the aforementioned object (c) can be achieved.

In the welding device of the present invention as recited in claim 11, the compressor includes a pressurizing tube expandable and contractible in directions perpendicular to the axis of the core and a pressurizer configured to apply pressure to the pressurizing tube in directions along the axis of the core, the pressurizer applies pressure to the pressurizing tube in directions along the axis of the core to deform the pressurizing tube in directions perpendicular to the axis of the core and compress the surfaces of the thermoplastic resin articles.

In this manner, the pressurizing tube is axially compressed so that the pressurizing tube may be deformed in directions perpendicular to the axis of the core to compress the surfaces of the thermoplastic resin articles. Thus, the pressurizing tube is mechanically applied with pressure in the axial direction, whereby an object of the present invention can be achieved.

In the welding device of the present invention as recited in claim 12, the pressurizing tube has a thickness varying in an axial direction of the core such that the thickness is large at end portions of the pressurizing tube and decreases toward a middle portion of the pressurizing tube.

In such pressurizing tube, the inner diameter of the small-thickness portion is more expandable and contractible than that of the large-thickness portion, and therefore, the pressure with which the welding part is compressed can be variably set as desired, thereby achieving the aforementioned object (b).

In the welding device of the present invention as recited in claim 13, the pressurizing tube is located outside of the thermoplastic resin articles, and the pressurizing tube has an inner diameter varying in an axial direction of the core such that the inner diameter is large at end portions of the pressurizing tube and decreases toward a middle portion of the pressurizing tube.

With the pressurizing tube configured in this manner, the portion with a small inner diameter first comes into contact with the surfaces of the thermoplastic resin articles, and thus, the pressure with which the welding part is compressed can be variably set as desired, whereby the aforementioned object (b) can be achieved.

In the welding device of the present invention as recited in claim 14, the pressurizing tube is located inside of the thermoplastic resin articles, and the pressurizing tube has an outer diameter varying in an axial direction of the core such that the outer diameter is small at end portions of the pressurizing tube and increases toward a middle portion of the pressurizing tube.

With the pressurizing tube having such configuration, the middle portion with a large outer diameter first comes into contact with the inner surfaces of the thermoplastic resin articles, and therefore, the pressure with which the welding part is compressed can be variably set as desired, thereby attaining the aforementioned object (b).

In the welding device of the present invention as recited in claim 15, the pressurizing tube has an inner or outer diameter varying in the axial direction, as recited in claim 13 or 14, and also has a thickness uniform in the axial direction of the core before being applied with pressure.

Consequently, the pressure with which the welding part is compressed can be variably set as desired, thus achieving the aforementioned object (b).

In the welding device of the present invention as recited in claim 16, the pressurizing tube is located outside of the thermoplastic resin articles and has an inner diameter varying in the axial direction such that the inner diameter is large at end portions of the pressurizing tube and decreases toward a middle portion of the pressurizing tube, as recited in claim 13, and the pressurizing tube has an outer diameter uniform (unvarying) in the axial direction of the core before being applied with pressure.

With the pressurizing tube configured in this manner, the portion with a small inner diameter first comes into contact with the surfaces of the thermoplastic resin articles, and accordingly, the pressure with which the welding part is compressed can be variably set as desired, whereby the aforementioned object (b) can be achieved.

In the welding device of the present invention, the pressurizing tube is located inside of the thermoplastic resin articles and has an outer diameter varying in an axial direction of the core such that the outer diameter is small at end portions of the pressurizing tube and increases toward a middle portion of the pressurizing tube, and the pressurizing tube has an inner diameter uniform (unvarying) in the axial direction of the core before being applied with pressure.

With the pressurizing tube having such configuration, the portion with a large outer diameter first comes into contact with the surfaces of the thermoplastic resin articles, and therefore, the pressure with which the welding part is compressed can be variably set as desired, thereby attaining the aforementioned object (b).

In the welding device of the present invention, the heater is arranged outside of the compressor. With this configuration, the heating unit for the thermoplastic resin articles can be made compact (small) in size.

In the welding device of the present invention, the core is a tubular core (pipe) having a hollow in which the heater is arranged, and the core is heated by the heater such that heat of the heated core is transferred to the thermoplastic resin articles to weld the thermoplastic resin articles together.

This configuration makes it possible to perform internal heating which is suited for such a combination of thermoplastic resin tubes that the melting point of the outer tube is lower than that of the inner tube, whereby the aforementioned object (d) can be achieved.

In the welding device of the present invention, the heater is a high-frequency induction heater, and the core is heated by the heater such that heat of the heated core is transferred to the thermoplastic resin articles to weld the thermoplastic resin articles together.

With this configuration, internal heating can be performed which is suited for such a combination of thermoplastic resin tubes that the melting point of the outer tube is lower than that of the inner tube, thereby achieving the aforementioned object (d).

In the welding device of the present invention, the heater is a laser heater, and the core is heated by the heater such that heat of the heated core is transferred to the thermoplastic resin articles to weld the thermoplastic resin articles together.

This configuration also makes it possible to perform internal heating which is suited for such a combination of thermoplastic resin tubes that the melting point of the outer tube is lower than that of the inner tube, whereby the aforementioned object (d) can be attained.

A welding method of the present invention is used for welding thermoplastic resin articles disposed in close contact with a supporting member with surfaces of the thermoplastic resin articles compressed by a compressor against the supporting member, the welding method comprising: compressing a surface of a welding part of the thermoplastic resin articles with a predetermined pressure by the compressor; then continuing compression of the thermoplastic resin articles to extend a compressed region without changing a relative position between the compressor in the compressed region and the surface of the welding part of the thermoplastic resin articles, heating and welding the welding part of the thermoplastic resin articles by a heater; and after the welding, lowering the pressure applied by the compressor to stop the compression of the thermoplastic resin articles such that the welded thermoplastic resin articles can be taken out.

With this method, the welding part can be welded so as to have a smooth weld surface free of pinholes, thereby attaining the aforementioned object (a).

A welding method of the present invention is used for welding thermoplastic resin articles disposed in close contact with a supporting member with surfaces of the thermoplastic resin articles compressed by a compressor against the supporting member, the welding method comprising: compressing a surface of a welding part of the thermoplastic resin articles with a first pressure by the compressor, then compressing the surfaces of the thermoplastic resin articles with a second pressure higher than the first pressure to extend a compressed region without changing a relative position between the compressor in the compressed region and the surface of the welding part of the thermoplastic resin articles, heating and welding the welding part of the thermoplastic resin articles by a heater; and after the welding, lowering the pressure applied by the compressor to stop the compression of the thermoplastic resin articles such that the welded thermoplastic resin articles can be taken out.

Also with this method, the welding part can be so welded as to have a smooth weld surface free of pinholes, whereby the aforementioned object (a) can be achieved.

A welding method of the present invention is used for welding thermoplastic resin articles disposed in close contact with a core serving as a supporting member with surfaces of the thermoplastic resin articles compressed by a compressor, the welding method comprising: compressing a surface of a welding part of the thermoplastic resin articles with a predetermined pressure by the compressor; then continuing compression of the thermoplastic resin articles to extend a compressed region along an axis of the core without changing a relative position between the compressor in the compressed region and the surface of the welding part of the thermoplastic resin articles, heating and welding the welding part of the thermoplastic resin articles by the heater; and after the welding, lowering the pressure applied by the compressor to stop the compression of the thermoplastic resin articles such that the welded thermoplastic resin articles can be taken out.

With this method, the welding part can be welded so as to have a smooth weld surface free of pinholes, thereby achieving the aforementioned object (a).

A welding method of the present invention is used for welding thermoplastic resin articles disposed in close contact with a core serving as a supporting member with surfaces of the thermoplastic resin articles compressed by a compressor, the welding method comprising: compressing a surface of a welding part of the thermoplastic resin articles with a first pressure by the compressor; then compressing the surfaces of the thermoplastic resin articles with a second pressure higher than the first pressure to extend a compressed region along an axis of the core without changing a relative position between the compressor in the compressed region and the surface of the welding part of the thermoplastic resin articles, heating and welding the welding part of the thermoplastic resin articles by the heater, and after the welding, lowering the pressure applied by the compressor to stop the compression of the thermoplastic resin articles such that the welded thermoplastic resin articles can be taken out.

This method also makes it possible to weld the welding part so as to have a smooth weld surface free of pinholes, whereby the aforementioned object (a) can be achieved.

A pressing unit of the present invention is used in the welding device and comprises: a pressurizing tube expandable and contractible in directions perpendicular to the axis of the core; and a hollow housing having a hollow space to form a cavity between a peripheral surface of the pressurizing tube and the hollow housing, the hollow housing having a pump connection hole communicating with the hollow space, wherein the pressurizing tube is deformed when applied with a fluid pressure via the pump connection hole, to compress the surfaces of the thermoplastic resin articles. Thus, when thermoplastic resin articles of different size or the like need to be welded, the pressing unit can be replaced with another suitable pressing unit.

A pressing unit of the present invention is used in the welding device and comprises: an extendable and contractible pressurizing sheet; and a hollow housing having an open hole to form a cavity between the pressurizing sheet and the hollow housing, the hollow housing having a pump connection hole communicating with the open hole, wherein the pressurizing sheet is deformed when applied with a fluid pressure via the pump connection hole, to compress the surfaces of the thermoplastic resin articles.

In the welding device of the present invention a pressing unit is detachably mounted to the welding device and configured to hermetically fix the pressurizing tube to the hollow housing. Thus, using a single welding device, a variety of thermoplastic resin articles with different sizes or the like can be welded together by just replacing the pressing unit with another pressing unit.

In the welding device of the present invention a pressing unit is detachably mounted to the welding device and configured to hermetically fix the pressurizing sheet to the hollow housing. Accordingly, using a single welding device, a variety of thermoplastic resin articles with different sizes or the like can be welded together by just replacing the pressing unit with another suitable one.

In the welding device of the present invention the fluid feeder is connected with a heater configured to heat the fluid such that pressure of the heated fluid is used as the fluid pressure.

By using the heated gas or liquid as the fluid, it is possible to heat the tubes or sheets to be welded from both inside and outside in cases where the tubes or sheets are large in thickness. Especially in cases where a heat-resistant material such as silicone rubber is used for the pressurizing tube or pressurizing sheet, oil or the like heated up to 280° C., for example, can be used as the heated fluid. Thus, even if the thickness of the tubes or sheets is large, the tubes or sheets can be quickly heated from both inside and outside and welded together.

In the welding device of the present invention the pressure controller is configured to perform pressurization control and depressurization control.

With this configuration, the welding part can be welded so as to have a smooth weld surface, thereby achieving the aforementioned object (a).

Advantageous Effects of Invention

The welding device and method for performing butt welding or lap welding on thermoplastic resin articles and the pressing unit for the welding device according to the present invention achieve the following objects: (a) to prevent formation of pinholes in the welded part to obtain a smooth weld surface; (b) to enable optional setting of the pressure with which the welding part is compressed; (c) to quickly cool the compressor such as the pressurizing tube after welding; (d) to enable internal heating which is suited for the welding of tubes of such a combination that the outer tube has a lower melting point than the inner tube; and (e) to enable replacement of the pressing unit for the welding device.

DESCRIPTION OF EMBODIMENTS (First Embodiment of the Present Invention)

Figure 1:
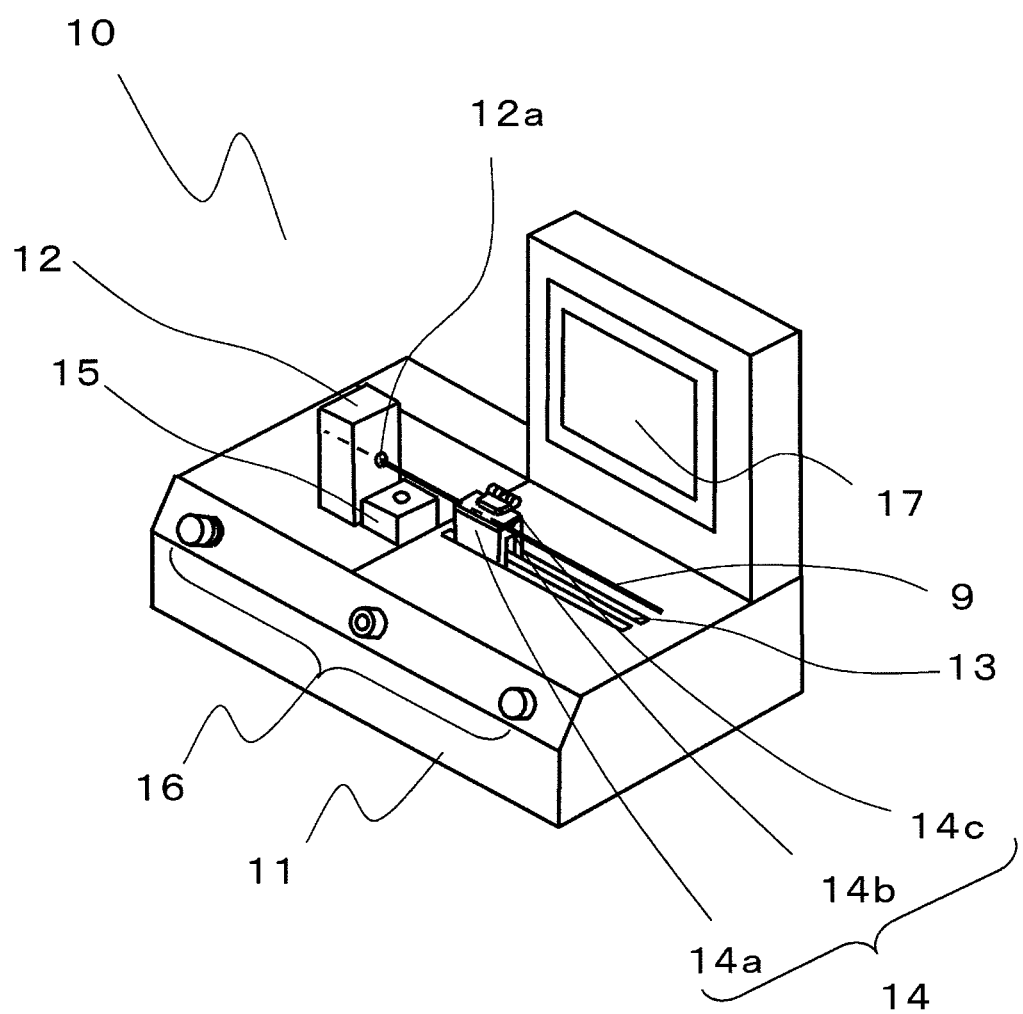
FIG. 1 is a perspective view illustrating an external appearance of a welding device for thermoplastic resin articles according to a first embodiment of the present invention.

FIG. 1 is a perspective view illustrating an external appearance of a welding device 10 for thermoplastic resin articles according to a first embodiment of the present invention. The welding device 10 has a heating unit 12 and a position sensor 15 arranged on an upper surface of a body 11 thereof, and has a carriage 14 movable along a guide rail 13 provided on the upper surface of the body 11. The carriage 14 includes a movable base 14a, a V-shaped groove 14b and a clamp 14c, and is configured such that, with a work 9 pressed by the clamp 14c into the V-shaped groove 14b cut in the upper surface of the movable base 14a, one end portion of the work 9 can be inserted into and taken out of a hole 12a in the heating unit 12. The work 9 includes tubular thermoplastic resin articles 2a and 2b fitted on a core (mandrel) 1, which is a supporting member as described later. A welding manipulator 16 is arranged at the front of the body 11, and a monitor 17 is arranged at the back of the body 11. The monitor 17 displays operating conditions, operating state and the like.

Figure 2:
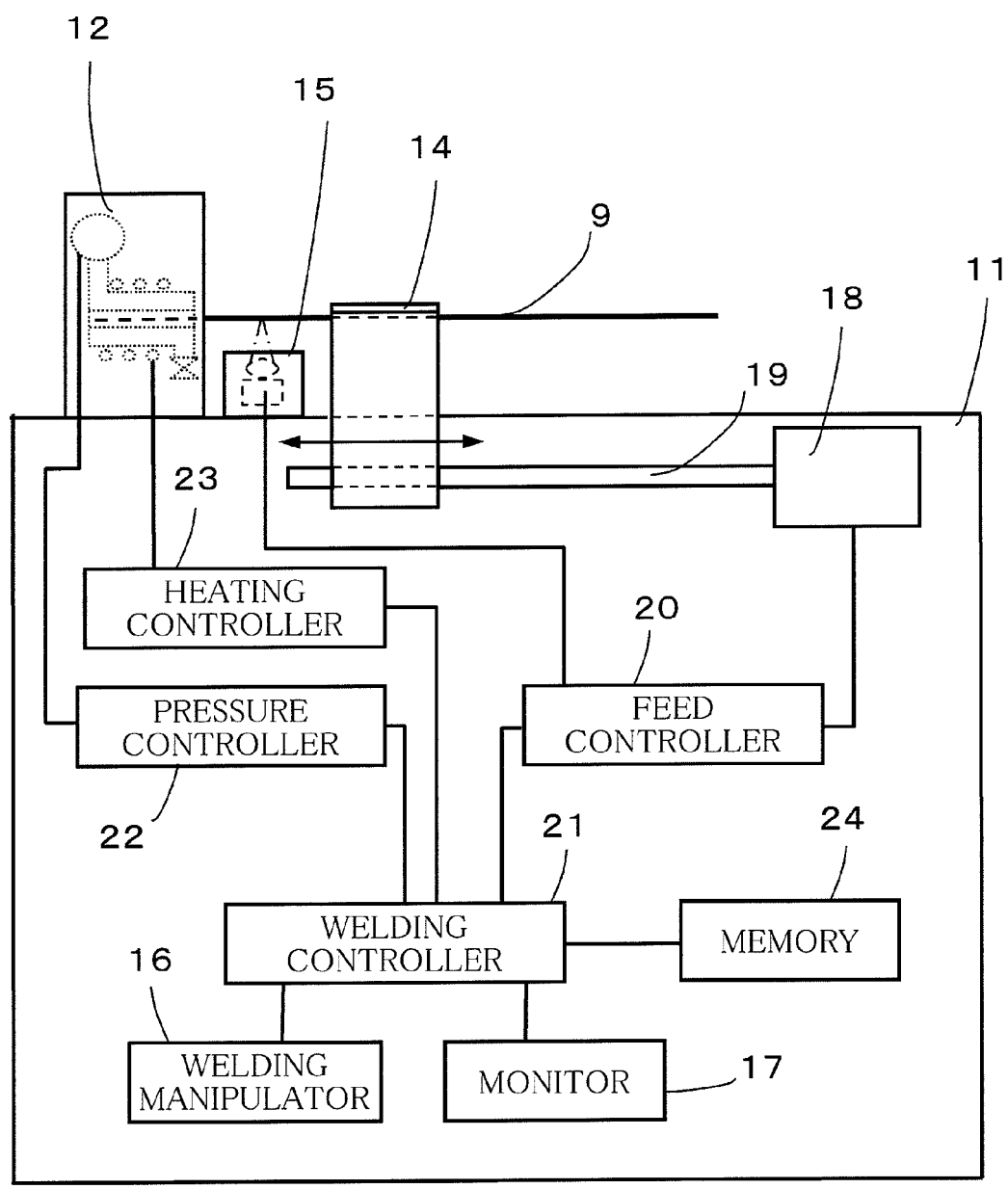
FIG. 2 illustrates a schematic configuration of the thermoplastic resin welding device according to the first embodiment of the present invention.

FIG. 2 illustrates a schematic configuration of the thermoplastic resin welding device 10 according to the first embodiment of the present invention. As already mentioned above, the heating unit 12, the position sensor 15 and the carriage 14 are arranged on the upper surface of the body 11, the welding manipulator 16 is arranged at the front of the body 11, and the monitor 17 is arranged at the back of the body 11.

A drive motor 18 and a feed screw 19 for moving the carriage 14 are housed in the body 11. The body 11 also accommodates controllers including a feed controller 20, a welding controller 21, a pressure controller 22 and a heating controller 23, as well as a memory 24 for storing welding conditions and other related data.

The welding controller 21 performs integrated control of welding operation in accordance with instructions from an operator using the welding manipulator 16 and the monitor 17, and supervises the feed controller 20, the pressure controller 22 and the heating controller 23 to carry out a desired welding operation. The pressure controller 22 controls the pressure of a compressor arranged in the heating unit 12. The heating controller 23 controls a heater such as a high-frequency induction heater or a laser heater.

Figure 3:
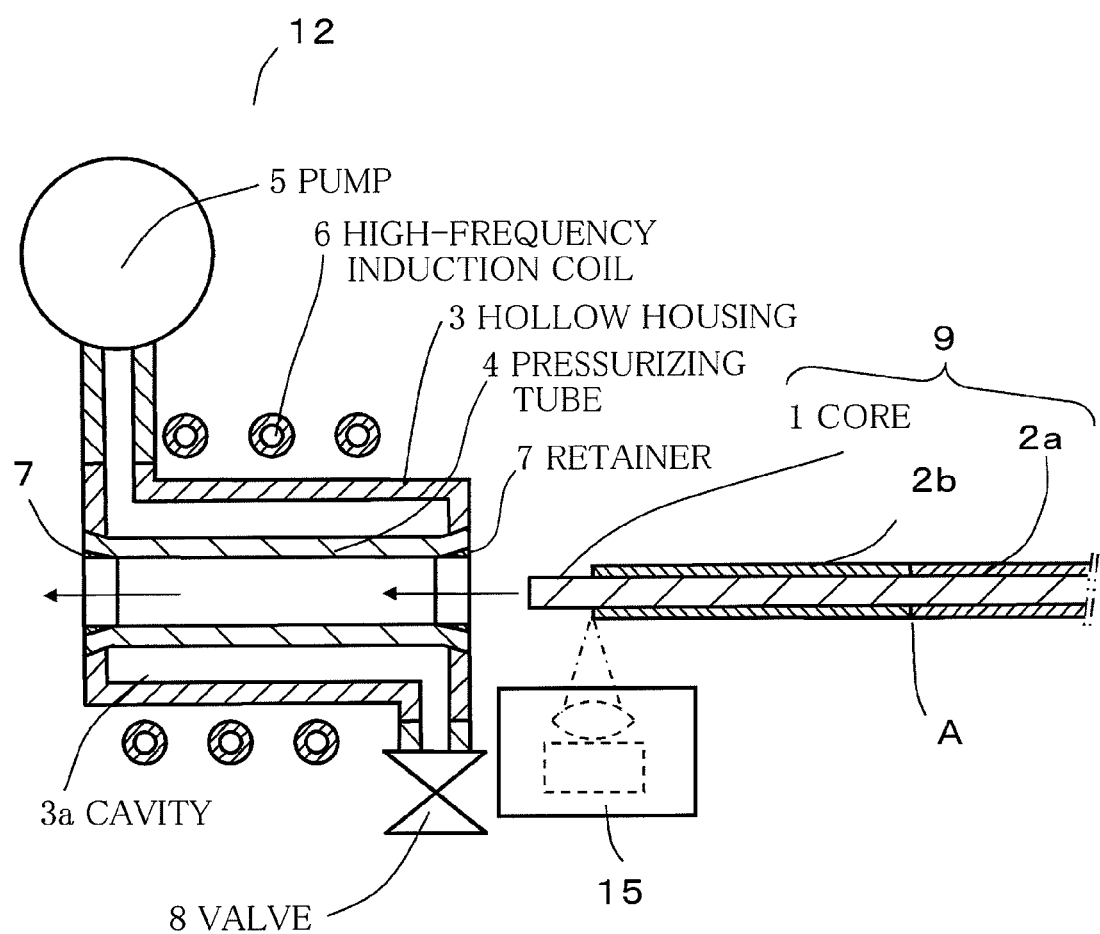
FIG. 3 is a sectional view illustrating the internal structure of a heating unit of the thermoplastic resin welding device according to the first embodiment of the present invention, as well as the positional relationship between the heating unit and a work.

FIG. 3 is a schematic sectional view illustrating the internal structure of the heating unit 12 of the thermoplastic resin welding device 10 according to the first embodiment of the present invention, as well as the positional relationship between the position sensor 15 and the work 9 having the thermoplastic resin articles 2a and 2b fitted on the core 1. To facilitate understanding of the invention, a hollow housing 3, a pressurizing tube 4 and retainers 7 are also illustrated in the exploded perspective view of FIG. 4.

The heating unit 12 is obtained by making a through hole 3h in the hollow housing 3 made of a non-metallic material such as plastic, and inserting the pressurizing tube 4, which may be a silicone rubber tube, into the through hole 3h. The retainers 7, each in the form of a ring with a wedge-shaped section, are press-fitted into the opposite ends of the pressurizing tube 4 to fix the pressurizing tube 4 in the through hole 3h of the hollow housing 3.

The hollow housing 3 constitutes a columnar outer shell having a cavity (hollow space) therein, and the through hole 3h opens on both end faces of the columnar shell. The pressurizing tube 4, which is, for example, a silicone rubber tube, is inserted into the through hole 3*h*, and the ring-shaped retainers 7 are pushed in to bring the outer peripheral surfaces of the opposite end portions of the pressurizing tube 4 into close contact with the inner peripheral surface of the through hole 3*h*, whereby a cavity 3*a* is formed by hermetically closing part of the internal space of the hollow housing 3 with the pressurizing tube 4.

A pump 5 is connected to one end of the hollow housing 3 through a pump connection hole 3*i*, and a valve 8 is connected to the other end of the hollow housing 3 through a valve connection hole 3*k*. The gap between the hollow housing 3 and each of the pressurizing tube 4, the pump 5 and the valve 8 is hermetically sealed up so that air introduced into the sealed cavity 3*a* by the pump 5 can be kept at a predetermined pressure and also can be let in or out as needed. The hollow housing 3, the pressurizing tube 4, the pump 5, the retainers 7 and the valve 8 constitute a "compressor" of the heating unit 12. On the other hand, the compressor and a high-frequency induction coil 6 arranged as a heater around the hollow housing 3 constitute the heating unit 12. The inner hole in the pressurizing tube 4 is open at both ends, and therefore, the work 9 can be inserted into and withdrawn from the inner hole of the pressurizing tube 4 through the inner hole of the ring-shaped retainer 7 fixed to the hollow housing 3.

The position sensor 15 is arranged in the vicinity of the inlet opening of the pressurizing tube 4. The position sensor 15, which is configured to measure the amount of movement of the thermoplastic resin articles 2*a* and 2*b* by using an image recognition unit such as a CCD image sensor, detects abutting faces A of the thermoplastic resin articles 2*a* and 2*b* and then measures the amount of distance over which the thermoplastic resin articles 2*a* and 2*b* are moved thereafter.

When it is judged on the basis of the information from the position sensor 15 that the abutting faces A of the thermoplastic resin articles 2*a* and 2*b* have reached the midpoint of the pressurizing tube 4, the feed controller 20 stops feeding the carriage 14 carrying the work 9 thereon and positions the carriage 14. Then, the pressure controller 22 causes the pump 5 to feed air into the cavity 3*a* so that the abutting faces A and their adjoining surfaces of the thermoplastic resin articles 2*a* and 2*b* may be compressed and gripped by the inner wall of the swollen pressurizing tube 4. The valve 8 is configured to control the pressure in the cavity 3*a* and, when closed, can keep the pressure in the cavity 3*a* at either of a first pressure (P1) and a second pressure (P2) higher than the first pressure. When opened, the valve 8 allows the air in the cavity 3*a* to be discharged, thereby lowering the pressure in the cavity 3*a*. When the thermoplastic resin articles 2*a* and 2*b* fitted on the core 1 are compressed by the inner wall of the pressurizing tube 4, air present in the gap between the core 1 and the thermoplastic resin articles 2*a* and 2*b* is forced out.

The pressure controller 22 can perform not only pressurization control but complex control, namely, a combination of the pressurization control and depressurization control, as in fifteenth and sixteenth embodiments explained later with reference to FIGS. 31 and 32.

Numerous turns of the high-frequency induction coil 6 are disposed around the outer periphery of the hollow housing 3. While the core 1 having the thermoplastic resin articles 2*a* and 2*b* fitted thereon is inserted in the pressurizing tube 4, high-frequency electric current is supplied from a high-frequency power supply, not shown, to the high-frequency induction coil 6 under the control of the heating controller 23. As a consequence, the core 1, which is a rod of metal such as stainless steel, generates heat, and the abutting faces A of the thermoplastic resin articles 2*a* and 2*b* fitted on the core 1 are melted and welded together. The number of turns and diameter of the high-frequency induction coil 6 may be set so as to be optimized for required heating conditions. Depending on conditions, a single turn of the high-frequency induction coil 6 may suffice.

After the welding, the valve 8 is opened, whereupon the heated high-temperature air is discharged and unheated low-temperature air flows into the cavity 3*a*. Accordingly, the pressurizing tube 4 and the hollow housing 3 are cooled. The pump 5 is thereafter stopped, with the result that the pressure in the cavity 3*a* lowers. Thus, since the pressurizing tube 4 stops applying the compressive force and recovers its original shape, the inner wall of the pressurizing tube 4 separates from the surfaces of the thermoplastic resin articles 2*a* and 2*b*. Accordingly, the welded thermoplastic resin articles 2*a* and 2*b* can be pulled out with a small force.

Figure 4:
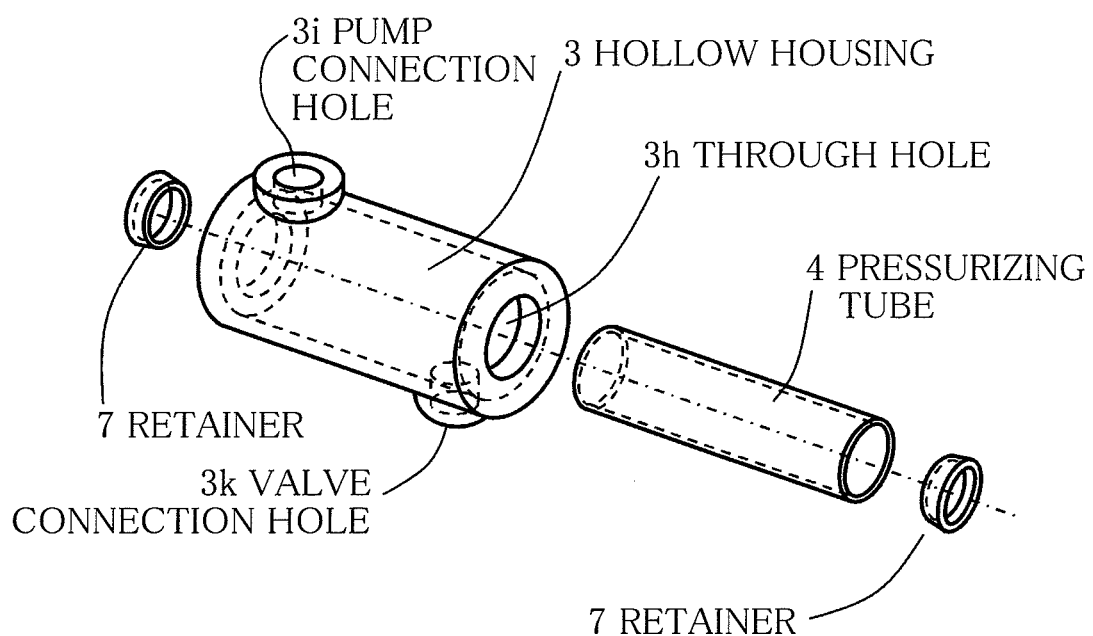
FIG. 4 is an exploded perspective view of a pressing unit for the thermoplastic resin welding device according to the first embodiment of the present invention.

In the thermoplastic resin welding device, the "compressor" is constituted by the hollow housing 3, the pressurizing tube 4, the pump 5, the retainers 7 and the valve 8 as stated above, and out of these components, those excluding the pump 5 and the valve 8, as shown in FIG. 4, constitute a "pressing unit", which is a replaceable unit. A plurality of types of "pressing units" for thermoplastic resin articles with different outer diameters are prepared beforehand, and a "pressing unit" matching a target outer diameter is selected for replacement and connected to the pump 5 and the valve 8 of the thermoplastic resin welding device 10. Such pressing units enable a single welding device to weld tubular thermoplastic resin articles with different outer diameters. Where necessary, a pressing unit for a certain outer diameter may be replaced with another pressing unit for the same outer diameter but with a different structure to perform welding operation.

Figure 5:
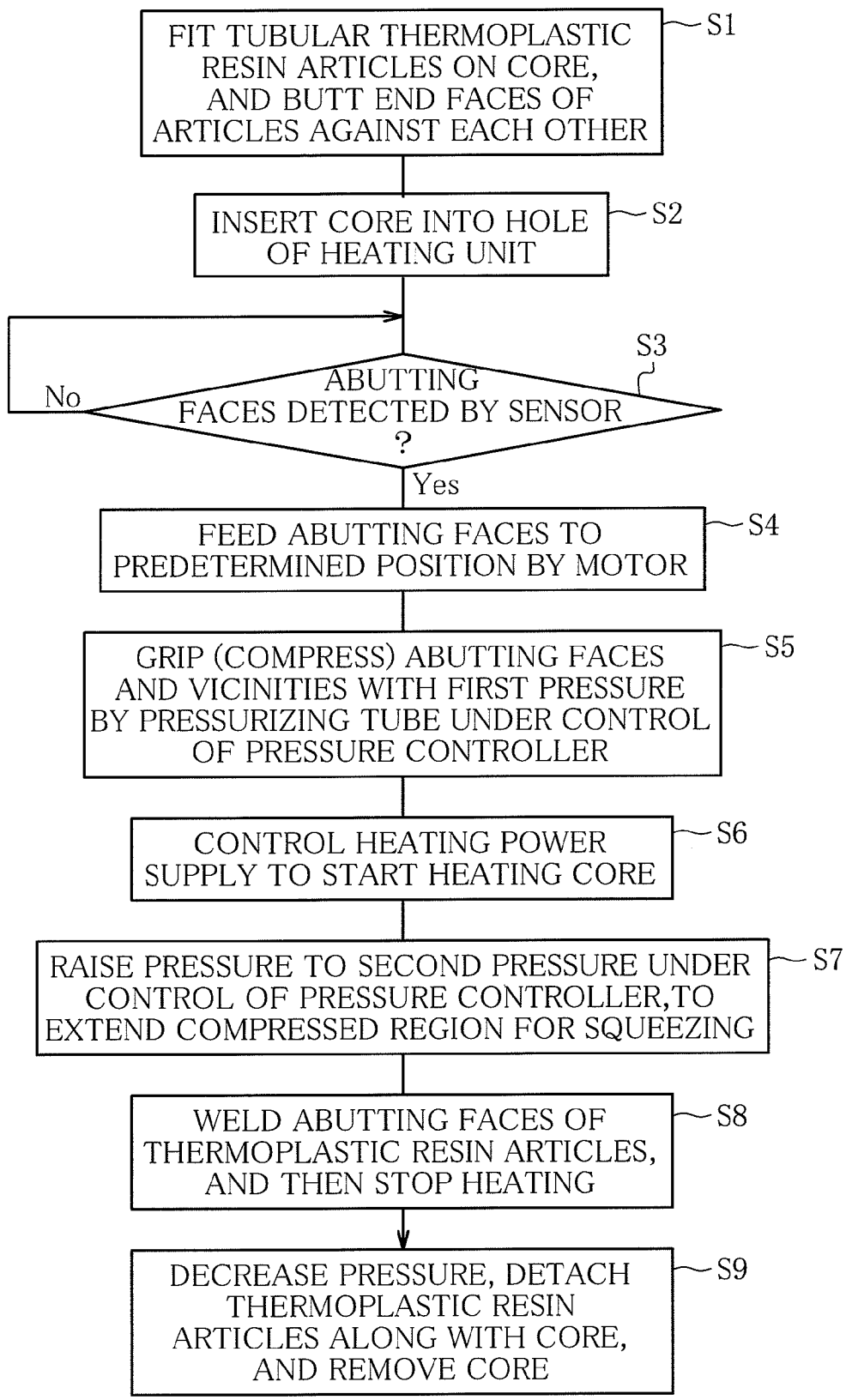
FIG. 5 is a flowchart illustrating operation of the thermoplastic resin welding device according to the first embodiment of the present invention.

FIG. 5 is a flowchart illustrating operation of the thermoplastic resin welding device according to the first embodiment of the present invention. The operation will be explained below with reference to the flowchart. In the following explanation, reference will also be made to the other drawings (FIGS. 6A to 11B) illustrating the operation, to facilitate understanding of the invention.

Figure 6A:
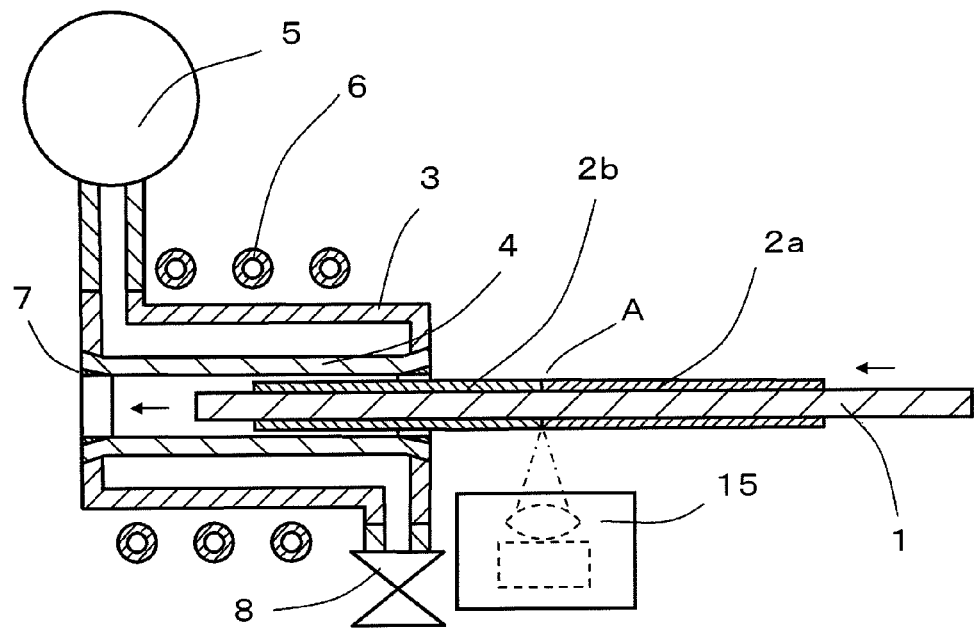
FIG. 6A is a sectional view illustrating a state in which a distal end portion of the work having thermoplastic resin articles fitted on a core is inserted into the heating unit according to the first embodiment of the present invention.
Figure 6B:
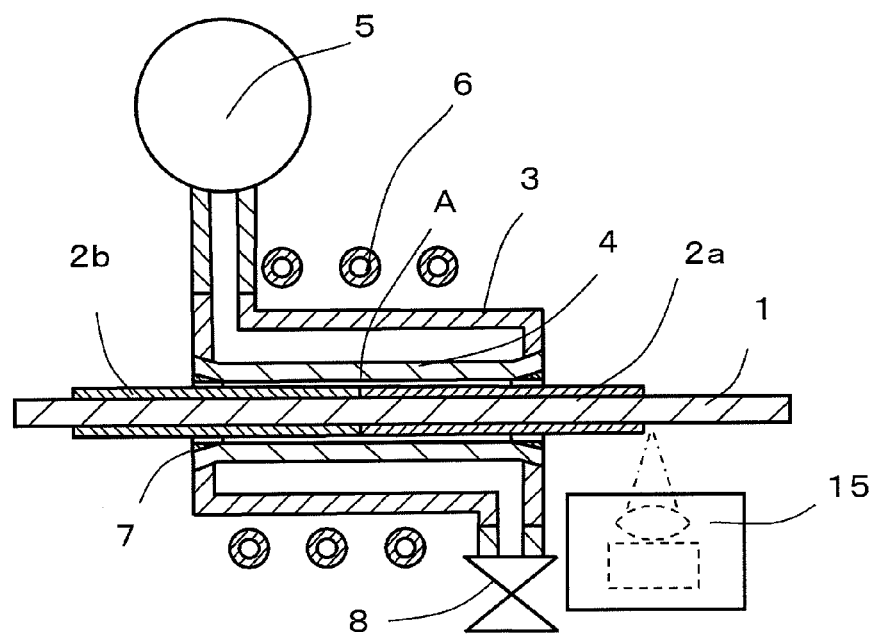
FIG. 6B is a sectional view illustrating a state in which the work is positioned relative to the heating unit according to the first embodiment of the present invention.

As a first step, the operator fits the tubular thermoplastic resin articles 2*a* and 2*b* on the core (mandrel) 1 from its opposite ends and positions the thermoplastic resin articles 2*a* and 2*b* such that their end faces abut against each other (Step S1). Then, the thermoplastic resin articles 2*a* and 2*b* (work 9) are placed in the V-shaped groove 14*b* of the movable base 14*a*, shown in FIG. 1, and are held in position by the clamp 14*c*. Under the control of the feed controller 20, the movable base 14*a* is moved toward the hole 12*a* of the heating unit 12 by the drive motor 18 and the feed screw 19, and the core 1 is inserted at one end into the hole 12*a* of the heating unit 12 (Step S2), as shown in FIG. 3. The feed controller 20 repeatedly determines whether the abutting faces A have been detected or not until the abutting faces A are detected by the position sensor 15 (No in Step S3). When the abutting faces A are detected by the position sensor 15 (Yes in Step S3) as illustrated in FIG. 6A, the feed controller 20 causes the drive motor 18 to feed the abutting faces A to a predetermined position, that is, the midpoint of the pressurizing tube 4 as illustrated in FIG. 6B (Step S4).

When the predetermined position is reached by the abutting faces A, the feed controller 20 stops the drive motor 18, and the pressure controller 22 drives the pump 5. As a result, the pressure in the cavity 3*a* rises, and after a lapse of time t1 shown in FIG. 7, the abutting faces A and their vicinities are compressed and gripped with the first pressure (P1) by the pressurizing tube 4 (Step S5). That is, the pressurizing tube 4 narrows in directions perpendicular to the axis of the core 1, namely, in radially inward directions as shown in FIG. 8A, and the inner wall of the pressurizing tube 4 compresses the abutting faces A and their adjoining portions of the thermoplastic resin articles 2a and 2b. At this time, the abutting faces A of the thermoplastic resin articles 2a and 2b are first pressed against each other on the core 1. Thus, although the abutting faces A of the thermoplastic resin articles 2a and 2b are compressed with a greater force, relative position between the pressurizing tube 4 as the compressor and the surface of a welding part of the thermoplastic resin articles 2a and 2b remains unchanged, so that the abutting faces A are not displaced. Since the first pressure (P1) is low, the opposite end portions of the pressurizing tube 4 remain separated from the core 1, leaving a gap perpendicular to the axis of the core 1. Consequently, air present between the pressurizing tube 4 and the thermoplastic resin articles 2a and 2b is forced out from the opposite ends of the pressurizing tube 4, as indicated by small outline arrows (B) in FIG. 8B. Also, air voids including very small ones are expelled from between the core 1 and the thermoplastic resin articles 2a and 2b.

Subsequently, the heating controller 23 controls the heating power supply to start heating the core 1 by the high-frequency induction coil 6. Heat of the core 1 is transferred to the thermoplastic resin articles 2a and 2b, so that the thermoplastic resin articles 2a and 2b begin to soften (Step S6).

Figure 7:
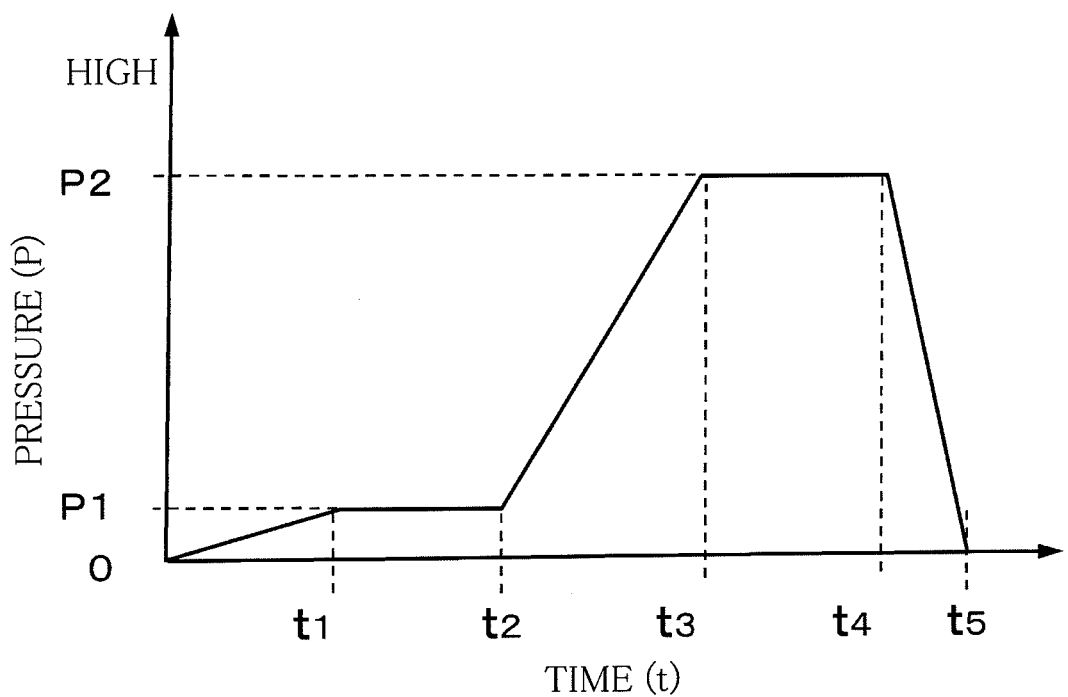
FIG. 7 is a graph illustrating change in pressure applied by a compressor of the thermoplastic resin welding device according to the first embodiment of the present invention.
Figure 8A:
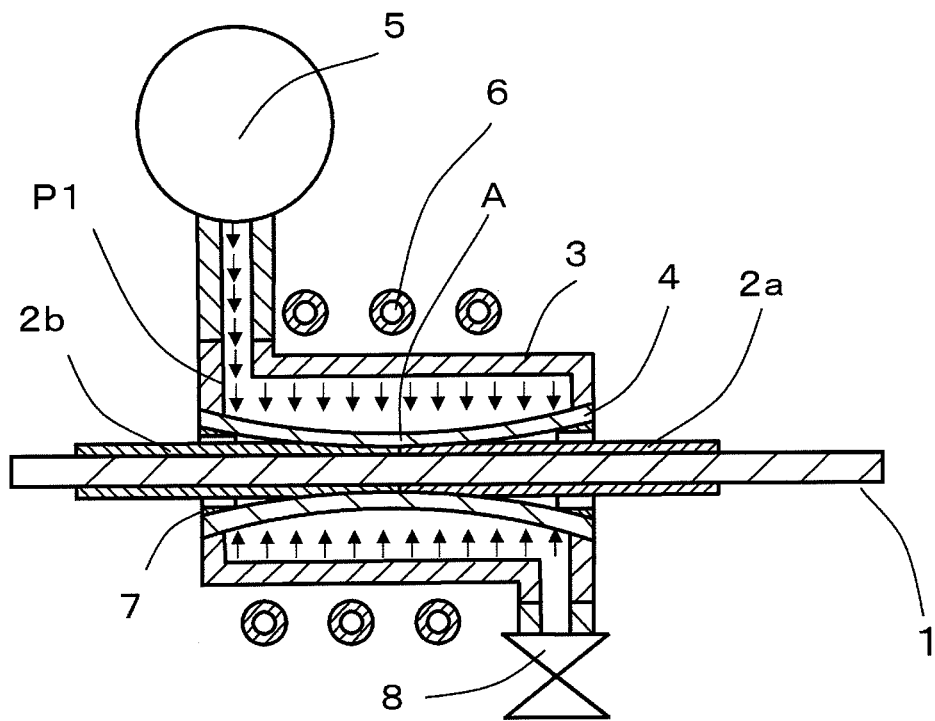
FIG. 8A is a sectional view illustrating a state in which a first pressure is applied to the compressor in the heating unit according to the first embodiment of the present invention, to compress a welding part to be welded, that is, abutting faces and their vicinities of the thermoplastic resin articles.
Figure 8B:
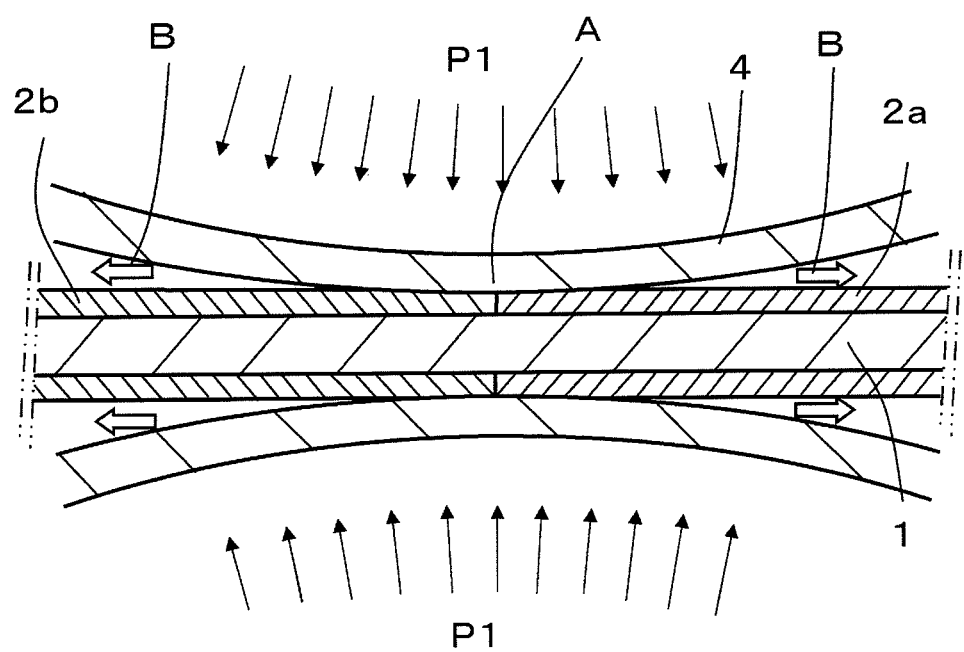
FIG. 8B is an enlarged sectional view illustrating the state in which the first pressure is applied to the compressor in the heating unit according to the first embodiment of the present invention, to compress the welding part, namely, the abutting faces and their vicinities of the thermoplastic resin articles.
Figure 9A:
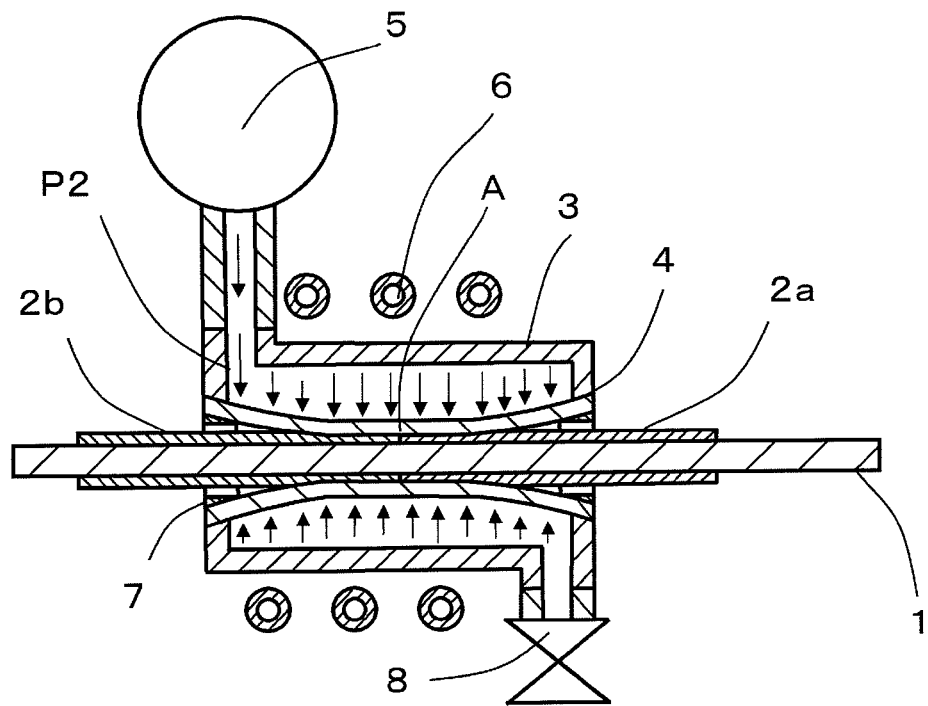
FIG. 9A is a sectional view illustrating a state in which a second pressure is applied to the compressor in the heating unit according to the first embodiment of the present invention, to extend a compressed region along the axis of the core.
Figure 9B:
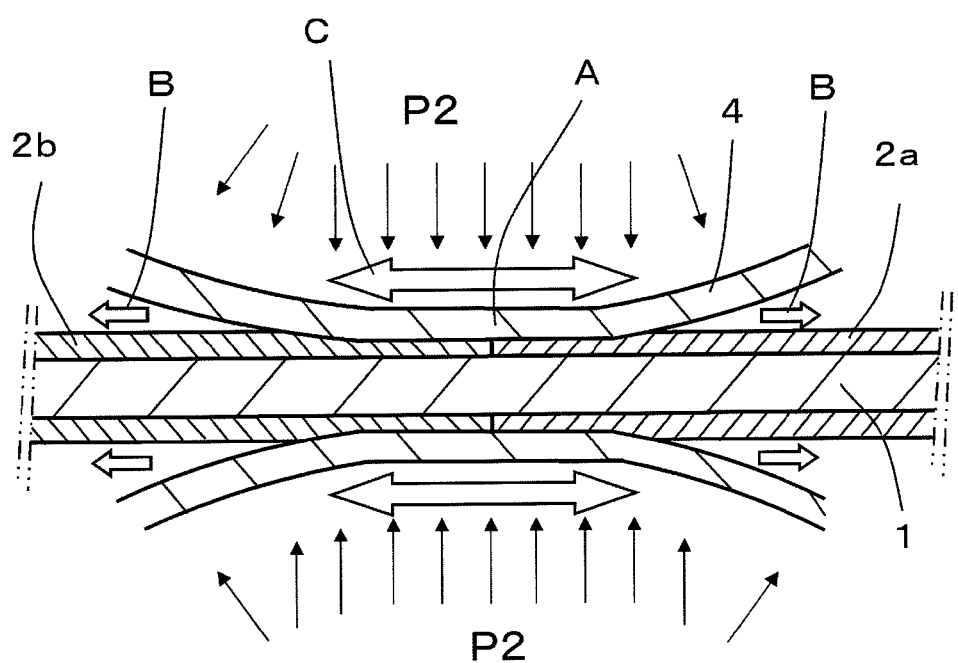
FIG. 9B is an enlarged sectional view illustrating a state of the abutting faces and their vicinities of the thermoplastic resin articles compressed with the second pressure by the compressor of the heating unit according to the first embodiment of the present invention.

At time t2 in FIG. 7 after a lapse of a fixed time, the pressure controller 22 starts to increase the pressure, and the pressure is continuously increase until the second pressure (P2) is reached (at time t3 in FIG. 7). Thus, as shown in FIG. 9A, the compressed region is extended, as indicated by outline arrows (C) in FIG. 9B. Specifically, as shown in the enlarged sectional view of FIG. 9B, the compressed region where the inner wall of the pressurizing tube 4 presses the surfaces of the thermoplastic resin articles 2a and 2b extends in both directions along the axis of the core 1 from the middle toward the opposite ends of the pressurizing tube 4. This action is equivalent to "squeezing" the surfaces of the thermoplastic resin articles 2a and 2b from the abutting faces toward the opposite ends, and therefore, air voids present between the pressurizing tube 4 and the thermoplastic resin articles 2a and 2b, including very small air voids, are forced out from the opposite ends of the pressurizing tube 4. Also, air voids present between the core 1 and the thermoplastic resin articles 2a and 2b, including very small air voids, are expelled as well (Step S7).

The core 1 is continuously heated thereafter with the pressure kept at the second pressure (P2), and this permits the abutting faces A of the thermoplastic resin articles 2a and 2b to be welded together with a smooth weld surface free of pinholes. After the thermoplastic resin articles are satisfactorily welded together, the heating controller 23 stops heating the core (Step S8).

As for the heating start timing, the heating may be started while the pressure is being increased from the first pressure (P1) to the second pressure (P2) or when the pressure reaches the second pressure (P2). For example, in FIG. 7, the heating may be started at any time between time t2 and time t3 or may be started at a later time than time t3.

In the flowchart of FIG. 5, Step S5 "Grip With First Pressure" is followed by Step S6 "Start Heating" and Step S7 "Raise Pressure to Second Pressure, and Extend Compressed Region for Squeezing". The point here is that Step S5 is executed before Steps S6 and S7, and Steps S6 and S7 may be reversed in order or may be executed concurrently. The heating may be started at an appropriate time best suited for various conditions such as the material and thickness of the thermoplastic resin articles 2a and 2b. The same applies to the heating stop timing.

Figure 10A:
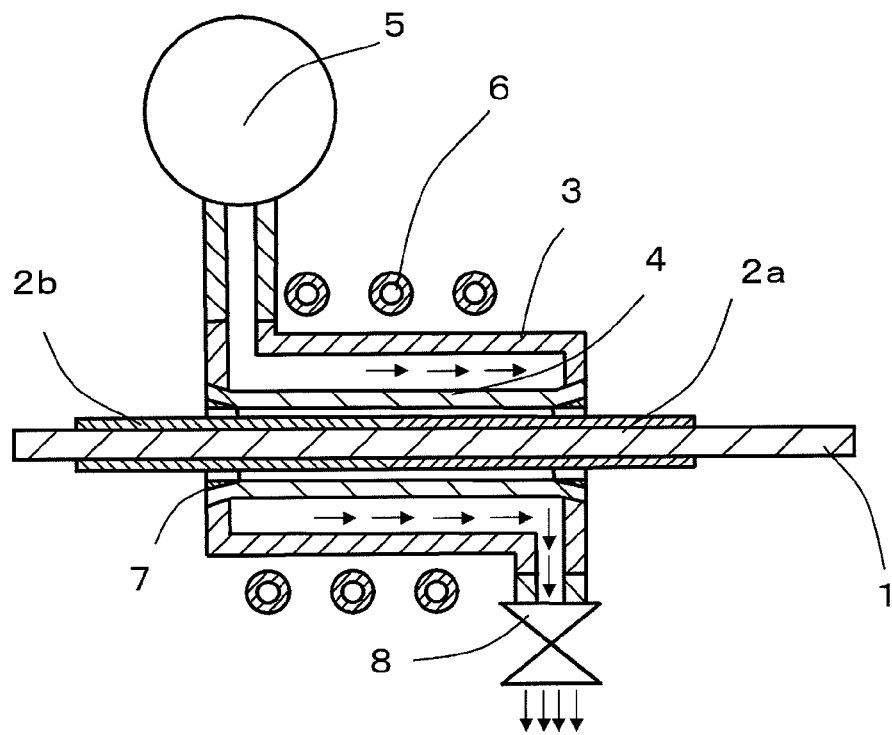
FIG. 10A is a sectional view illustrating a state in which the pressure applied to the compressor in the heating unit according to the first embodiment of the present invention is lowered to stop compression of the work.

After the welding, the pressure controller 22 opens the valve 8 (at time t4 in FIG. 7) as illustrated in FIG. 10A, to discharge the heated air and lower the pressure. When the pressure of the compressor becomes zero (at time t5 in FIG. 7), the pressurizing tube 4 recovers its original shape and separates from the thermoplastic resin articles 2a and 2b. The heated air is discharged and fresh low-temperature air is fed into the cavity 3a by the pump 5, whereby the pressurizing tube 4 and the hollow housing 3 are quickly cooled.

Figure 10B:
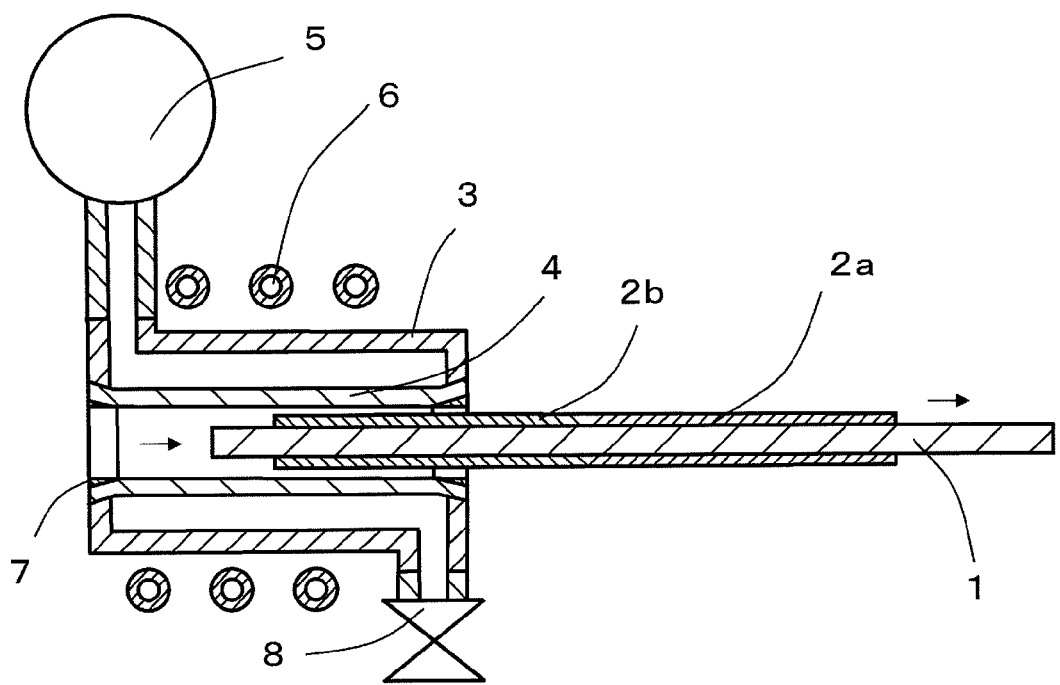
FIG. 10B is a sectional view illustrating a state in which the distal end portion of the work is being pulled out of the compressor in the heating unit according to the first embodiment of the present invention.
Figure 11A:
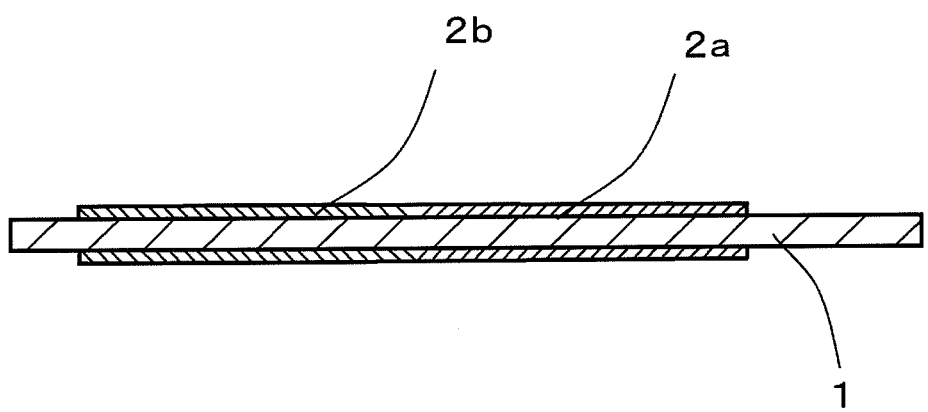
FIG. 11A is a sectional view of the work taken out of the heating unit of the first embodiment of the present invention after completion of butt welding.
Figure 11B:
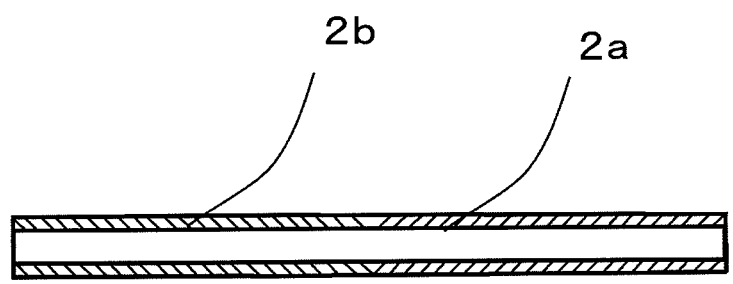
FIG. 11B is a sectional view of a thermoplastic resin tube obtained by butt welding according to the present invention.

In the state illustrated in FIG. 10B, the thermoplastic resin articles 2a and 2b are no longer compressed by the compressor, and accordingly, the thermoplastic resin articles 2a and 2b and the core 1 can be pulled out with a small force. Then, the thermoplastic resin articles 2a and 2b and the core 1 are detached from the carriage 14 as shown in FIG. 11A, and the core 1 is removed as shown in FIG. 11B, whereby a welded thermoplastic resin tube is obtained (Step S9).

In the above explanation, the two tubular thermoplastic resin articles 2a and 2b are fitted on the core 1 from its opposite ends and the end faces of the thermoplastic resin articles 2a and 2b are butted against each other and welded together. Also in the case where the two thermoplastic resin articles 2a and 2b are fitted on the core 1 from its opposite ends and the end portions of the thermoplastic resin articles 2a and 2b are lapped one over the other, the overlaps of the thermoplastic resin articles 2a and 2b can be welded in like manner.

In the welding device and method of the present invention wherein butt welding or lap welding is performed on thermoplastic resin articles, the thermoplastic resin articles 2a and 2b are heated while the surfaces thereof are "squeezed" from the central welding part toward the opposite ends, whereby (a) a smooth weld surface free of pinholes can be obtained. Also, the "compressor" is configured such that the pressure in the internal cavity 3a is adjusted to compress the thermoplastic resin articles 2a and 2b by the pressurizing tube 4 having flexibility, and therefore, (b) the pressure with which the welding part is compressed can be set as desired. After the welding, the pressure in the cavity 3a of the "compressor" is released and fresh air is introduced into the cavity 3a, whereby (c) the compressor such as the pressurizing tube can be cooled quickly after the welding. Further, since the core 1 is heated, (d) it is possible to carry out internal heating which is suited for such a combination of thermoplastic resin articles 2a and 2b that the melting point of the outside article is lower than that of the inside article. The pressing unit constituted by the hollow housing 3, the pressurizing tube 4 and the retainers 7 can be easily attached to and detached from the welding device, whereby (e) the pressing unit of the welding device can be replaced with ease.

In the aforementioned pressurization method, the compressor utilizes air pressure by way of example. If necessary, pressure of other gases such as inert gas may be used, and the same effects can be obtained also in the case where pressure of liquid such as oil or water is used. The gas or liquid to be used may be at room temperature or may be heated in advance to high temperature. Where the gas or liquid heated in advance to high temperature is used, the thermoplastic resin articles to be welded can be heated both from inside and outside, and this makes it possible to weld thermoplastic resin articles with large thickness in a short time. In this manner, the pressurization method may be appropriately modified as needed.

Also, in the above description, a straight metal rod is exemplified as the core. Where necessary, a curved or bent core may be used, and the pressurizing tube may be configured to expand and contract following the shape of the core.

Figure 12:
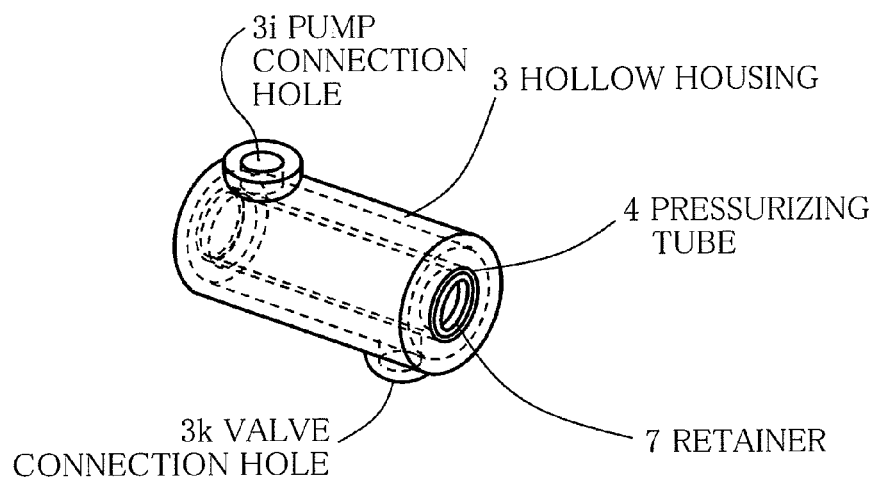
FIG. 12 is a perspective view of the pressing unit for the thermoplastic resin welding device according to the first embodiment of the present invention.
Figure 13:
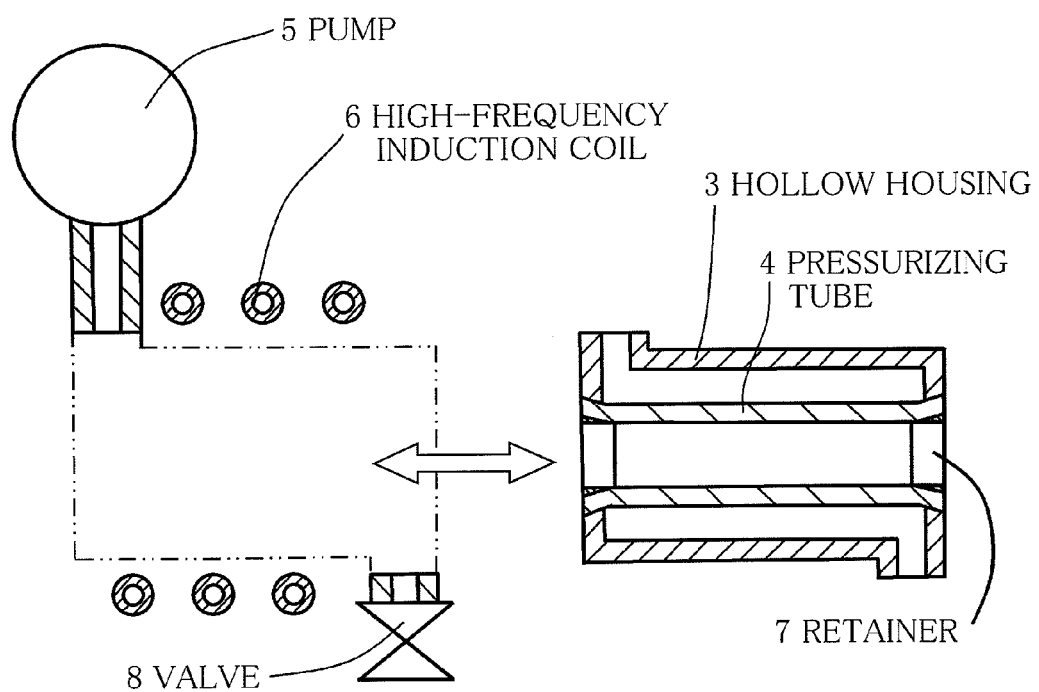
FIG. 13 is a sectional view illustrating a state in which the pressing unit of the thermoplastic resin welding device according to the first embodiment of the present invention is detached from a pump and a valve.

In the above embodiment of the present invention, the hollow housing 3 having the pressurizing tube 4 fixed to the through hole 3*h* by the retainers 7 is connected to the pump 5 and the valve 8, as shown in the perspective view of FIG. 4. FIG. 12 is a perspective view illustrating an external appearance of the assembly comprising the retainers 7, the pressurizing tube 4 and the hollow housing 3. Pressing units of which the hollow housing 3 has the same outer shape as that illustrated in FIG. 12 and of which the pressurizing tube 4 has a different inner diameter or a different thickness or is made of a different material may be prepared for replacement. As illustrated in FIG. 13, the pressing unit may be detached from the pump 5 and the valve 8 and may be replaced with a different pressing unit, in which case various thermoplastic resin articles can be welded using various pressing units having different dimensions or made of different materials.

Although the foregoing embodiment uses both of the pump 5 for generating fluid pressure and the valve 8 for discharging the fluid to lower the pressure, the valve 8 may be omitted. Pumps include a type which allows fluid to escape and thereby lowers pressure as soon as operation thereof is stopped, and such a pump may be used as the pump 5 because it is capable of raising the pressure to the first and second pressures (P1, P2), discharging the fluid and reducing the pressure by itself. In this case, the hollow housing 3 is provided with the through hole 3*h* and the pump connection hole 3*i*, and the valve connection hole 3*k* is omitted.

Also, as a method of fixing the pressurizing tube 4 to the through hole 3*h* of the hollow housing 3, a configuration may be employed such that the pressurizing tube 4 is directly bonded or welded to the hollow housing 3 beforehand, thus making it unnecessary to use the retainers 7.

Further, a fluid heating-heat retaining unit may be arranged upstream or downstream of the pump 5, to heat the fluid to a predetermined temperature and feed the heated fluid by the pump 5.

(Second Embodiment of the Present Invention)

Figure 14A:
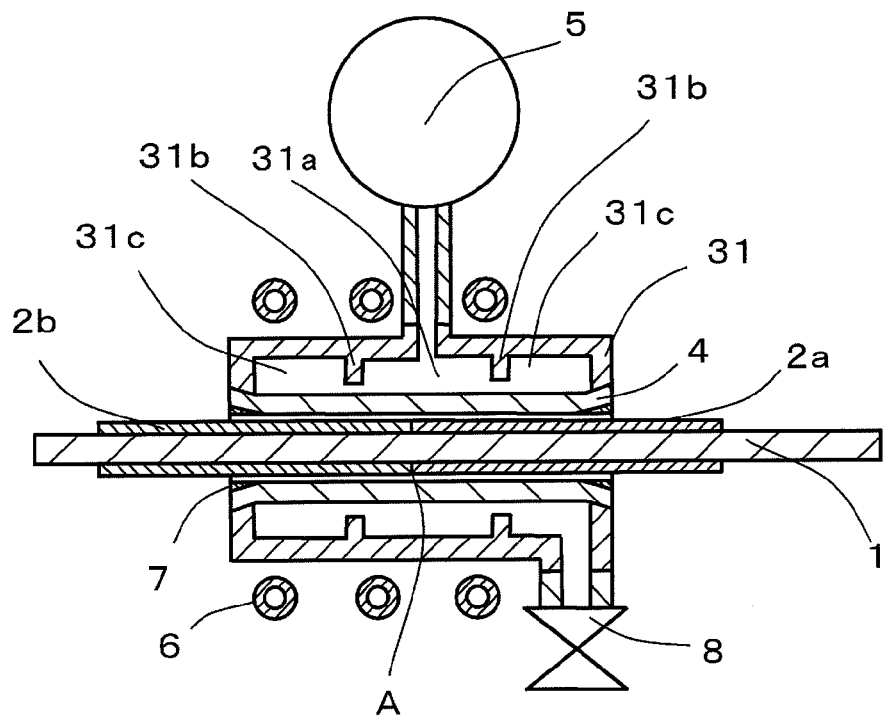
FIG. 14A is a sectional view illustrating the internal structure of a heating unit of a welding device for thermoplastic resin articles according to a second embodiment of the present invention, as well as the positional relationship between the heating unit and a work.
Figure 14B:
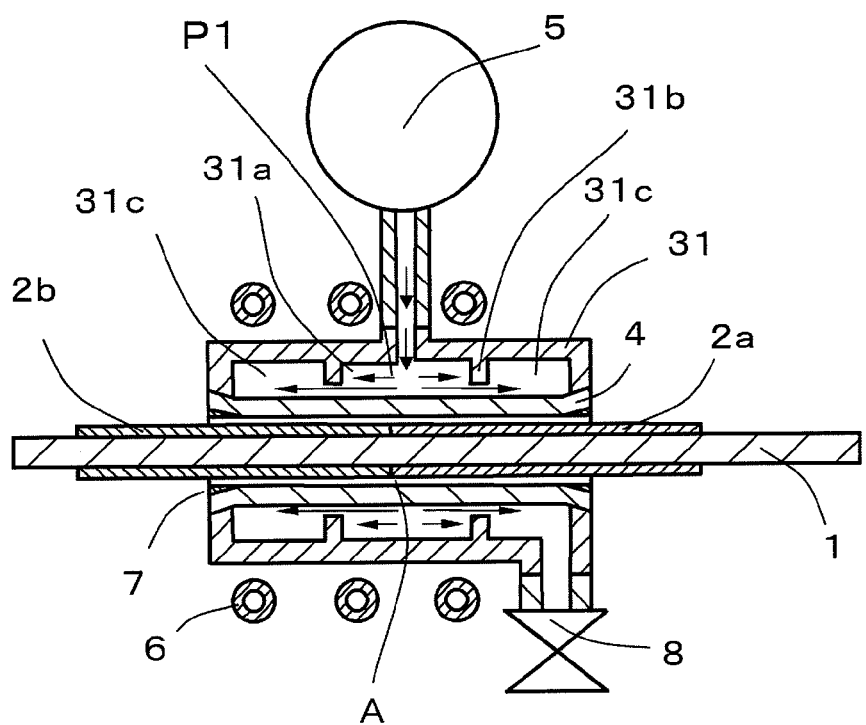
FIG. 14B is a sectional view illustrating a state in which application of pressure to a compressor in the heating unit according to the second embodiment of the present invention is started.

FIGS. 14A and 14B illustrate the internal structure of a heating unit of a welding device for thermoplastic resin articles according to a second embodiment of the present invention, as well as the positional relationship between the heating unit and a work. The thermoplastic resin welding device according to the second embodiment of the present invention is characterized in that partition walls 31*b* for adjusting pressure distribution are formed on the inner wall of a hollow housing 31 of the compressor. Like reference signs are used to denote like parts appearing in the first embodiment, and description of such parts is omitted.

As illustrated in FIG. 14A, the partition walls 31*b* protrude from the inner wall of the hollow housing 31 of the compressor in radial directions of the core 1, that is, in directions perpendicular to the axis of the core 1. The interior of the hollow housing 31 is divided into three spaces by the partition walls 31*b*. In the second embodiment, the pump connection hole is formed in an axially central portion of the hollow housing 31. A central space 31*a* (cavity) connected directly to the pump 5 serves as a high-pressure air chamber into which air directly flows from the pump 5, and right and left spaces 31*c*, 31*c* (cavities) serve as low-pressure air chambers into each of which the air in the high-pressure air chamber 31*a* flows through a gap between the partition wall 31*b* and the outer peripheral surface of the pressurizing tube 4.

FIG. 14B illustrates a state in which air pressure has begun to be applied to the compressor of the heating unit according to the second embodiment of the present invention. Since the partition walls 31*b* are formed on the inner wall of the hollow housing 31 of the compressor, the pressurizing tube 4 first presses portions of the thermoplastic resin articles 2*a* and 2*b* around the abutting faces A even for a short period of time and, with the abutting faces A compressed in close contact with each other, squeezes the thermoplastic resin articles 2*a* and 2*b* from the vicinities of the abutting faces A outward. Consequently, the core 1 and the thermoplastic resin articles 2*a* and 2*b* are brought into close contact with each other at the welding part, that is, at the abutting faces A and their vicinities of the thermoplastic resin articles 2*a* and 2*b*, and air voids (gas voids), including very small ones, are removed. The thermoplastic resin articles 2*a* and 2*b* held in such a state are heated, whereby the thermoplastic resin articles 2*a* and 2*b* can be welded and joined together with a smooth weld surface free of pinholes. In this manner, the second embodiment can provide advantageous effects similar to those obtained by the foregoing embodiment.

In the second embodiment illustrated in FIGS. 14A and 14B, the interior of the hollow housing 31 is divided by the two partition walls 31*b*, 31*b* into three spaces, but a desired number of partition walls 31*b* may be provided to divide the interior of the hollow housing 31 into a desired number of spaces as needed.

(Third Embodiment of the Present Invention)

Figure 15A:
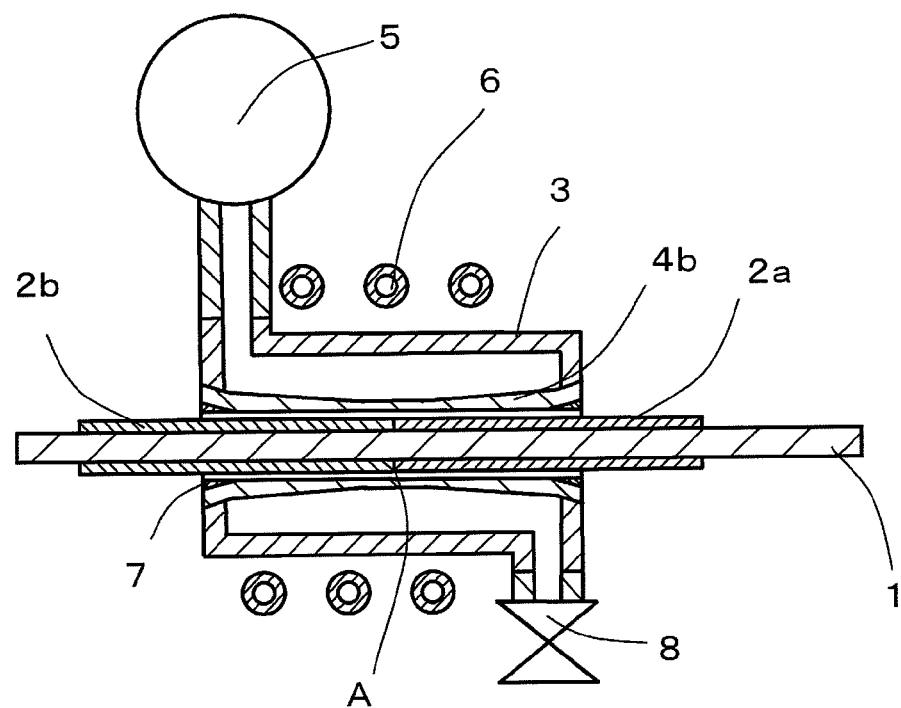
FIG. 15A is a sectional view illustrating the internal structure of a heating unit of a welding device for thermoplastic resin articles according to a third embodiment of the present invention, as well as the positional relationship between the heating unit and a work.
Figure 15B:
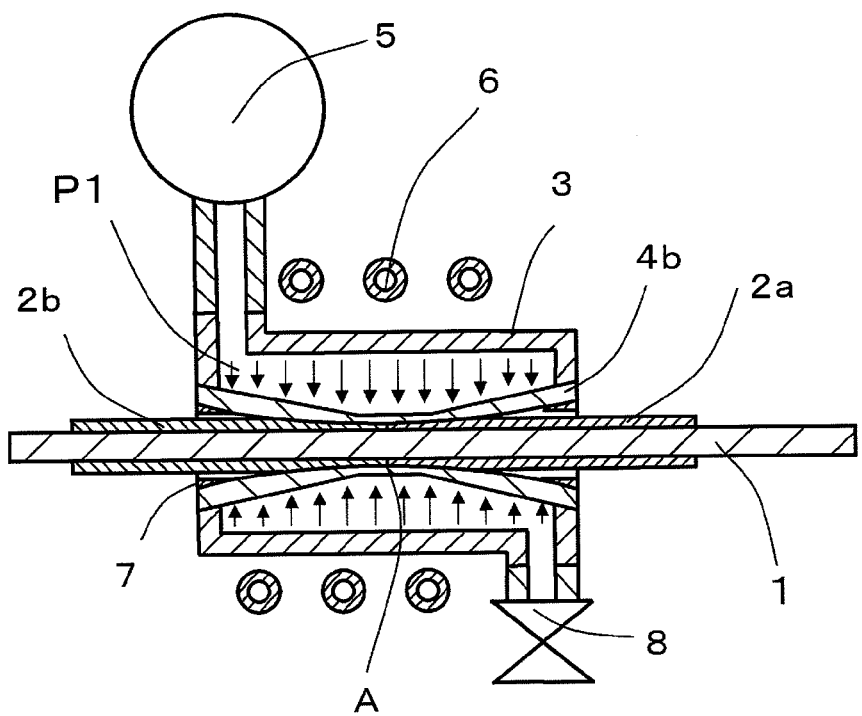
FIG. 15B is a sectional view illustrating a state in which pressure is applied to a compressor in the heating unit according to the third embodiment of the present invention.

FIGS. 15A and 15B illustrate the internal structure of a heating unit of a welding device for thermoplastic resin articles according to a third embodiment of the present invention, as well as the positional relationship between the heating unit and a work. The thermoplastic resin welding device according to the third embodiment of the present invention is characterized in that a pressurizing tube 4*b* of the compressor has a greater thickness at its opposite end portions and a smaller thickness at its middle portion. Like reference signs are used to denote like parts appearing in the foregoing embodiments, and description of such parts is omitted.

As seen from FIG. 15A, the thickness of the pressurizing tube 4*b* is increased at the opposite end portions and is reduced at the middle portion. The pressurizing tube 4*b* is an elastic tube made of, for example, silicone rubber. Thus, a tube portion with a greater thickness is less liable to be deformed, and a tube portion with a smaller thickness is more liable to be deformed. When pressure is applied by the pump 5, the inner diameter of the middle portion with a small thickness narrows first, so that the abutting faces A and their vicinities of the thermoplastic resin articles 2*a* and 2*b* are compressed first. Then, with the abutting faces A of the thermoplastic resin articles 2*a* and 2*b* compressed in close contact with each other, the pressurizing tube 4*b* squeezes the thermoplastic resin articles 2*a* and 2*b* from the vicinities of the abutting faces A outward, with the result that the compressed region extends axially outward. The core 1 and the thermoplastic resin articles 2*a* and 2*b* are brought into close contact with each other at the welding part, that is, at the abutting faces A and their vicinities of the thermoplastic resin articles 2*a* and 2*b*, and therefore, air voids including very small ones are removed. FIG. 15B illustrates a state in which air pressure is applied to the compressor of the heating unit according to the third embodiment of the present invention. The thermoplastic resin articles held in the illustrated state are heated, whereby the thermoplastic resin articles can be welded and joined together with a smooth weld surface free of pinholes.

In this manner, the third embodiment also can provide advantageous effects similar to those achieved by the foregoing embodiments.

(Fourth Embodiment of the Present Invention)

Figure 16A:
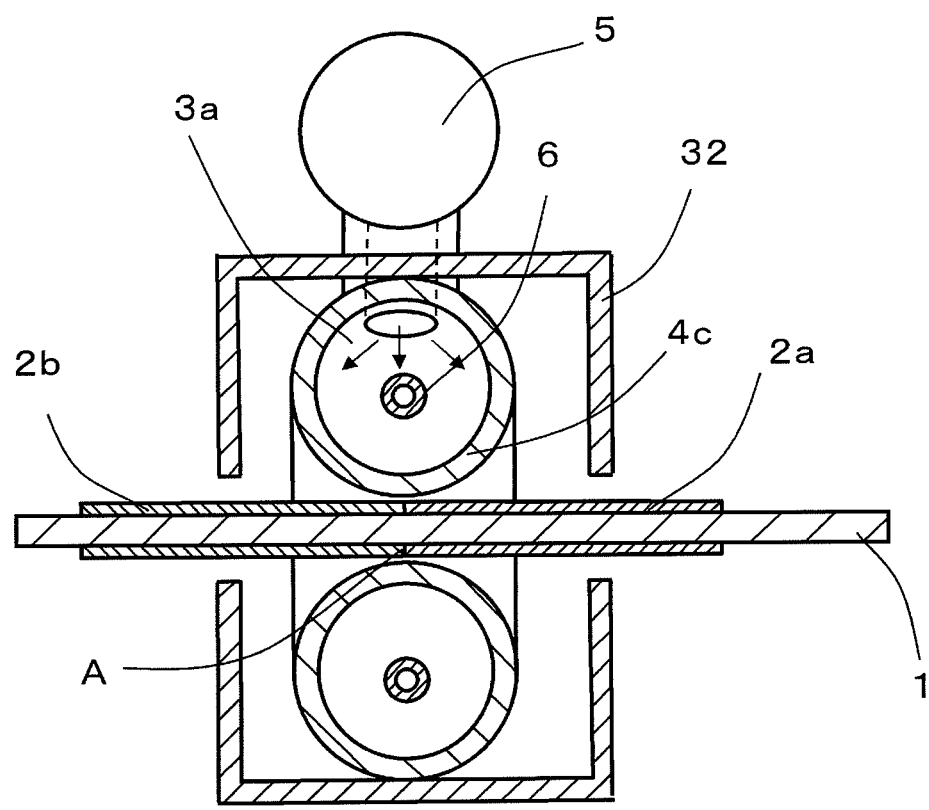
FIG. 16A is a sectional view illustrating the internal structure of a heating unit of a welding device for thermoplastic resin articles according to a fourth embodiment of the present invention, as well as the positional relationship between the heating unit and a work.
Figure 16B:
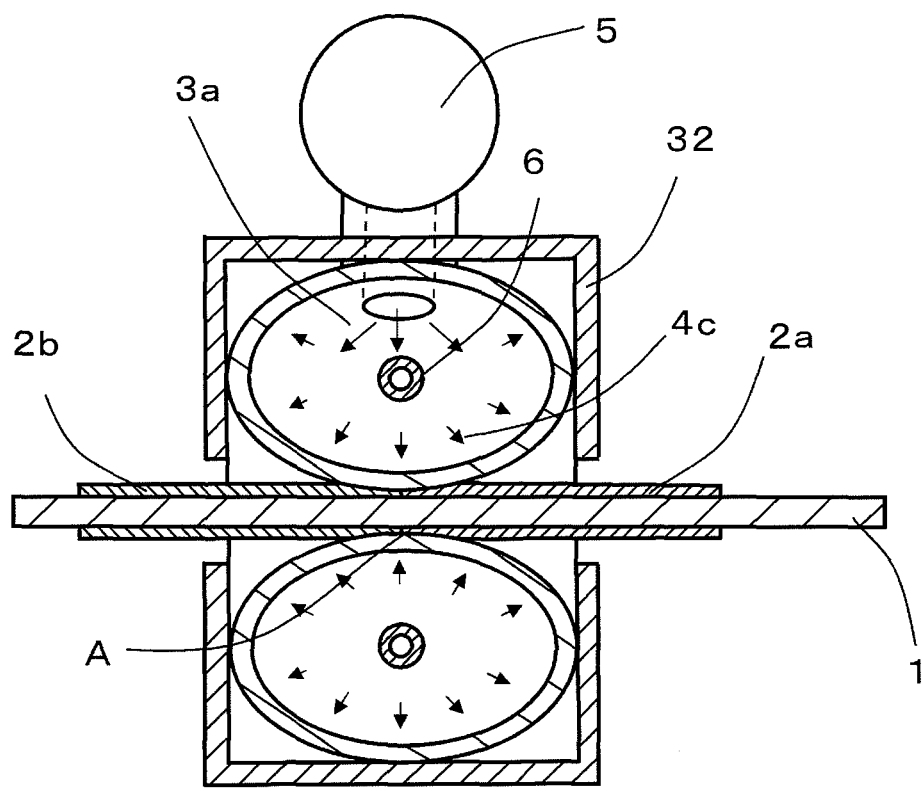
FIG. 16B is a sectional view illustrating a state in which pressure is applied to a compressor in the heating unit according to the fourth embodiment of the present invention.

FIGS. 16A and 16B illustrate the internal structure of a heating unit of a welding device for thermoplastic resin articles according to a fourth embodiment of the present invention, as well as the positional relationship between the heating unit and a work.

In the first to third embodiments described above, the through hole 3h is formed in the hollow housing 3 (31), the pressurizing tube 4 (4b) made of elastic material such as silicone rubber is passed through the through hole 3h, and the ring-shaped retainers 7 each having a wedge-like section are pressed into the respective opposite ends of the pressurizing tube 4 (4b), to fix the pressurizing tube 4 (4b) in the through hole 3h of the hollow housing 3. The thermoplastic resin welding device according to the fourth embodiment of the present invention is characterized in that a pressurizing tube 4c has a shape resembling a doughnut.

In the fourth embodiment of the present invention, the doughnut-shaped pressurizing tube 4c has a small center hole (inner hole), and the thermoplastic resin articles 2a and 2b are passed through the center hole. The doughnut-shaped pressurizing tube 4c has an outer circumferential surface and right and left side surfaces, as viewed in FIGS. 16A and 16B, covered with an annular frame 32 having a rectangular sectional shape and opening radially inward. The frame 32 surrounding the doughnut-shaped pressurizing tube 4c serves as a guide frame for restricting the position of the doughnut-shaped pressurizing tube 4c. In the figures, like reference signs are used to denote like parts appearing in the foregoing embodiments, and description of such parts is omitted.

As illustrated in FIG. 16A, air is fed into the doughnut-shaped pressurizing tube 4c from the pump 5 connected to an outer circumferential portion of the doughnut-shaped pressurizing tube 4c, to increase the internal pressure for expansion. Movement of the outer circumferential portion of the doughnut-shaped pressurizing tube 4c is restricted by the frame 32, so that the center hole narrows and compresses the abutting faces A of the tubular thermoplastic resin articles 2a and 2b. With the thermoplastic resin articles 2a and 2b held in this state, the core 1 is heated by the high-frequency induction coil 6 arranged within the doughnut-shaped pressurizing tube 4c, whereby the thermoplastic resin articles 2a and 2b are heated from inside to be welded together.

FIG. 16B illustrates a state in which air pressure is further applied to the compressor of the heating unit according to the fourth embodiment of the present invention. As seen from the figure, the compressed region created by the doughnut-shaped pressurizing tube 4c extends from the abutting faces A of the thermoplastic resin articles 2a and 2b in both directions along the axis of the core 1. The frame 32 restricts not only the outer circumferential portion but the right and left side surfaces, as viewed in FIG. 16B, of the doughnut-shaped pressurizing tube 4c. The heating is continued until the illustrated state is reached, whereby the thermoplastic resin articles can be welded and joined together with a smooth weld surface free of pinholes. In this manner, the fourth embodiment also can provide advantageous effects similar to those obtained by the foregoing embodiments. In FIGS. 16A and 16B, illustration of the valve is omitted for simplicity's sake.

(Fifth Embodiment of the Present Invention)

Figure 17:
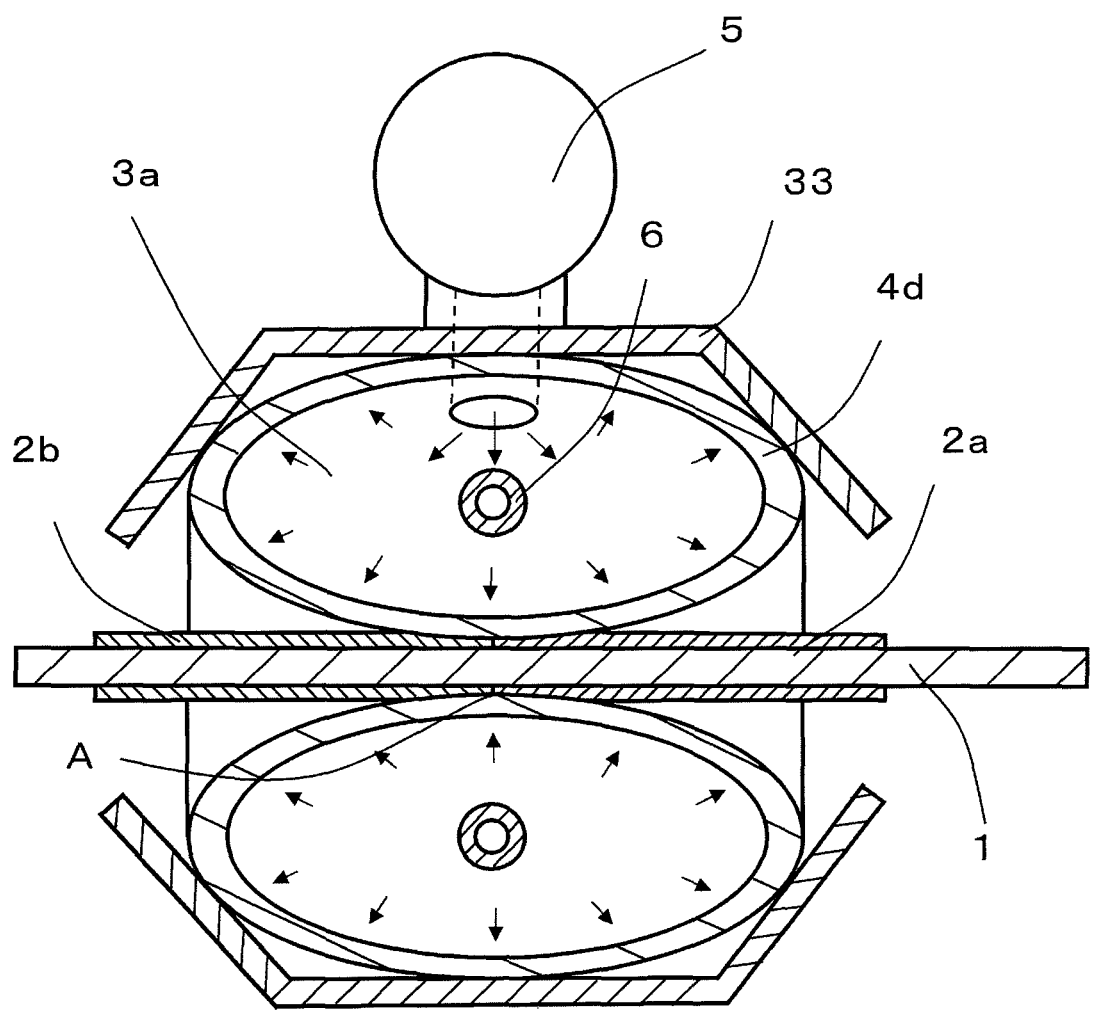
FIG. 17 is a sectional view illustrating a state in which pressure is applied to a compressor in a heating unit of a welding device for thermoplastic resin articles according to a fifth embodiment of the present invention.

FIG. 17 illustrates a state in which air pressure is applied to a compressor of a heating unit of a welding device for thermoplastic resin articles according to a fifth embodiment of the present invention. The thermoplastic resin welding device according to the fifth embodiment of the present invention is characterized in that a doughnut-shaped pressurizing tube 4d has an elliptic cross-sectional shape. Also, a frame 33 has right and left sides widened apart, as shown in FIG. 17, so as to conform to the shape of the doughnut-shaped pressurizing tube 4d. Like the fourth embodiment, pressure is introduced into the doughnut-shaped pressurizing tube 4d so that the pressurizing tube 4d may expand while being restricted by the frame 33, and with the compressed region extended outward along the axis of the core 1, the core 1 is heated, whereby the thermoplastic resin articles can be welded and joined together with a smooth weld surface free of pinholes. In the other respects including the operation and advantageous effects, the fifth embodiment is identical with the fourth embodiment. In FIG. 17, illustration of the valve is omitted for simplicity's sake.

(Sixth Embodiment of the Present Invention)

Figure 18:
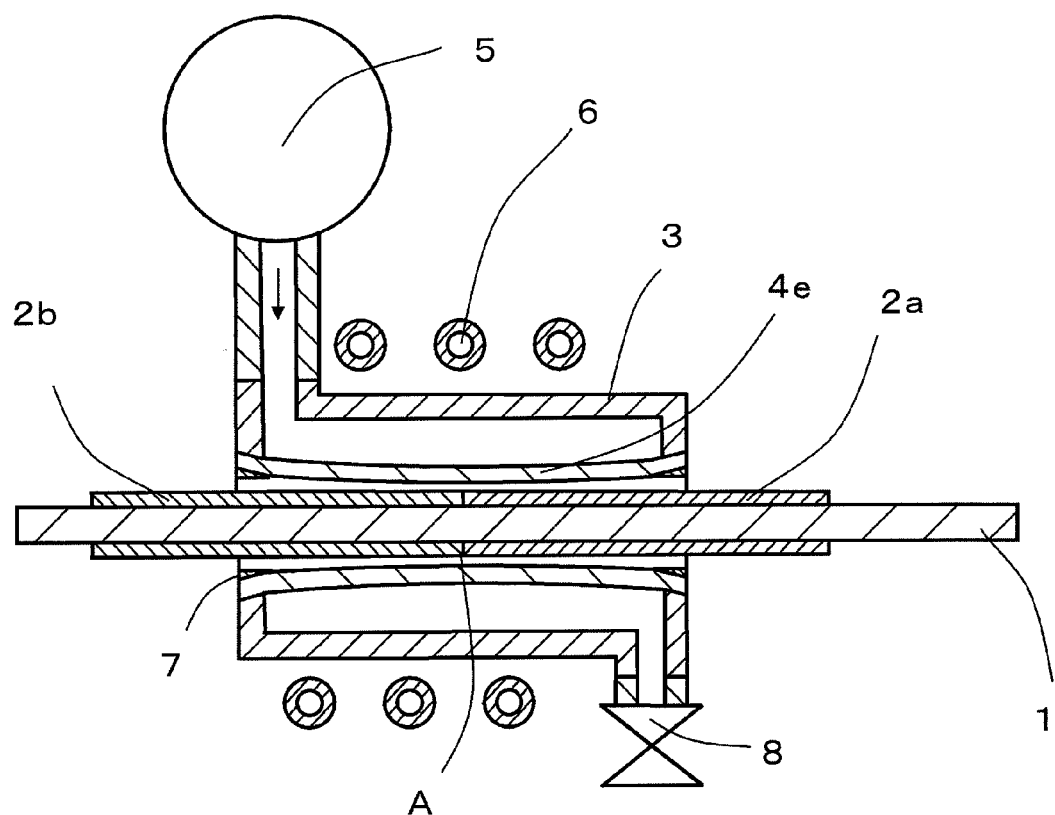
FIG. 18 is a sectional view illustrating the internal structure of a heating unit of a welding device for thermoplastic resin articles according to a sixth embodiment of the present invention, as well as the positional relationship between the heating unit and a work.

FIG. 18 illustrates the internal structure of a heating unit of a welding device for thermoplastic resin articles according to a sixth embodiment of the present invention, as well as the positional relationship between the heating unit and a work. The thermoplastic resin welding device according to the sixth embodiment of the present invention is characterized in that a pressurizing tube 4e has a shape obtained by cutting out a part of the doughnut-shaped pressurizing tube of the above fourth or fifth embodiment around the center hole.

In the sixth embodiment of the present invention, the pressurizing tube 4e is formed so as to have a shape obtained by cutting out a part of the doughnut-shaped pressurizing tube around the center hole, that is, an inwardly convex sectional shape, and the compressor is constructed by hermetically attaching the pressurizing tube 4e to the through hole of the hollow housing 3 similar to the one used in the first embodiment, and connecting the pump 5 and the valve 8 to the hollow housing 3. Then, the high-frequency induction coil 6 is arranged around the hollow housing 3 to constitute a heating unit. The sixth embodiment is identical in basic configuration to the first embodiment and differs therefrom in the shape of the pressurizing tube 4e.

Air is fed into the space between the hollow housing 3 and the pressurizing tube 4e to increase the internal pressure and thereby reduce the diameter of the hole of the pressurizing tube 4e, whereupon the narrowed middle portion of the pressurizing tube 4e first compresses the abutting faces A and their adjoining surfaces of the tubular thermoplastic resin articles 2a and 2b. The compressed region then extends in both directions along the axis of the core 1. With the thermoplastic resin articles 2a and 2b compressed in this manner, the core 1 is heated by the high-frequency induction coil 6 to heat the thermoplastic resin articles 2a and 2b from inside, whereby the thermoplastic resin articles 2a and 2b can be welded and joined together with a smooth weld surface free of pinholes. Accordingly, the sixth embodiment also can provide advantageous effects similar to those obtained by the foregoing embodiments.

The shape of the pressurizing tube 4e has only to be one obtained by cutting out the inner wall of the doughnut-shaped pressurizing tube, and the thickness thereof need not be uniform as illustrated in FIG. 18. The pressurizing tube 4e shown in FIG. 18 may have a uniform (identical) outer diameter (outer periphery) and thus, a semicircular sectional shape. Alternatively, the pressurizing tube 4e shown in FIG. 18 may have a non-uniform, varying outer diameter. By making the pressurizing tube 4e in FIG. 18 have a thickness varying in the axial direction of the core 1, it is possible to set as needed the timing and pressure for compressing the abutting faces A and their adjoining surfaces of the thermoplastic resin articles $2a$ and $2b$.

(Seventh Embodiment of the Present Invention)

Figure 19A:
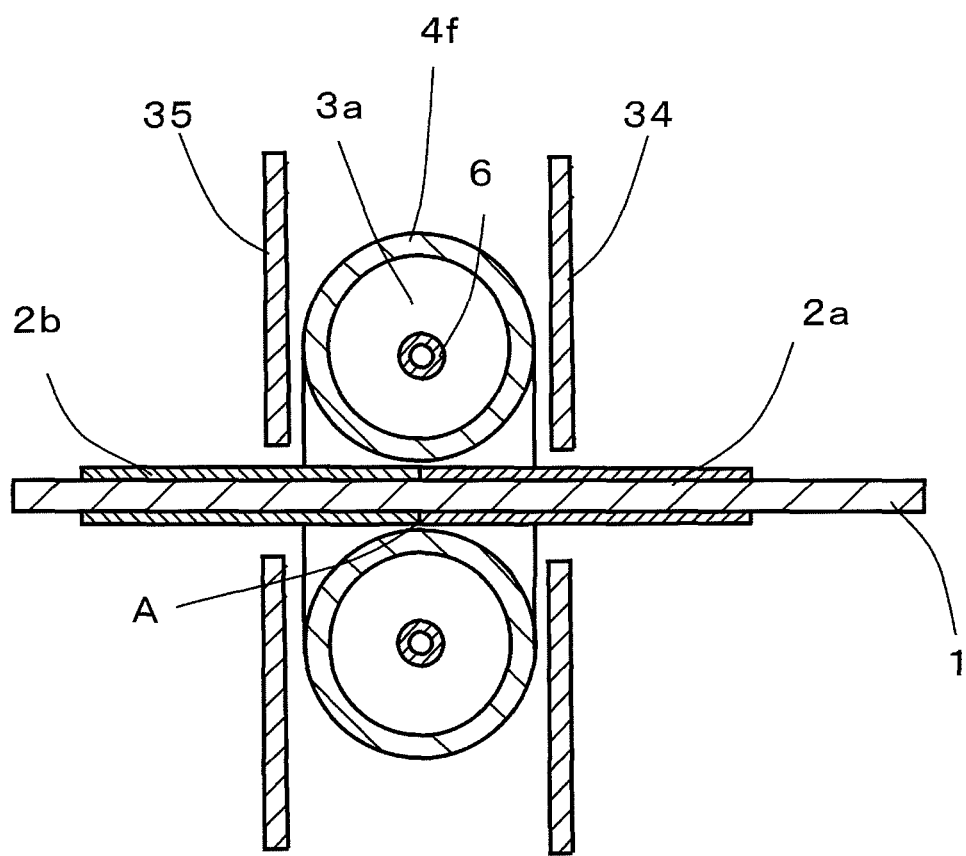
FIG. 19A is a sectional view illustrating the positional relationship between a heating unit of a welding device for thermoplastic resin articles according to a seventh embodiment of the present invention and a work.
Figure 19B:
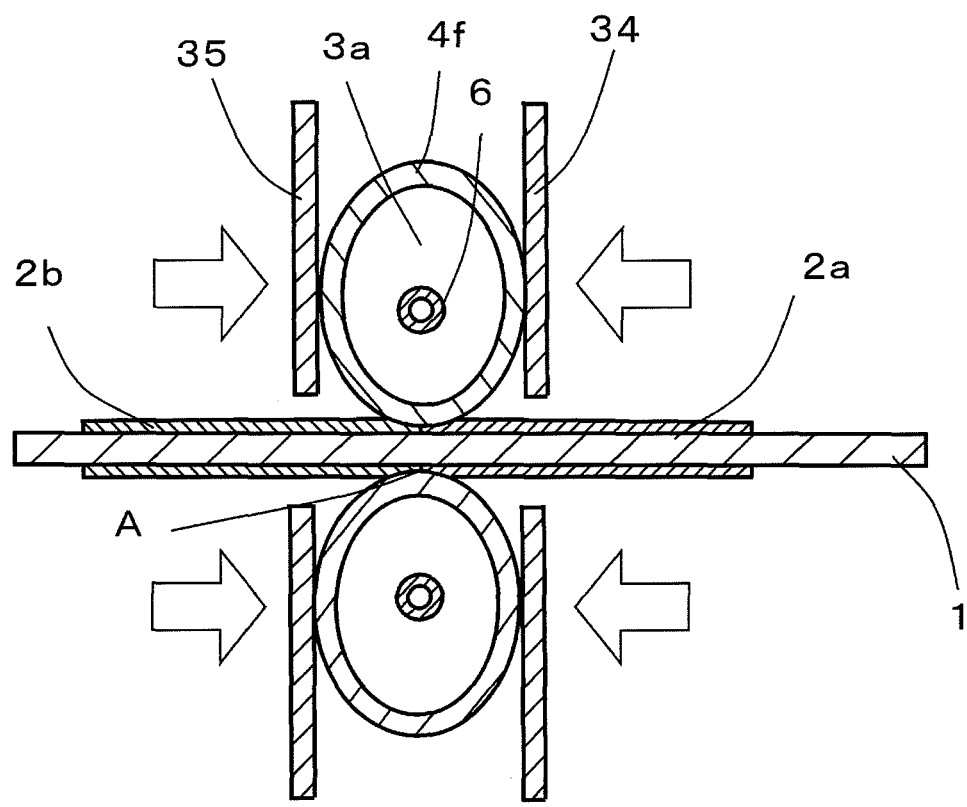
FIG. 19B is a sectional view illustrating a state in which a pressurizing tube of the thermoplastic resin welding device according to the seventh embodiment of the present invention is pushed from both sides inward along the axis of the pressurizing tube.

FIGS. 19A and 19B illustrate the positional relationship between a heating unit of a welding device for thermoplastic resin articles according to a seventh embodiment of the present invention and a work.

As illustrated in FIG. 19A, the thermoplastic resin welding device according to the seventh embodiment of the present invention is characterized in that a doughnut-shaped pressurizing tube $4f$ is mechanically compressed by pressing members 34 and 35 in directions along the axis of the core 1, to reduce the diameter of the center hole.

FIG. 19B illustrates a state in which the doughnut-shaped pressurizing tube $4f$ of the thermoplastic resin welding device according to the seventh embodiment of the present invention is applied with pressure in directions along the axis of the core 1 by the pressing members 34 and 35. The doughnut-shaped pressurizing tube $4f$ is held between and compressed by the pressing members 34 and 35 to increase the pressure in the doughnut-shaped pressurizing tube $4f$ and reduce the diameter of the center hole, so that the abutting faces A of the thermoplastic resin articles $2a$ and $2b$ are compressed. Then, the doughnut-shaped pressurizing tube $4f$ is further compressed to increase the internal pressure, and with the compressed region extended outward along the axis of the core 1, the core 1 is heated by the high-frequency induction coil 6 arranged within the doughnut-shaped pressurizing tube $4f$, whereby the thermoplastic resin articles can be welded and joined together with a smooth weld surface free of pinholes.

Although a unit for cooling the pressurizing tube $4f$ constituting the compressor is not illustrated in FIGS. 19A and 19B, air is blown against the compressor such as the pressurizing tube $4f$ after the welding, to quickly cool the compressor.

(Eighth Embodiment of the Present Invention)

Figure 20A:
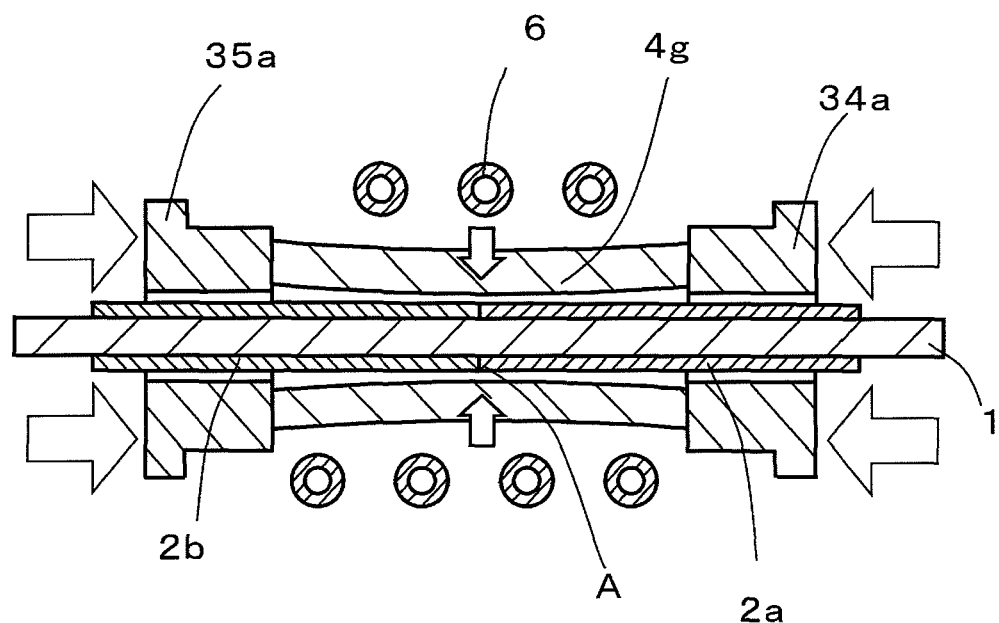
FIG. 20A is a sectional view illustrating the positional relationship between a heating unit of a welding device for thermoplastic resin articles according to an eighth embodiment of the present invention and a work.
Figure 20B:
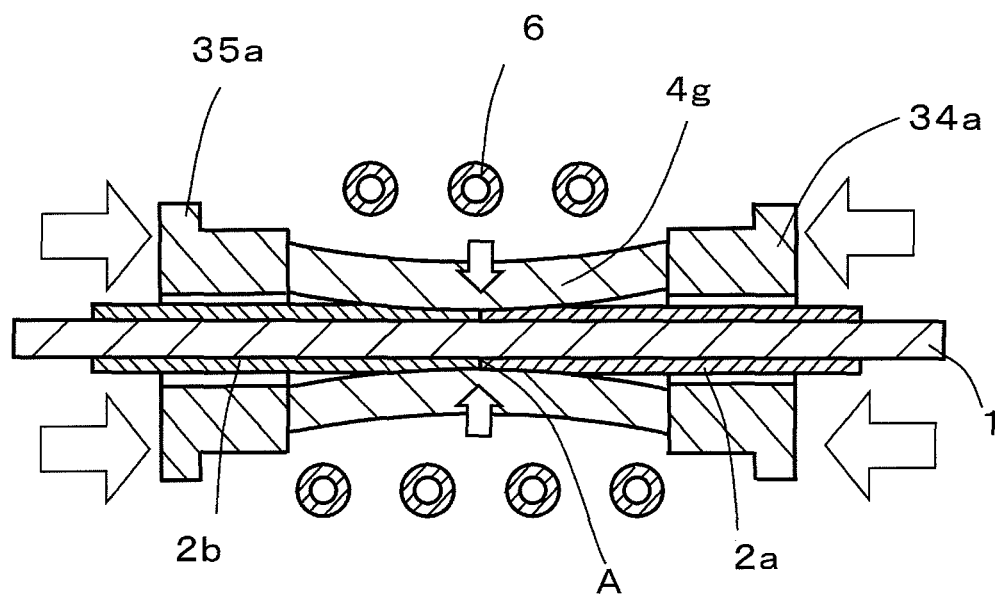
FIG. 20B is a sectional view illustrating a state in which a pressurizing tube of the thermoplastic resin welding device according to the eighth embodiment of the present invention is pushed from both sides inward along the axis of the pressurizing tube.

FIGS. 20A and 20B illustrate the positional relationship between a heating unit of a welding device for thermoplastic resin articles according to an eighth embodiment of the present invention and a work. The thermoplastic resin welding device according to the eighth embodiment of the present invention is characterized in that a pressurizing tube $4g$ has a shape obtained by cutting out a part in the vicinity of the center hole of the doughnut-shaped pressurizing tube $4f$ of the thermoplastic resin welding device according to the aforementioned seventh embodiment of the present invention, as illustrated in FIG. 20A, that the right and left ends of the pressurizing tube $4g$, as viewed in FIGS. 20A and 20B, are attached to pressing members $34a$ and $35a$, respectively, and that the high-frequency induction coil 6 is arranged around the pressurizing tube $4g$. In the eighth embodiment of the present invention, the pressurizing tube $4g$ is compressed by the pressing members $34a$ and $35a$ such that the pressurizing tube $4g$ is mechanically applied with pressure from both sizes in directions along the axis of the core 1, whereby the abutting faces A and their vicinities of the thermoplastic resin articles can be compressed and welded.

FIG. 20B illustrates a state in which the pressurizing tube $4g$ of the thermoplastic resin welding device according to the eighth embodiment of the present invention is axially compressed by the pressing members $34a$ and $35a$. With the pressurizing tube thus applied with pressure to extend the compressed region outward along the axis of the core 1, the core 1 is heated, whereby the thermoplastic resin articles can be welded and joined together with a smooth weld surface free of pinholes.

Since the heater is arranged in the close vicinity of the surface of the pressurizing tube $4g$ as shown in FIGS. 20A and 20B, a suitable heat generator may be used to heat the outside of the pressurizing tube $4g$, if necessary, instead of heating the core 1 by the high-frequency induction coil 6.

Although a unit for cooling the pressurizing tube $4g$ constituting the compressor is not illustrated in FIGS. 20A and 20B, air is blown against the compressor such as the pressurizing tube $4g$ after the welding, to quickly cool the compressor.

(Ninth Embodiment of the Present Invention)

Figure 21A:
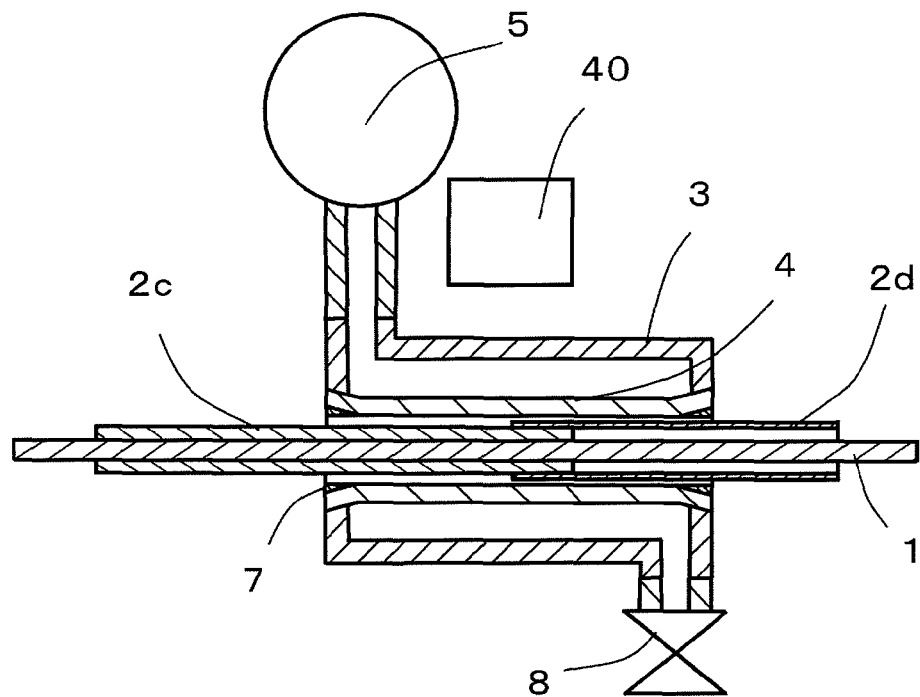
FIG. 21A is a sectional view illustrating the positional relationship between a heating unit of a welding device for thermoplastic resin articles according to a ninth embodiment of the present invention and a work.
Figure 21B:
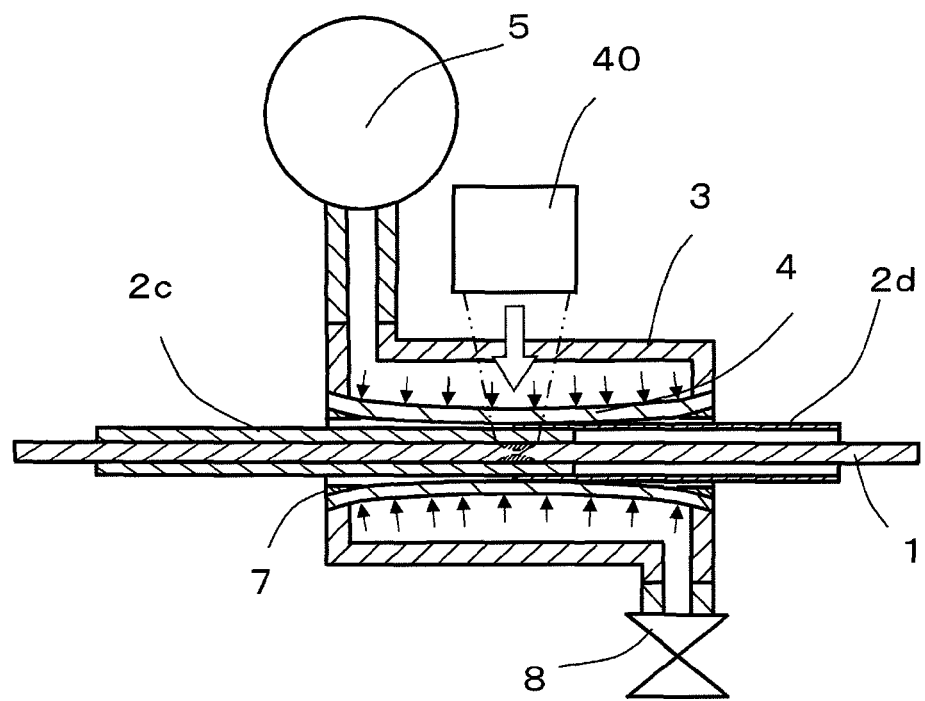
FIG. 21B is a sectional view illustrating a state in which pressure is applied to a heating unit of the thermoplastic resin welding device according to the ninth embodiment of the present invention.

FIGS. 21A and 21B illustrate the positional relationship between a heating unit of a welding device for thermoplastic resin articles according to a ninth embodiment of the present invention and a work. The thermoplastic resin welding device according to the ninth embodiment of the present invention is characterized in that a laser heating unit 40 is used as the heater. The hollow housing 3, the pressurizing tube 4 and thermoplastic resin articles $2c$ and $2d$ are made of materials that transmit a laser beam therethrough so that the core 1 can be heated by the transmitted laser beam. With the core 1 kept rotating, the laser beam is radiated onto the surface of the core 1, whereupon the core 1 is heated, with the result that the thermoplastic resin articles $2c$ and $2d$ fitted on the core 1 are melted and welded together.

In the ninth embodiment, the thermoplastic resin articles $2c$ and $2d$ overlapping each other are welded. In the illustrated example, the right thermoplastic resin article $2d$ as viewed in FIGS. 21A and 21B constitutes an outer tube, and the distal end of the outer tubular thermoplastic resin article $2d$ is positioned at the midpoint of the pressurizing tube 4.

Method of welding thermoplastic resin articles by radiating a laser beam thereto is described in detail in Japanese Patent Application No. 2011-512335 filed by the applicant hereof. For details, reference should be made to the same document.

FIG. 21B illustrates a state in which a laser beam is emitted from the laser heating unit 40 with pressure applied to a compressor of the thermoplastic resin welding device according to the ninth embodiment of the present invention. As shown in the figure, with the thermoplastic resin articles $2c$ and $2d$ compressed by the pressurizing tube 4 applied with pressure as in the first embodiment, the laser beam is radiated onto a position corresponding to the distal end of the thermoplastic resin article $2d$. Consequently, the core 1 is heated by the laser beam, and the thermoplastic resin articles $2c$ and $2d$ can be welded at the welding part and joined together with a smooth weld surface free of pinholes.

Figure 22A:
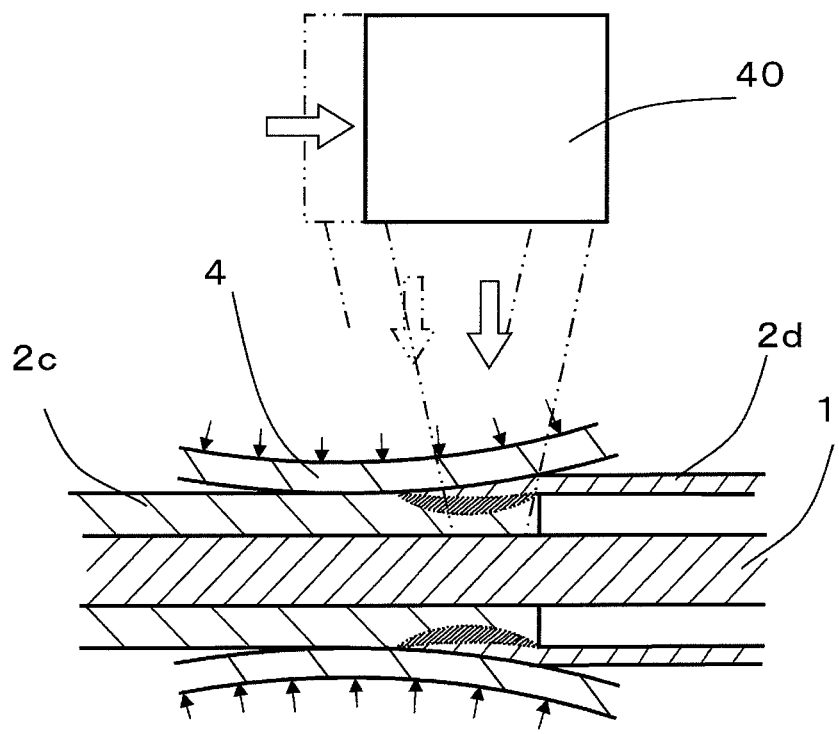
FIG. 22A is a sectional view illustrating the positional relationship between a laser heating unit, which is a heater of the thermoplastic resin welding device according to the ninth embodiment of the present invention, and the work.

FIG. 22A illustrates the positional relationship between the laser heating unit of the thermoplastic resin welding device according to the ninth embodiment of the present invention and a work. In FIG. 22A, the laser heating unit 40 is being moved in the axial direction. Thus, as illustrated in FIG. 22A, the laser heating unit 40 is moved from left to right, as viewed in FIG. 22A, such that the center of the laser beam moves from the position corresponding to the distal end of the outer tubular thermoplastic resin article $2d$ to a position corresponding to the distal end of the inner tubular thermoplastic resin article $2d$. Since the laser heating unit 40 is thus moved in the axial direction, the core 1 is heated over an extended range, whereby the weld surface can be made smoother.

Figure 22B:
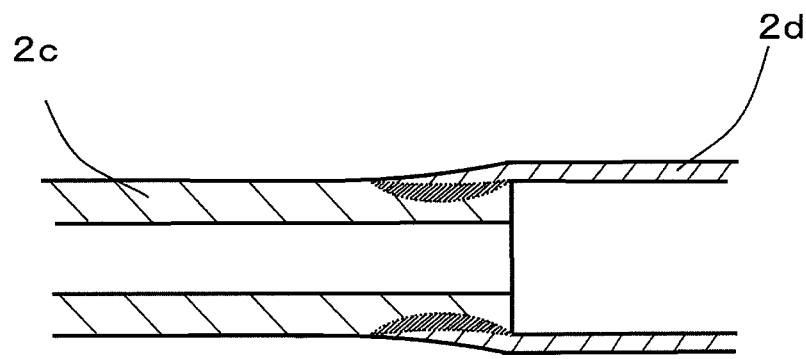
FIG. 22B is a sectional view of a thermoplastic resin tube welded by the thermoplastic resin welding device according to the ninth embodiment of the present invention.

FIG. 22B is a sectional view of a thermoplastic resin tube welded by the welding device according to the ninth embodiment of the present invention. Since the distal end of the outer tubular thermoplastic resin article $2d$ is positioned at the midpoint of the pressurizing tube 4, the pressurizing tube 4 compresses the outer tube while squeezing the same from the distal end toward the proximal end, so that the welded part has such a shape that the outer diameter thereof smoothly enlarges from the surface of the inner tube to the surface of the outer tube without a level difference at the distal end of the outer tube. Accordingly, the ninth embodiment also can provide advantageous effects similar to those obtained by the foregoing embodiments.

Figure 23:
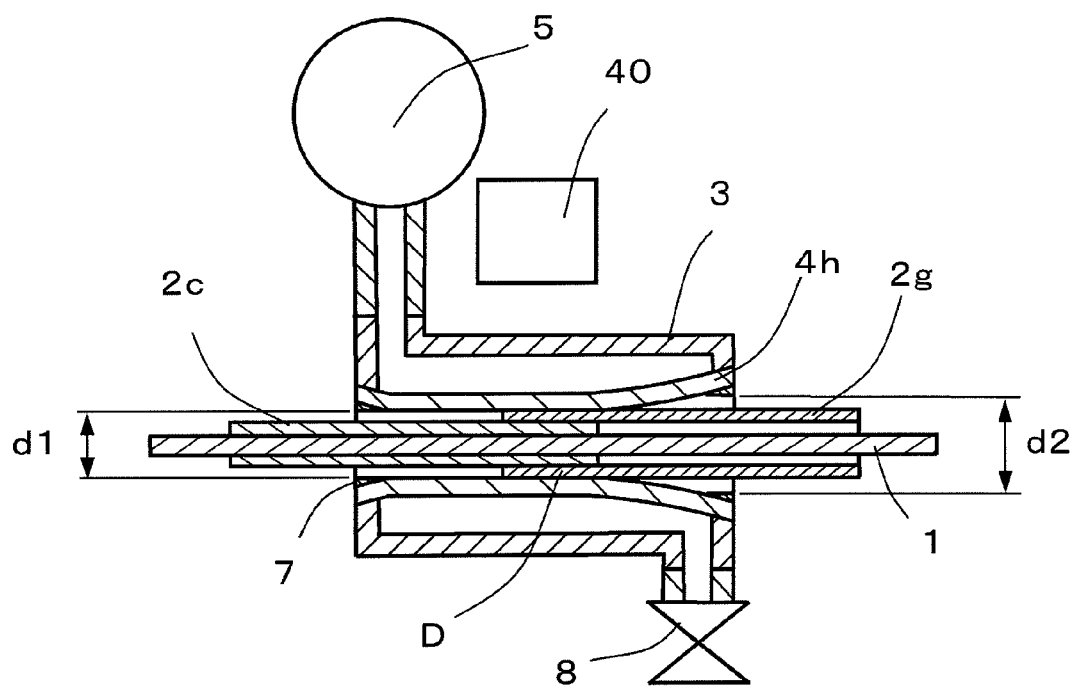
FIG. 23 is a sectional view illustrating the positional relationship between a laser heating unit, which is another heater of the thermoplastic resin welding device according to the ninth embodiment of the present invention, and the work.

FIGS. 21A to 22B illustrate an exemplary case where the thermoplastic resin article 2c with a large thickness and the thermoplastic resin article 2d with a small thickness are overlapped and welded together. In the case of welding large-thickness thermoplastic resin articles 2c and 2g overlapping each other, a pressurizing tube 4h shown in FIG. 23 may be employed of which the diameter is small (d1) at one end and large (d2) at the other.

Alternatively, tubular thermoplastic resin articles with an equal outer diameter may be butted against each other to be welded together. Also in this case, the thermoplastic resin articles can be welded at the welding part and joined together with a smooth weld surface free of pinholes.

In the embodiments described above, the high-frequency induction coil and the laser heating unit are exemplified as the heater, but some other suitable heater may be used as the case may be.

(Tenth Embodiment of the Present Invention)

Figure 24A:
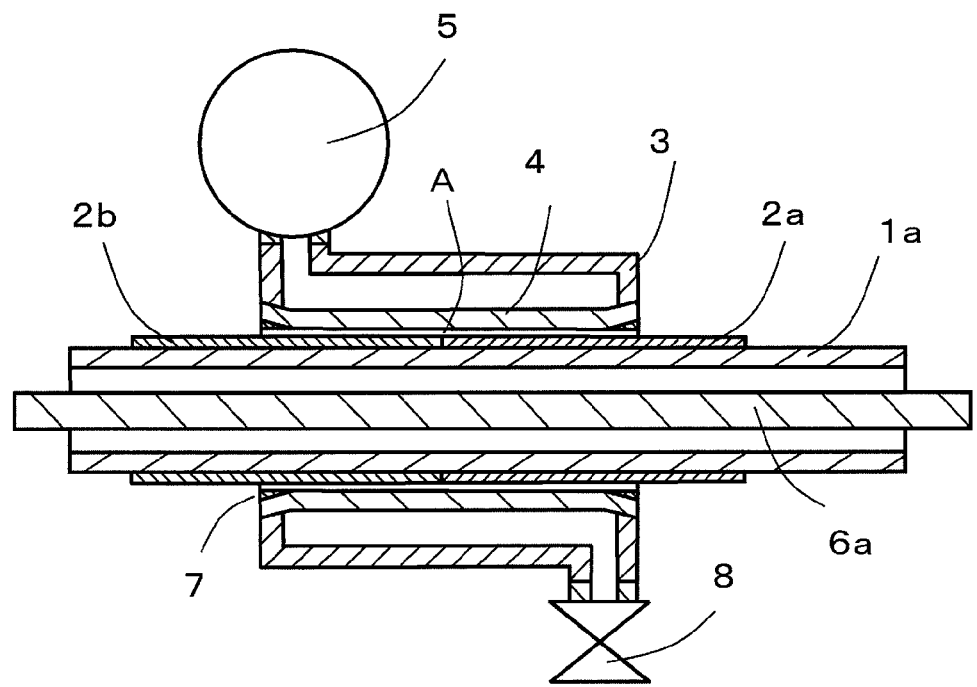
FIG. 24A is a sectional view illustrating the positional relationship between a heating unit of a welding device for thermoplastic resin articles according to a tenth embodiment of the present invention and a work.
Figure 24B:
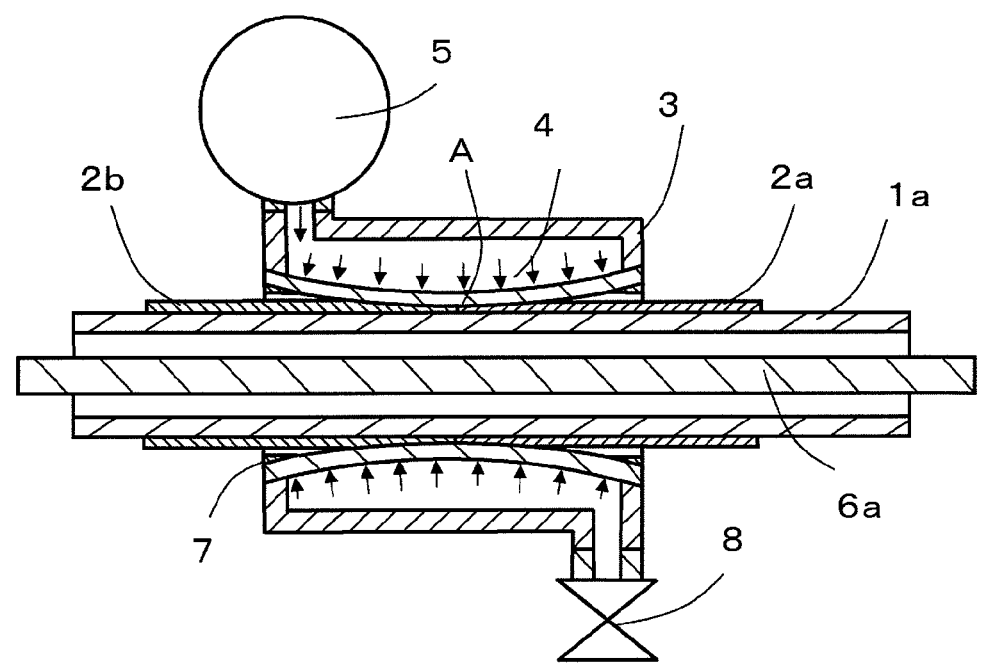
FIG. 24B is a sectional view illustrating a state in which pressure is applied to the heating unit of the thermoplastic resin welding device according to the tenth embodiment of the present invention.

FIGS. 24A and 24B illustrate the positional relationship between a heating unit of a welding device for thermoplastic resin articles according to a tenth embodiment of the present invention and a work. The thermoplastic resin welding device according to the tenth embodiment of the present invention is characterized in that as shown in FIG. 24A, a tubular core 1a is used as the core and that a heater 6a is arranged in the hollow of the tubular core 1a. In this embodiment of the present invention, the tubular core 1a is used to support the thermoplastic resin articles 2a and 2b with a large diameter, and with the welding part kept compressed, the thermoplastic resin articles are heated and welded together.

FIG. 24B illustrates a state in which the space between the hollow housing 3 and the pressurizing tube 4 of the thermoplastic resin welding device according to the tenth embodiment of the present invention is applied with pressure by the pump 5. The pressurizing tube 4 is thus applied with pressure, and with the compressed region extended outward along the axis of the core 1a, the core 1a is heated from within by the heater 6a, whereby the thermoplastic resin articles 2a and 2b can be welded and joined together with a smooth weld surface free of pinholes. In this manner, the tenth embodiment also can provide advantageous effects similar to those achieved by the foregoing embodiments. The heater 6a may be a high-frequency induction coil, sheathed heater or the like.

(Eleventh Embodiment of the Present Invention)

In the aforementioned first to tenth embodiments of the present invention, butt welding is performed on tubular thermoplastic resin articles whose end faces are axially butted against each other, or lap welding is performed on tubular thermoplastic resin articles overlapping each other. The present invention can also be applied to butt welding of a spirally wound sheet- or plate-like thermoplastic resin article.

Figure 25:
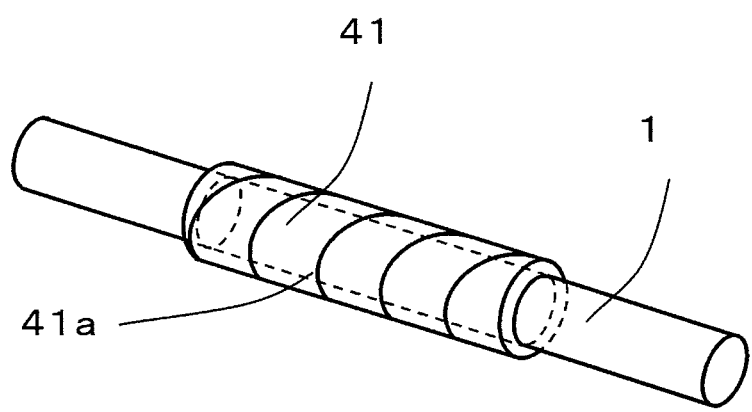
FIG. 25 illustrates a core and a thermoplastic resin article spirally wound on the core, according to an eleventh embodiment of the present invention.
Figure 26:
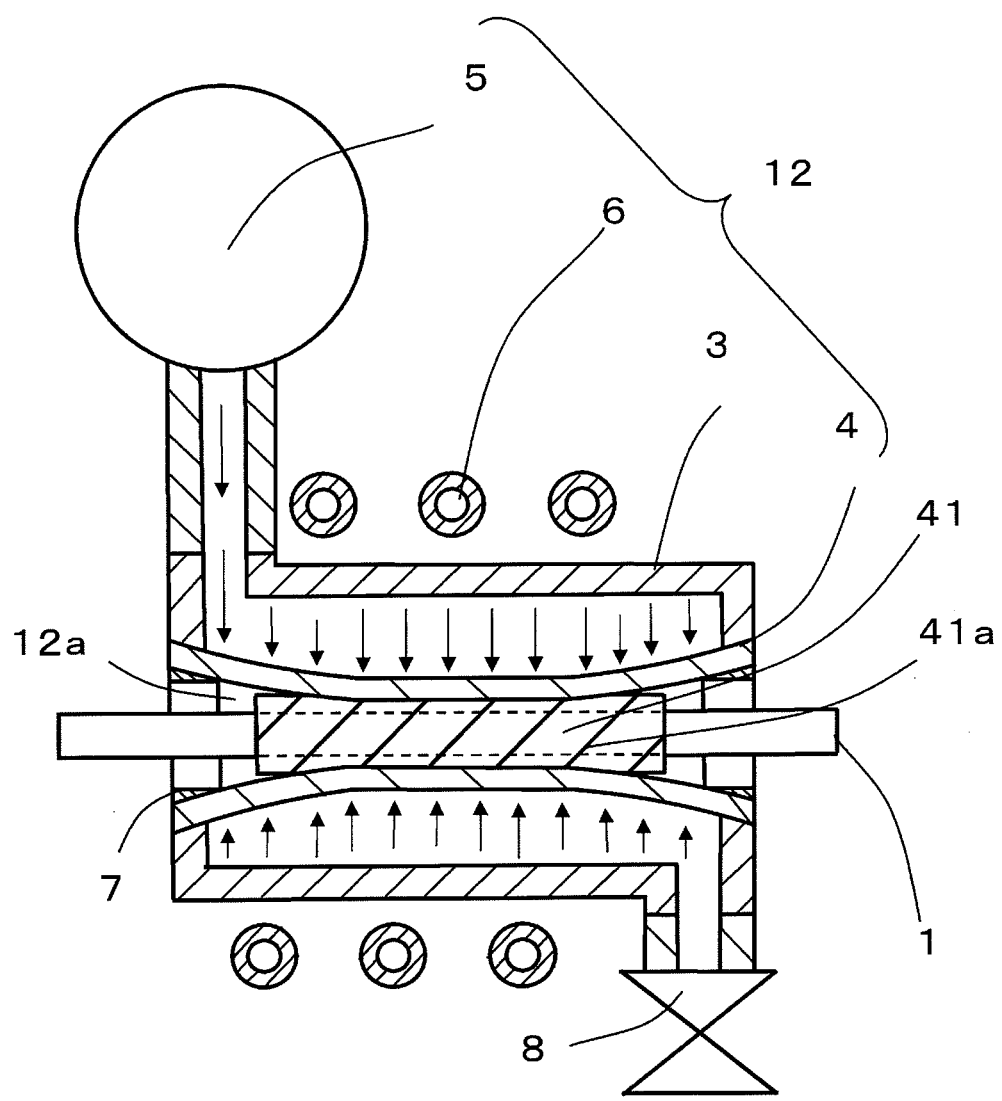
FIG. 26 is a sectional view illustrating a state in which pressure is applied to a heating unit of a welding device for thermoplastic resin articles according to the eleventh embodiment of the present invention.

In the eleventh embodiment of the present invention, a sheet-like narrow thermoplastic resin article 41 is spirally wound on the core 1, as shown in FIG. 25. The surface of the spirally wound thermoplastic resin article 41 is compressed by a compressor (hollow housing 3, pressurizing tube 4, pump 5, retainers 7, valve 8) of the heating unit 12, as shown in FIG. 26. The thermoplastic resin article 41 is thus applied with pressure by the compressor, and with the compressed region extended outward along the axis of the core 1, the core 1 is heated by the heater 6. Consequently, spirally adjoining abutting faces 41a of the thermoplastic resin article 41 can be welded together with a smooth weld surface free of pinholes, thereby obtaining a thermoplastic resin tube. Where the thermoplastic resin article 41 spirally wound on the core 1 is long, the article 41 may be intermittently fed forward through the hole 12a of the heating unit 12 by a fixed distance at a time so that the fixed length of the thermoplastic resin article 41 may be welded at a time. In this manner, the eleventh embodiment also can provide advantageous effects similar to those achieved by the foregoing embodiments.

Although in FIGS. 25 and 26, the single sheet-like thermoplastic resin article 41 is spirally wound on the core 1 and welded, the present invention may be applied to welding of the adjoining abutting faces of a plurality of plate-like thermoplastic resin articles spirally wound side by side on the core 1 and different in material or color.

(Twelfth Embodiment of the Present Invention)

The present invention can also be applied to welding of axially parallel abutting faces 42a and their vicinities of a plate-like thermoplastic resin article 42 wound around the core 1.

Figure 27:
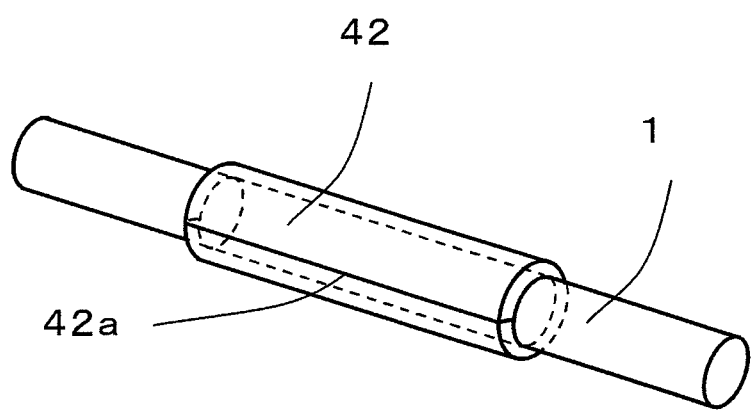
FIG. 27 illustrates a core and a thermoplastic resin article wound around the core, according to a twelfth embodiment of the present invention.
Figure 28:
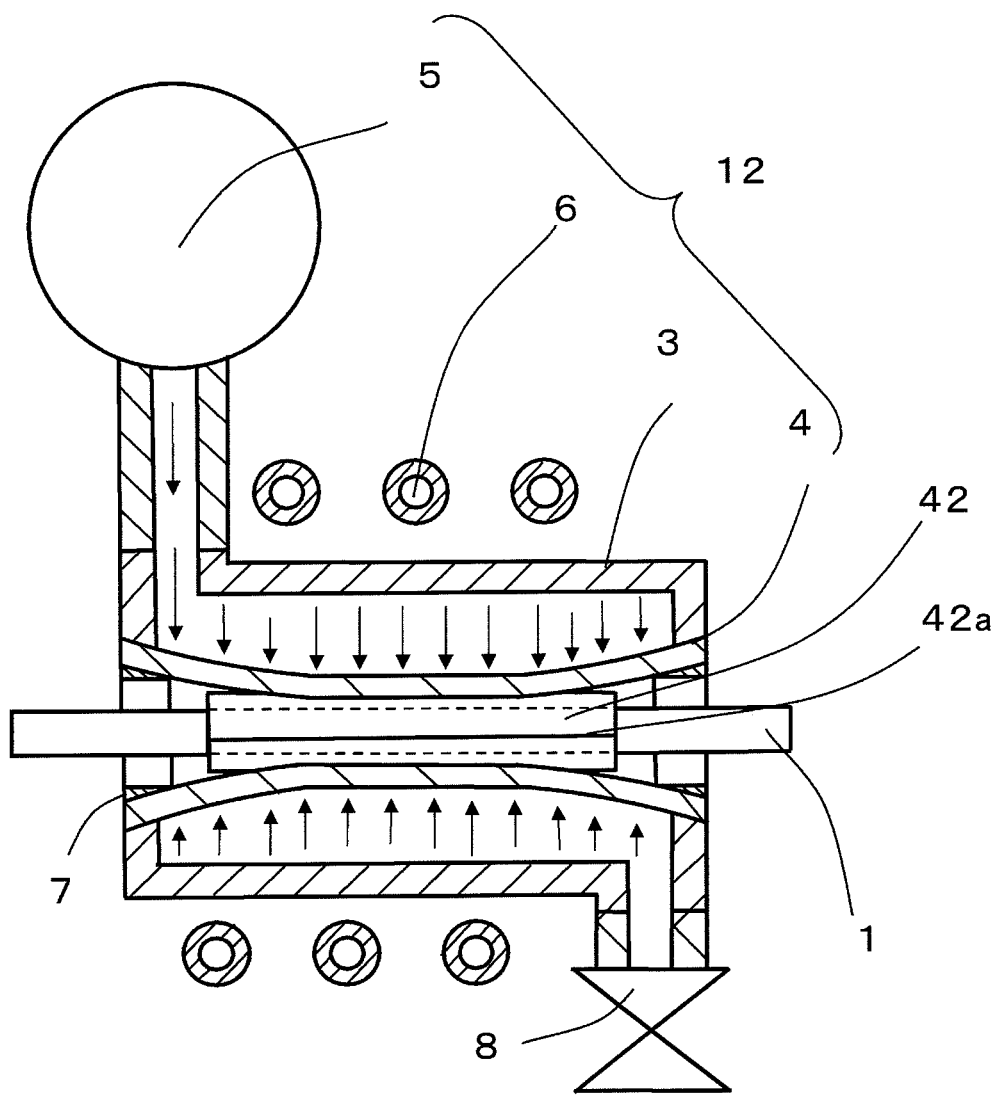
FIG. 28 is a sectional view illustrating a state in which pressure is applied to a heating unit of a welding device for thermoplastic resin articles according to the twelfth embodiment of the present invention.

As illustrated in FIG. 27, in the twelfth embodiment of the present invention, the thermoplastic resin article 42 is wound around the core 1 in such a manner that the axially parallel end faces 42a thereof abut against each other. Then, the abutting end faces 42a of the thermoplastic resin article 42, namely, the welding part, and their vicinities are compressed by the compressor of the heating unit 12, as shown in FIG. 28. The thermoplastic resin article 42 is thus applied with pressure by the compressor, and with the compressed region extended outward along the axis of the core 1, the core 1 is heated by the heater 6. Consequently, the abutting faces 42a of the thermoplastic resin article 42 parallel with the axis of the core 1 can be welded together with a smooth weld surface free of pinholes, thereby obtaining a thermoplastic resin tube. Where the thermoplastic resin article 42 wound around the core 1 is long, the article 42 may be intermittently fed forward through the hole 12a of the heating unit 12 by a fixed distance at a time so that the fixed length of the thermoplastic resin article 42 may be welded at a time. In this manner, the twelfth embodiment also can provide advantageous effects similar to those obtained by the foregoing embodiments.

(Thirteenth Embodiment of the Present Invention)

In the aforementioned first to twelfth embodiments of the present invention, the thermoplastic resin articles 2a, 2b, 2c, 2d, 41, 42 are fitted on the outer periphery of the core 1, 1a. According to the present invention, the thermoplastic resin articles and the core may be arranged reversely. Specifically, as illustrated in FIG. 29A, the thermoplastic resin articles 2a and 2b may be fitted into a tubular core 1b, and with the welding part of the thermoplastic resin articles 2a and 2b pressed against the inner peripheral surface of the core 1b by the compressor arranged inside the thermoplastic resin articles 2a and 2b, more particularly, by the outer periphery of a pressurizing tube 4i, the core 1b may be heated by the heater 6 to weld the welding part.

Figure 29A:
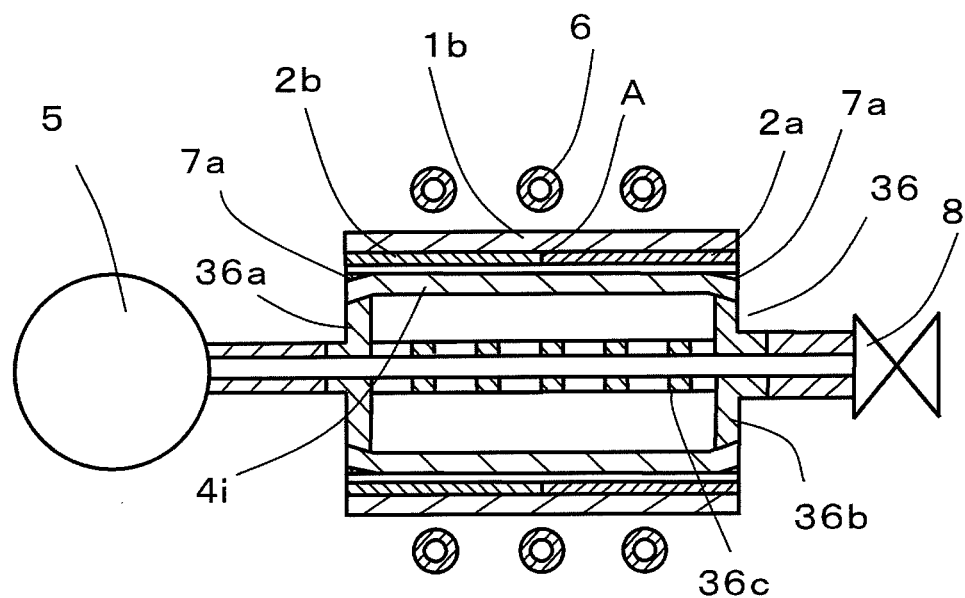
FIG. 29A is a sectional view illustrating the positional relationship between a heating unit of a welding device for thermoplastic resin articles according to a thirteenth embodiment of the present invention and a work.

In FIG. 29A, the tubular thermoplastic resin articles 2a and 2b are butted against each other inside the tubular core 1b. The compressor is configured such that the pressurizing tube 4i has a tubular shape smaller in diameter than the core 1b and has opposite ends closed with a hollow housing 36. The hollow housing 36 has disc-shaped opposite end faces 36a and 36b which are coupled to each other at their center by a tubular spacer 36c. Retainers 7a, each in the form of a ring having a wedge-shaped section but having inner and outer surfaces directed reversely to those of the aforementioned retainers 7, are press-fitted onto the opposite ends of the pressurizing tube 4*i* to fix the pressurizing tube 4*i* to the opposite ends 36*a* and 36*b* of the hollow housing 36. Further, a plurality of holes are formed in the peripheral surface of the spacer 36*c* of the hollow housing 36.

The pump 5 is connected via a pump connection hole to one end 36*a* of the hollow housing, and the valve 8 is connected via a valve connection hole to the other end 36*b* of the hollow housing. The compressor configured in this manner is located inside the thermoplastic resin articles 2*a* and 2*b*, and a fluid such as air is fed from the pump 5 through the holes of the spacer 36*c* into the cavity between the pressurizing tube 4*i* and the hollow housing 36, to expand the pressurizing tube 4*i* in directions perpendicular to the axis of the core 1*b*. The heater 6 is arranged around the core 1*b*.

Figure 29B:
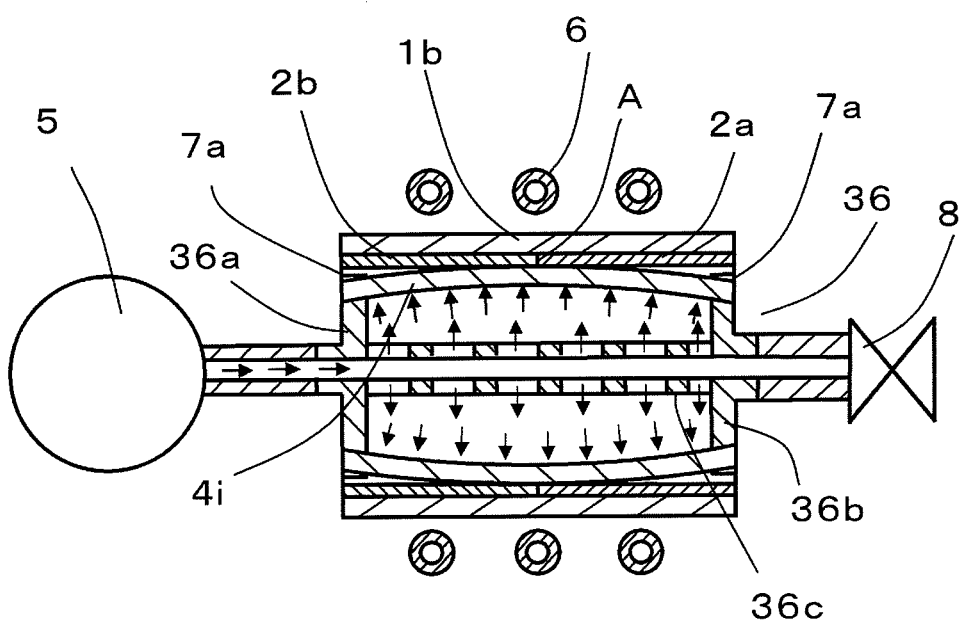
FIG. 29B is a sectional view illustrating a state in which pressure is applied to the heating unit of the thermoplastic resin welding device according to the thirteenth embodiment of the present invention.

As illustrated in FIG. 29B, the abutting faces A and their vicinities of the thermoplastic resin articles 2*a* and 2*b* are compressed by the pressurizing tube 4*i*. The thermoplastic resin articles 2*a* and 2*b* are thus applied with pressure by the compressor, and with the compressed region extended outward along the axis of the core 1*b*, the core 1*b* is heated by the heater 6. Consequently, the abutting faces A of the thermoplastic resin articles 2*a* and 2*b* can be welded together with a smooth weld surface free of pinholes.

After the welding, the fluid such as air is discharged via the valve 8, the pressure of the pressurizer is lowered to stop compression of the thermoplastic resin articles 2*a* and 2*b* by the pressurizing tube 4*i*, and the welded thermoplastic resin articles 2*a* and 2*b* are taken out together with the core 1*b* and are detached from the core 1*b*.

The pressurizing tube 4*i* may have such a sectional shape that the outer diameter thereof varies in the axial direction, more specifically, such that the outer diameter is small at the end portions of the pressurizing tube 4*i* and increases toward the middle portion. In this case, when the pressurizing tube 4*i* is expanded, the welding part of the thermoplastic resin articles 2*a* and 2*b*, that is, the abutting faces A and their vicinities can be compressed first by the middle portion of the pressurizing tube 4*i*. The pressurizing tube 4*i* may have a uniform thickness along its axis, or may alternatively have a uniform inner diameter along its axis such that the pressurizing tube 4*i* has a semicircular sectional shape. Also, by making the pressurizing tube 4*i* have a thickness varying in the axial direction, it is possible to set as needed the timing and pressure for compressing the abutting faces A and their adjoining surfaces of the thermoplastic resin articles 2*a* and 2*b*. In this manner, the thirteenth embodiment also can provide advantageous effects similar to those obtained by the foregoing embodiments.

(Fourteenth Embodiment of the Present Invention)

The present invention can be applied not only to butt welding and lap welding of tubular thermoplastic resin articles as stated above, but also to butt welding and lap welding of plate-like thermoplastic resin articles.

Figure 30A:
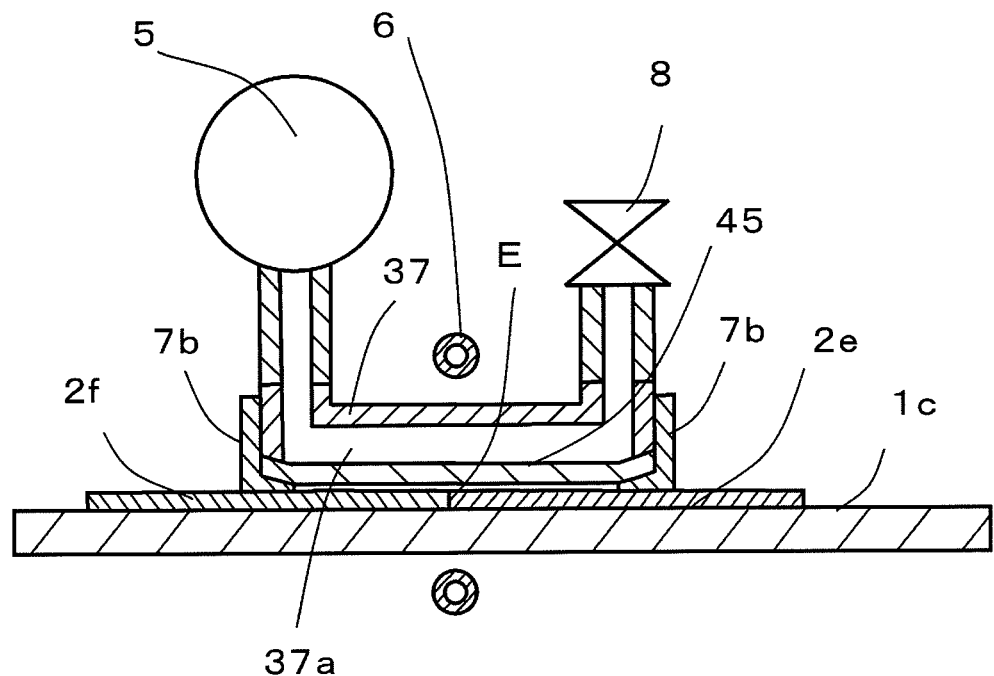
FIG. 30A is a sectional view illustrating the positional relationship between a heating unit of a welding device for thermoplastic resin articles according to a fourteenth embodiment of the present invention and a work.
Figure 30B:
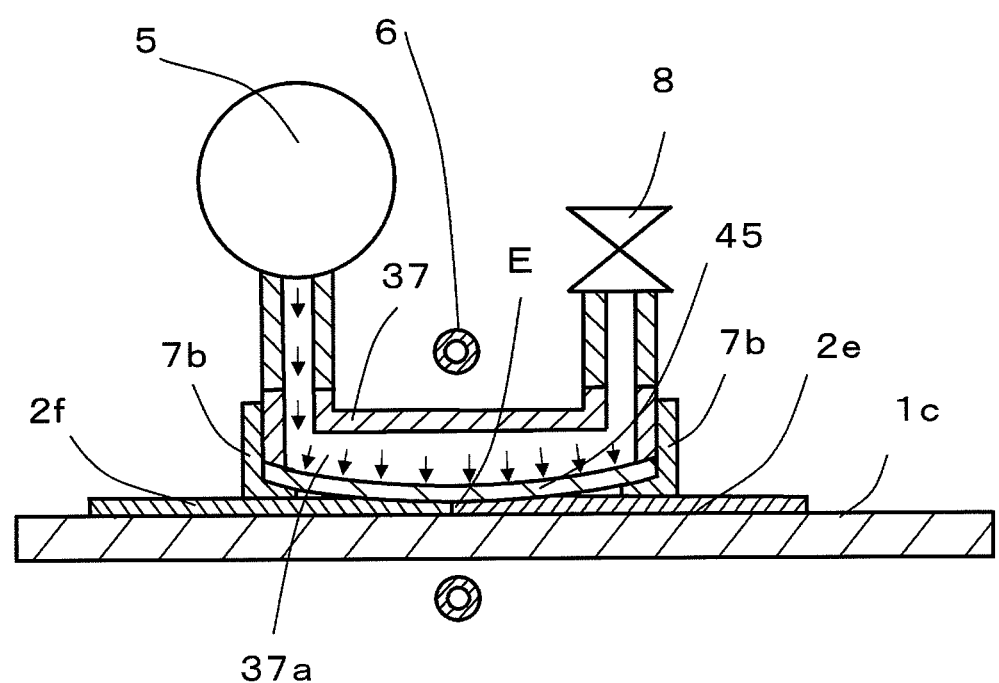
FIG. 30B is a sectional view illustrating a state in which pressure is applied to the heating unit of the thermoplastic resin welding device according to the fourteenth embodiment of the present invention.

FIGS. 30A and 30B illustrate the positional relationship between a heating unit of a welding device for plate-like thermoplastic resin articles 2*e* and 2*f* according to a fourteenth embodiment of the present invention and a work. In FIGS. 30A and 30B, a flat plate-like supporting base 1*c* corresponds to the cores 1, 1*a* and 1*b* of the foregoing embodiments, a planar pressurizing sheet 45 corresponds to the pressurizing tubes 4, 4*b*, 4*c*, 4*d*, 4*e*, 4*f* and 4*g*, a hollow housing 37 having an open hole 37*a* opening at its bottom corresponds to the hollow housings 3 and 31, and retainers 7*b* correspond to the retainers 7 and 7*a*. In the other respects, the basic configuration of this embodiment is similar to those of the foregoing embodiments. Thus, like reference signs are used to refer to like component parts, and description of such component parts is omitted.

In FIG. 30A, the plate-like thermoplastic resin articles 2*e* and 2*f* are placed on the flat plate-like supporting base 1*c* with their end faces butted against each other. The heater 6 is arranged above and below the thermoplastic resin articles 2*e* and 2*f*.

Like the embodiments described above, the compressor is constituted by the hollow housing 37, the pressurizing sheet 45, the pump 5, the retainers 7*b* and the valve 8. The planar pressurizing sheet 45 is affixed to the lower surface of the hollow housing 37 to hermetically close the open hole 37*a*. The retainers 7*b* have an L-shaped section and fix the planar pressurizing sheet 45 to the hollow housing 37 with the corners of the pressurizing sheet 45 pressed against the hollow housing 37.

The hollow housing 37 is connected with the pump 5 via a pump connection hole and is also connected with the valve 8 via a valve connection hole. A fluid such as air is introduced toward the open hole 37*a* of the hollow housing 37 by the pump 5 so that the pressurizing sheet 45 may swell downward. Also, the air or the like is vented through the valve 8 to lower the internal pressure, with the result that the pressurizing sheet 45 recovers its original shape and is separated from the surfaces of the thermoplastic resin articles 2*e* and 2*f*. The heater 6 is arranged outside the compressor. In the example illustrated in FIG. 30A, a high-frequency induction coil is used as the heater 6 and is so arranged as to surround the compressor and the supporting base 1*c*.

The fluid such as air is introduced by the pump 5 to cause the pressurizing sheet 45 to swell downward as illustrated in FIG. 30B, and therefore, the abutting faces and their vicinities of the thermoplastic resin articles 2*e* and 2*f* are compressed by the pressurizing sheet 45. In this manner, the thermoplastic resin articles 2*e* and 2*f* are applied with pressure, and with the compressed region extended, the supporting base 1*c* is caused to generate heat by the heater 6, whereby the abutting faces E and their vicinities of the thermoplastic resin articles 2*e* and 2*f* on the supporting base 1*c* are heated. Consequently, the abutting faces E of the thermoplastic resin articles 2*e* and 2*f* can be welded together with a smooth weld surface free of pinholes.

After the welding, the fluid such as air is vented through the valve 8 to lower the pressure of the pressurizer and stop compression of the thermoplastic resin articles 2*e* and 2*f* by the pressurizing sheet 45, and the welded thermoplastic resin articles 2*e* and 2*f* are taken out, as in the foregoing embodiments. In this manner, the fourteenth embodiment also can provide advantageous effects similar to those achieved by the foregoing embodiments.

(Fifteenth Embodiment of the Present Invention)

Although in the first through fourteenth embodiments described above, a pressurizing pump is used as the pump 5, the present invention may be applied to a configuration wherein a depressurizing pump such as a vacuum pump is used as the pump 5.

Figure 31A:
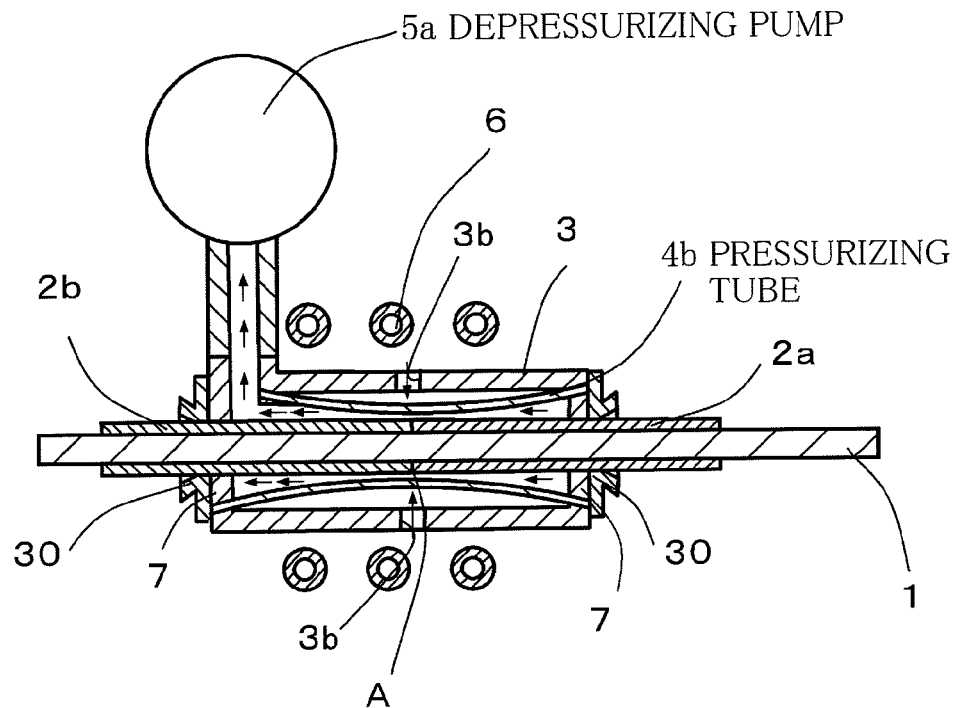
FIG. 31A is a sectional view illustrating the positional relationship between a heating unit of a welding device for thermoplastic resin articles according to a fifteenth embodiment of the present invention and a work.
Figure 31B:
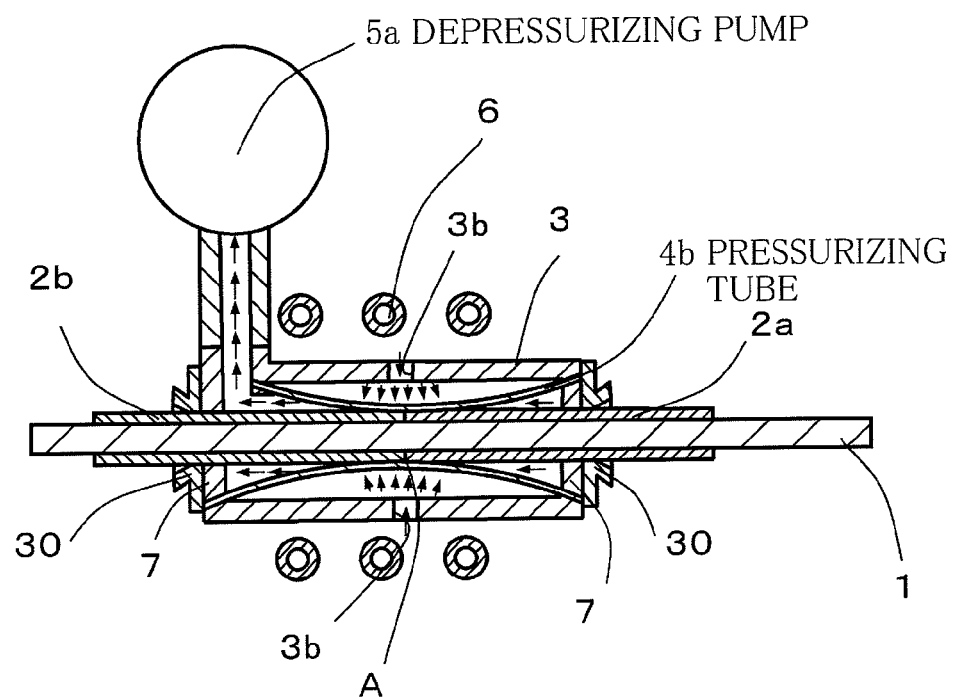
FIG. 31B is a sectional view illustrating a state in which pressure in the heating unit of the thermoplastic resin welding device according to the fifteenth embodiment of the present invention is reduced.

Specifically, as illustrated in FIGS. 31A and 31B, a plurality of air holes 3*b* are formed in the outer peripheral surface of the cylindrical hollow housing 3 extending along the core (mandrel) 1, and the pressurizing tube 4*b* is attached to the inner wall of the hollow housing 3. The pressurizing tube 4*b* is in the form of a cylinder of which the diameter decreases toward the axially central portion, and is fixed at its opposite ends to the hollow housing by the retainers 7, 7. The retainers 7, 7 each have a through hole through which the thermoplastic resin articles 2*a* and 2*b* can be inserted. Further, the retainers 7, 7 are associated with seal valves 30, 30, respectively, which are made of rubber and configured to seal the respective through holes. The work (core 1, thermoplastic resin articles 2a and 2b) is inserted through the seal valves 30, 30 before welding and is pulled out of the seal valves 30, 30 after welding.

Since the seal valves 30, 30 of rubber are attached to the respective opposite ends of the hollow housing 3, the interior of the hollow housing 3 is hermetically sealed, and as the air is sucked into a depressurizing pump 5a, the space between the pressurizing tube 4b and welding objects to be welded, namely, the thermoplastic resin articles 2a and 2b is depressurized. Because of a difference between the internal and external pressures of the pressurizing tube 4b, the pressurizing tube 4b presses, with its inner wall surface, the abutting faces A and their adjoining surfaces of the thermoplastic resin articles 2a and 2b.

With the surfaces of the joining portions of the thermoplastic resin articles 2a and 2b pressed by the inner wall surface of the pressurizing tube 4b, the core 1 (mandrel) is caused to generate heat by the high-frequency induction coil, whereby the joining portions can be welded together with a smooth weld surface. As the gas such as air present between the inner wall surface of the pressurizing tube 4b and the surfaces of the joining portions of the thermoplastic resin articles 2a and 2b is sucked by the depressurizing pump 5a, the inner wall surface of the pressurizing tube 4b comes into close contact with the surfaces of the joining portions of the thermoplastic resin articles 2a and 2b. Once the inner wall surface of the pressurizing tube 4b comes into close contact with the surfaces of the joining portions of the thermoplastic resin articles 2a and 2b, however, no additional pressure acts upon the outside of the pressurizing tube 4b, so that the inner wall surface of the pressurizing tube 4b and the surfaces of the joining portions of the thermoplastic resin articles 2a and 2b can be kept in close contact with each other with stable pressure applied thereto, providing the advantage that the close contact state can be maintained stably.

Specifically, just after the thermoplastic resin articles 2a and 2b fitted on the core 1 are inserted through the inner hole of the pressurizing tube 4b as shown in FIG. 31A, the inner wall surface of the inner hole of the pressurizing tube 4b is not in contact with the surfaces of the joining portions of the thermoplastic resin articles 2a and 2b, thus leaving a gap therebetween, because the inner diameter of the inner hole of the pressurizing tube 4b is larger than the outer diameter of the thermoplastic resin articles 2a and 2b.

As the gas such as air present between the inner wall surface of the pressurizing tube 4b and the surfaces of the joining portions of the thermoplastic resin articles is sucked thereafter by the depressurizing pump 5a, the inner wall surface of the pressurizing tube 4b comes into close contact with the surfaces of the joining portions. FIG. 31B illustrates the state in which the inner wall surface of the pressurizing tube 4b and the surfaces of the joining portions are in close contact with each other. Then, electric current is supplied to the high-frequency induction coil 6, whereupon the core 1 generates heat, making it possible to weld the joining portions together with a smooth weld surface.

The depressurizing pump 5a may be configured to reduce the pressure in multiple stages, for example, first to the first pressure (P1) and then to the second pressure (P2). In this case, the welding device of this embodiment can be used just like the thermoplastic resin welding devices of the aforementioned first to twelfth embodiments in which the surface of the welding part (joining portions) of the thermoplastic resin articles is compressed first with the first pressure (P1) by the compressor, then the surfaces of the thermoplastic resin articles are compressed with the second pressure (P2) higher than the first pressure (P1) to extend the compressed region without changing the relative position between the compressor at the compressed region and the surface of the welding part of the thermoplastic resin articles, the welding part of the thermoplastic resin articles is heated and welded by the heater, and after the welding, compression of the thermoplastic resin articles is stopped to allow the welded thermoplastic resin articles to be taken out of the welding device.

(Sixteenth Embodiment of the Present Invention)

In the above fifteenth embodiment of the present invention, the gas such as air present between the inner wall surface of the pressurizing tube and the surfaces of the joining portions is sucked by the depressurizing pump. Alternatively, the depressurizing pump may be used to suck in the gas such as air around the outer wall surface of the pressurizing tube.

Figure 32A:
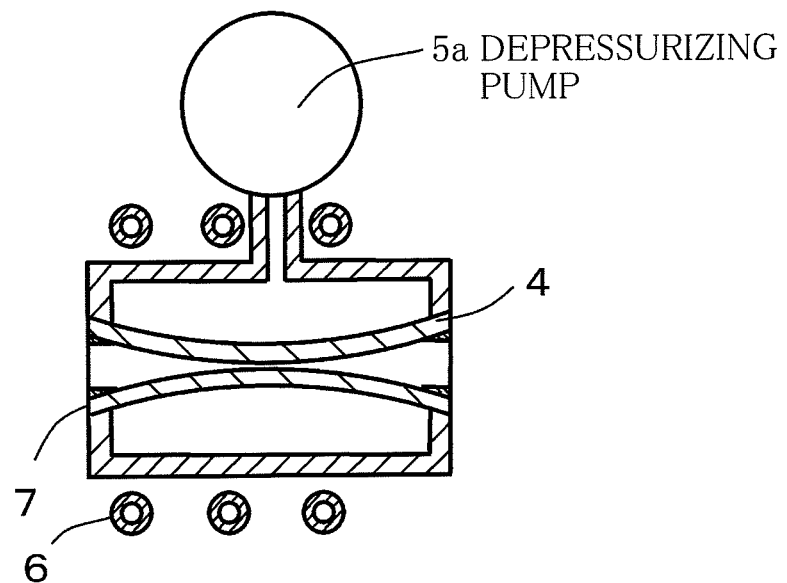
FIG. 32A is a sectional view illustrating the positional relationship between a heating unit of a welding device for thermoplastic resin articles according to a sixteenth embodiment of the present invention and a work.
Figure 32B:
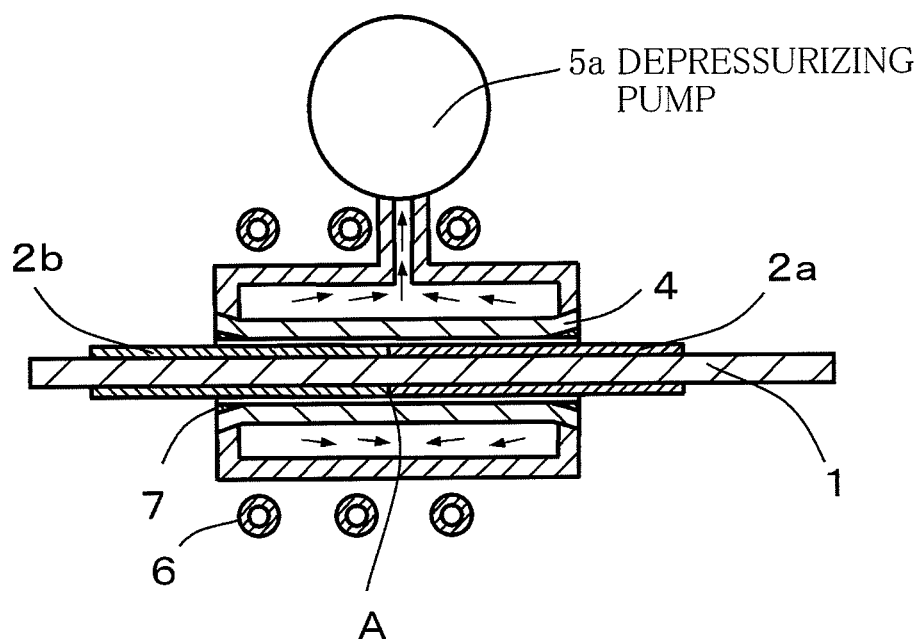
FIG. 32B is a sectional view illustrating a state in which pressure in the heating unit of the thermoplastic resin welding device according to the sixteenth embodiment of the present invention is reduced.
Figure 32C:
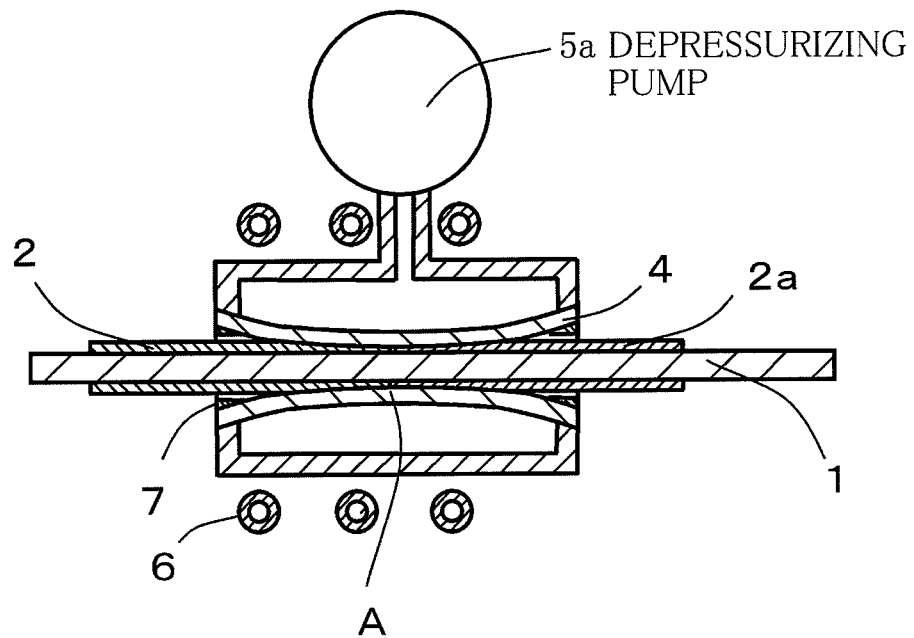
FIG. 32C is a sectional view illustrating a state in which the pressure in the heating unit of the thermoplastic resin welding device according to the sixteenth embodiment of the present invention is restored to a level before depressurization.
Figure 33A:
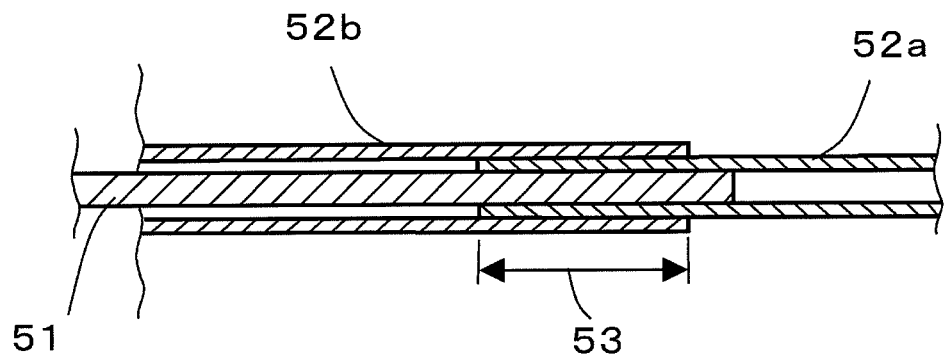
FIG. 33A is a sectional view illustrating a state in which a small-diameter thermoplastic resin tube and a large-diameter thermoplastic resin tube are fitted on a conventional core so as to overlap each other.
Figure 33B:
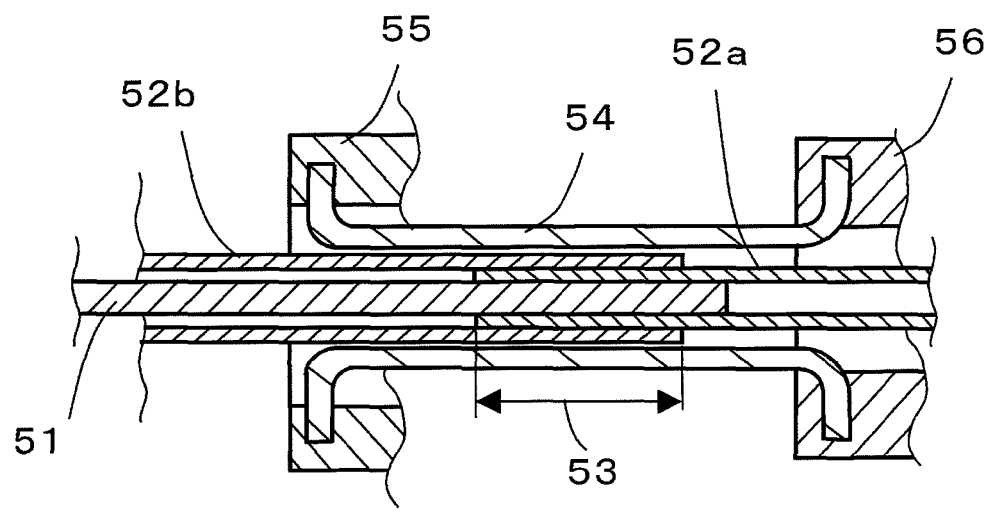
FIG. 33B is a sectional view illustrating a state in which a welding part of the thermoplastic resin tubes is inserted into a pressurizing tube of a conventional welding device for thermoplastic resin articles.
Figure 33C:
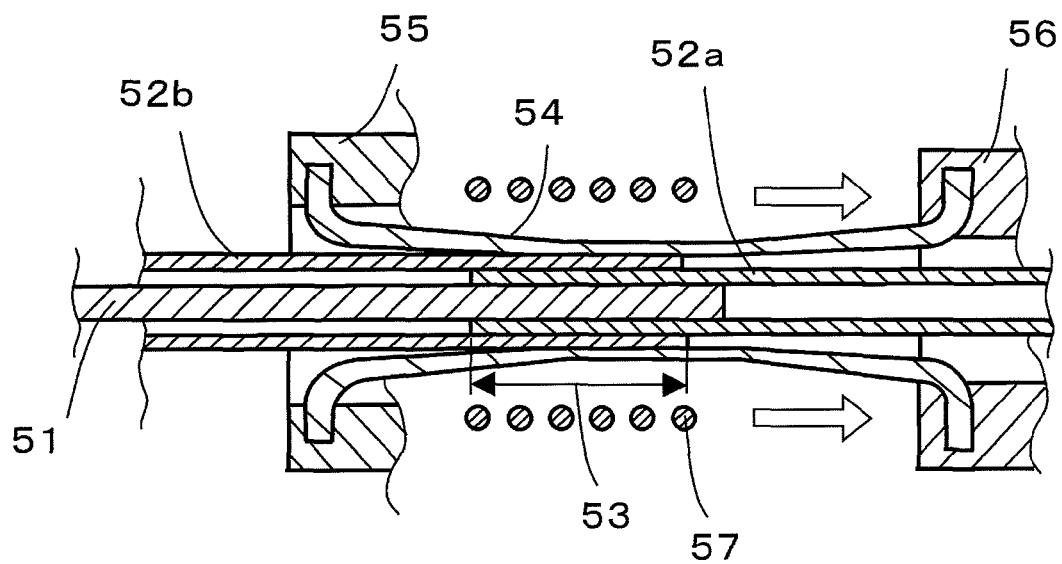
FIG. 33C is a sectional view illustrating a state in which the welding part of the thermoplastic resin tubes is compressed by the pressurizing tube of the conventional thermoplastic resin welding device, with the pressurizing tube stretched in its axial direction.
Figure 34A:
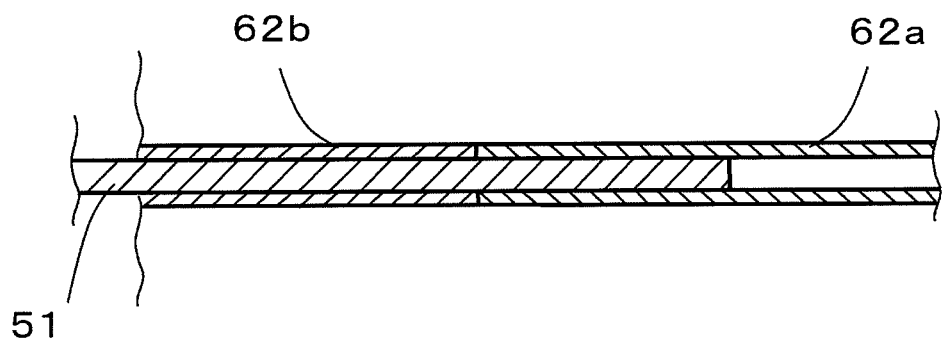
FIG. 34A is a sectional view illustrating a state in which end faces of a pair of thermoplastic resin tubes with an equal diameter are butted against each other on the conventional core.
Figure 34B:
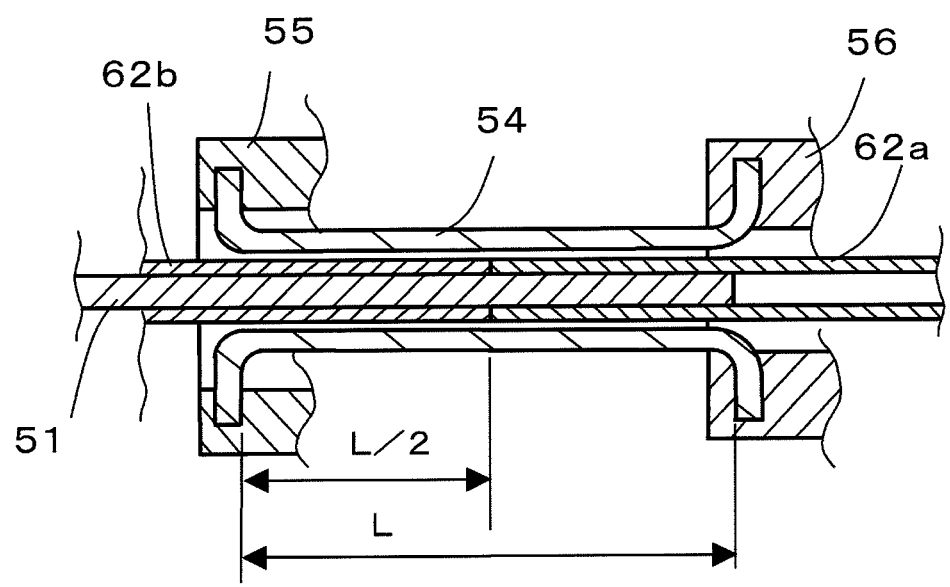
FIG. 34B is a sectional view illustrating a state in which the welding part of the thermoplastic resin tubes is inserted into the pressurizing tube of the conventional thermoplastic resin welding device.
Figure 34C:
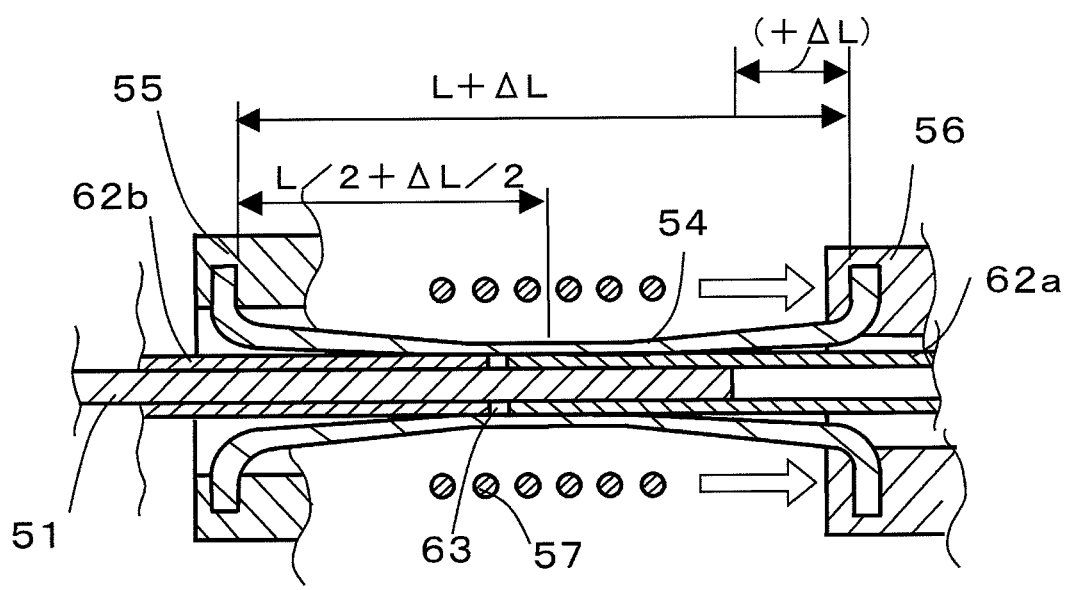
FIG. 34C is a sectional view illustrating a state in which the welding part of the thermoplastic resin tubes is compressed by the pressurizing tube of the conventional thermoplastic resin welding device, with the pressurizing tube stretched in its axial direction.

FIGS. 32A to 32C illustrate a sixteenth embodiment of the present invention having such a configuration. Specifically, in the sixteenth embodiment of the present invention, the gas such as air present in the space surrounding the pressurizing tube 4 is sucked by the depressurizing pump 5a, as seen from FIG. 32A, to expand the outer wall of the pressurizing tube 4 radially outward. Then, after the inner diameter of the pressurizing tube 4 is made larger than the outer diameter of the joining portions of the thermoplastic resin articles 2a and 2b, the joining portions of the thermoplastic resin articles 2a and 2b fitted on the core 1 are inserted in a non-contact fashion into the hole of the pressurizing tube 4, as illustrated in FIG. 32B. Subsequently, the suction by the depressurizing pump 5a is stopped, whereupon the pressurizing tube 4 compresses, with its inner wall surface, the outer surfaces of the joining portions of the thermoplastic resin articles 2a and 2b by its own restoring force. Then, electric current is supplied to the high-frequency induction coil 6, so that the core (mandrel) 1 generates heat, making it possible to weld the joining portions together with a smooth weld surface.

Also in the sixteenth embodiment of the present invention, the depressurizing pump 5a may be configured to reduce the pressure in multiple stages, for example, first to the first pressure (P1) and then to the second pressure (P2). In this case, the welding device of this embodiment can be used just like the thermoplastic resin welding devices of the aforementioned first to twelfth embodiments in which the surface of the welding part of the thermoplastic resin articles is compressed first with the first pressure by the compressor, then the surfaces of the thermoplastic resin articles are compressed with the second pressure higher than the first pressure to extend the compressed region without changing the relative position between the compressor at the compressed region and the surface of the welding part of the thermoplastic resin articles, the welding part of the thermoplastic resin articles is heated and welded by the heater, and after the welding, compression of the thermoplastic resin articles is stopped to allow the welded thermoplastic resin articles to be taken out of the welding device.

Industrial Applicability

The thermoplastic resin welding device and method according to the present invention can be applied to welding of thermoplastic resin articles such as thin thermoplastic resin tubes having a small diameter of about 0.2 to 10 mm, like catheters, and thermoplastic resin tubes having a diameter exceeding 10 mm. The welding device and method of the present invention can be suitably applied, in particular, to welding of thermoplastic resin articles that need to be joined such that a joint thereof has a smooth outer surface free of pinholes, as required of catheters, and a desired heating method, such as high-frequency induction heating, laser heating or the like, can be selected as needed.

Also, the present invention is not limited to the foregoing embodiments and may be applied to welding of a wide range of thermoplastic resin articles, including butt welding and lap welding of tubular thermoplastic resin articles and butt welding and lap welding of sheet- or plate-like thermoplastic resin articles.

REFERENCE SIGNS LIST

1: core (mandrel)
2a, 2b: thermoplastic resin article
3: hollow housing
3a: cavity
4: pressurizing tube
5: pump
6: high-frequency induction coil
8: valve
9: work
12: heating unit
13: guide rail
14: carriage
15: position sensor
16: welding manipulator
17: monitor
18: drive motor
19: feed screw
20: feed controller
21: welding controller
22: pressure controller
23: heating controller
40: laser heating unit

The invention claimed is:

1. A welding device for welding thermoplastic resin articles disposed in close contact with a supporting member, comprising:
 a compressor configured to compress a surface of a welding part of the thermoplastic resin articles to be welded, and surfaces of the thermoplastic resin articles adjoining the welding part; and
 a heater,
 wherein the welding device is configured such that:
 the surface of the welding part of the thermoplastic resin articles is compressed with a predetermined pressure by the compressor,
 compression of the thermoplastic resin articles is then continued to extend a compressed region without changing a relative position between the compressor in the compressed region and the surface of the welding part of the thermoplastic resin articles, the welding part of the thermoplastic resin articles is heated and welded by the heater, and
 after the welding, the pressure applied by the compressor is lowered to stop the compression of the thermoplastic resin articles such that the welded thermoplastic resin articles can be taken out of the welding device.

2. A welding device for welding thermoplastic resin articles disposed in close contact with a core serving as a supporting member, comprising:
 a compressor configured to compress a surface of a welding part of the thermoplastic resin articles to be welded, and surfaces of the thermoplastic resin articles adjoining the welding part, in directions perpendicular to an axis of the core; and
 a heater,
 wherein the welding device is configured such that:
 the surface of the welding part of the thermoplastic resin articles is compressed with a predetermined pressure by the compressor,
 compression of the thermoplastic resin articles is then continued to extend a compressed region along the axis of the core without changing a relative position between the compressor in the compressed region and the surface of the welding part of the thermoplastic resin articles, the welding part of the thermoplastic resin articles is heated and welded by the heater, and
 after the welding, the pressure applied by the compressor is lowered to stop the compression of the thermoplastic resin articles such that the welded thermoplastic resin articles can be taken out of the welding device.

3. The welding device according to claim 2, wherein:
 the compressor includes a pressurizing tube expandable and contractible in directions perpendicular to the axis of the core, and a pressurizer configured to apply a fluid pressure to the pressurizing tube in directions perpendicular to the axis of the core,
 the pressurizer is constituted by a hollow housing having a hollow space to form a cavity between a peripheral surface of the pressurizing tube and the hollow housing, and a fluid feeder configured to supply a fluid to the cavity,
 part of the hollow housing is disposed in close contact with the pressurizing tube to form the cavity between the peripheral surface of the pressurizing tube and the hollow housing, and the fluid is supplied to the cavity by the fluid feeder to deform the pressurizing tube in directions perpendicular to the axis of the core and compress the surfaces of the thermoplastic resin articles.

4. The welding device according to claim 1, wherein:
 the compressor includes an extendable and contractible pressurizing sheet, and a pressurizer configured to apply a fluid pressure to the pressurizing sheet,
 the pressurizer is constituted by a hollow housing having an open hole to form a cavity between the pressurizing sheet and the hollow housing, and a fluid feeder configured to supply a fluid to the cavity,
 part of the hollow housing is disposed in close contact with the pressurizing sheet to form the cavity between the pressurizing sheet and the hollow housing, and the fluid pressure is supplied to the cavity by the fluid feeder to deform the pressurizing sheet and compress the surfaces of the thermoplastic resin articles.

5. The welding device according to claim 2, wherein:
 the compressor includes a pressurizing tube expandable and contractible in directions perpendicular to the axis of the core, and a pressurizer configured to apply pressure to the pressurizing tube in directions along the axis of the core, and
 the pressurizer applies pressure to the pressurizing tube in directions along the axis of the core to deform the pressurizing tube in directions perpendicular to the axis of the core and compress the surfaces of the thermoplastic resin articles.

6. The welding device according to claim 3, wherein:
 the pressurizing tube is located outside of the thermoplastic resin articles, and
 the pressurizing tube has an inner diameter varying in an axial direction of the core such that the inner diameter is large at end portions of the pressurizing tube and decreases toward a middle portion of the pressurizing tube.

7. The welding device according to claim 3, wherein:
 the pressurizing tube is located inside of the thermoplastic resin articles, and
 the pressurizing tube has an outer diameter varying in an axial direction of the core such that the outer diameter is small at end portions of the pressurizing tube and increases toward a middle portion of the pressurizing tube.

8. The welding device according to claim 2, wherein:
the core is a tubular core having a hollow in which the heater is arranged, and
the core is heated by the heater such that heat of the heated core is transferred to the thermoplastic resin articles to weld the thermoplastic resin articles together.

9. The welding device according to claim 2, wherein:
the heater is a high-frequency induction heater, and
the core is heated by the heater such that heat of the heated core is transferred to the thermoplastic resin articles to weld the thermoplastic resin articles together.

10. The welding device according to claim 2, wherein:
the heater is a laser heater, and
the core is heated by the heater such that heat of the heated core is transferred to the thermoplastic resin articles to weld the thermoplastic resin articles together.

11. A pressing unit used in the welding device according to claim 2, comprising:
a pressurizing tube expandable and contractible in directions perpendicular to the axis of the core; and
a hollow housing having a hollow space to form a cavity between a peripheral surface of the pressurizing tube and the hollow housing, the hollow housing having a pump connection hole communicating with the hollow space,
wherein the pressurizing tube is deformed when applied with a fluid pressure via the pump connection hole, to compress the surfaces of the thermoplastic resin articles.

12. A pressing unit used in the welding device according to claim 1, comprising:
an extendable and contractible pressurizing sheet; and
a hollow housing having an open hole to form a cavity between the pressurizing sheet and the hollow housing, the hollow housing having a pump connection hole communicating with the open hole,
wherein the pressurizing sheet is deformed when applied with a fluid pressure via the pump connection hole, to compress the surfaces of the thermoplastic resin articles.

13. The welding device according to claim 2, wherein:
the welding device further comprises a pressurizing tube expandable and contractible in directions perpendicular to the axis of the core, and a hollow housing having a hollow space to form a cavity between a peripheral surface of the pressurizing tube and the hollow housing, the hollow housing having a pump connection hole communicating with the hollow space, and
a pressing unit is detachably mounted to the welding device and configured to cause the pressurizing tube to be deformed when a fluid pressure is applied to the pressurizing tube via the pump connection hole, to compress the surfaces of the thermoplastic resin articles.

14. The welding device according to claim 1, wherein:
the welding device further comprises an extendable and contractible pressurizing sheet constituting the compressor, and a hollow housing having an open hole to form a cavity between the pressurizing sheet and the hollow housing, the hollow housing having a pump connection hole communicating with the open hole, and
a pressing unit is detachably mounted to the welding device and configured to cause the pressurizing sheet to swell when a fluid pressure is applied to the pressurizing sheet via the pump connection hole, to compress the surfaces of the thermoplastic resin articles.

15. The welding device according to claim 3, wherein the fluid feeder is connected with a heater configured to heat the fluid such that pressure of the heated fluid is used as the fluid pressure.

16. The welding device according to claim 1, wherein a pressure controller constituting the compressor is configured to perform pressurization control and depressurization control.

* * * * *

UNITED STATES PATENT AND TRADEMARK OFFICE
CERTIFICATE OF CORRECTION

PATENT NO. : 9,108,362 B2
APPLICATION NO. : 14/359814
DATED : August 18, 2015
INVENTOR(S) : Tadahiro Konita It is certified that error appears in the above-identified patent and that said Letters Patent is hereby corrected as shown below:

IN THE SPECIFICATION

Column 3, lines 60-61: delete "as recited in claim 2" after "the present invention".

Column 4, lines 22-23: replace "In the welding device of the present invention as recited in claim 3," with -- In a welding device of the present invention, --.

Column 4, line 36: replace "claim 4" with -- claim 2 --.

Column 4, lines 61-62: delete "as recited in claim 5" after "the present invention".

Column 5, lines 43-44: replace "In the welding device of the present invention as recited in claim 6," with -- In a welding device of the present invention, --.

Column 5, line 57: replace "claim 7" with -- claim 3 --.

Column 6, line 8: replace "claim 8" with -- claim 4 --.

Column 6, lines 22-23: replace "In the welding device of the present invention as recited in claim 9," with -- In a welding device of the present invention, --.

Column 6, lines 35-36: replace "In the welding device of the present invention as recited in claim 10," with -- In a welding device of the present invention, --.

Column 6, line 44: replace "claim 11" with -- claim 5 --.

Column 6, lines 58-59: replace "In the welding device of the present invention as recited in claim 12," with -- In a welding device of the present invention, --.

Signed and Sealed this
Twenty-ninth Day of March, 2016

Michelle K. Lee
*Director of the United States Patent and Trademark Office*

CERTIFICATE OF CORRECTION (continued)

IN THE SPECIFICATION

Column 7, line 2: replace "claim 13" with -- claim 6 --.

Column 7, line 15: replace "claim 14" with -- claim 7 --.

Column 7, lines 27-28: replace "In the welding device of the present invention as recited in claim 15," with -- In a welding device of the present invention, --.

Column 7, line 29: delete "as recited in claim 13 or 14," after "in the axial direction,".

Column 7, lines 35-36: replace "In the welding device of the present invention as recited in claim 16," with -- In a welding device of the present invention, --.

Column 7, line 50: replace "In the welding device" with -- In a welding device --.

Column 7, line 64: replace "In the welding device" with -- In a welding device --.

Column 8, line 1: insert -- as recited in claim 8 -- after "the present invention".

Column 8, line 11: insert -- as recited in claim 9 -- after "the present invention".

Column 8, line 21: insert -- as recited in claim 10 -- after "the present invention".

Column 9, lines 43-44: replace "A pressing unit of the present invention is used in the welding device" with -- A pressing unit of the present invention as recited in claim 11 is used in the welding device as recited in claim 2 --.

Column 9, lines 56-57: replace "A pressing unit of the present invention is used in the welding device" with -- A pressing unit of the present invention as recited in claim 12 is used in the welding device as recited in claim 1 --.

Column 9, line 65: insert -- as recited in claim 13 -- after "the present invention".

Column 10, line 5: insert -- as recited in claim 14 -- after "the present invention".

Column 10, line 12: insert -- as recited in claim 15 -- after "the present invention".

Column 10, line 25: insert -- as recited in claim 16 -- after "the present invention".